United States Patent [19]

Richman

[11] 4,181,917
[45] Jan. 1, 1980

[54] COLOR TELEVISION RECEIVING SYSTEM UTILIZING INFERRED HIGH FREQUENCY SIGNAL COMPONENTS TO REDUCE COLOR INFIDELITIES IN REGIONS OF COLOR TRANSITIONS

[75] Inventor: Donald Richman, Huntington, N.Y.

[73] Assignee: Quadricolor Technology L.P., Great Neck, N.Y.

[21] Appl. No.: 812,228

[22] Filed: Jul. 1, 1977

[51] Int. Cl.² .............................................. H04N 5/21
[52] U.S. Cl. ....................................................... 358/36
[58] Field of Search ...................................... 358/36, 37

[56] References Cited

U.S. PATENT DOCUMENTS

| | | | |
|---|---|---|---|
| 2,905,753 | 9/1959 | Loughlin | 358/36 X |
| 3,778,543 | 12/1973 | Lowry | 358/36 X |
| 3,836,707 | 9/1974 | Murakami et al. | 358/36 X |
| 3,984,865 | 10/1976 | Avins | 358/36 |

Primary Examiner—Robert L. Griffin
Assistant Examiner—Aristotelis M. Psitos
Attorney, Agent, or Firm—Pennie & Edmonds

[57] ABSTRACT

A color television receiving system for NTSC-type signals is provided with signal processing circuitry and methods for reducing the visibility of color infidelities, such as incorrect highs, polarity reversals, and errors in visual luminance, which are visible in regions of sharp color transitions. Such infidelities are substantially reduced by effectively supplementing either the chrominance or the primary color signals with inferred high-frequency chrominance components which components are, respectively, processed from signal information discovered to be inherently available in NTSC-type signals and their implicit constraints. Specifically, it has been found that in regions of sharp color transitions, high frequency chrominance components can be scaled from the high frequency portion of the received monochrome signal in accordance with the respective ratios of the time rate of change of the received reduced bandwidth chrominance signal to the time rate of change of a comparable low frequency component of the received monochrome video signal. Alternatively, inferred high frequency primary color components can be analogously derived. A variety of specific circuit embodiments and methods can be used to process suitable inferred high frequency components.

216 Claims, 40 Drawing Figures

FIG. 9 Chrominance Subcarrier Step Correction

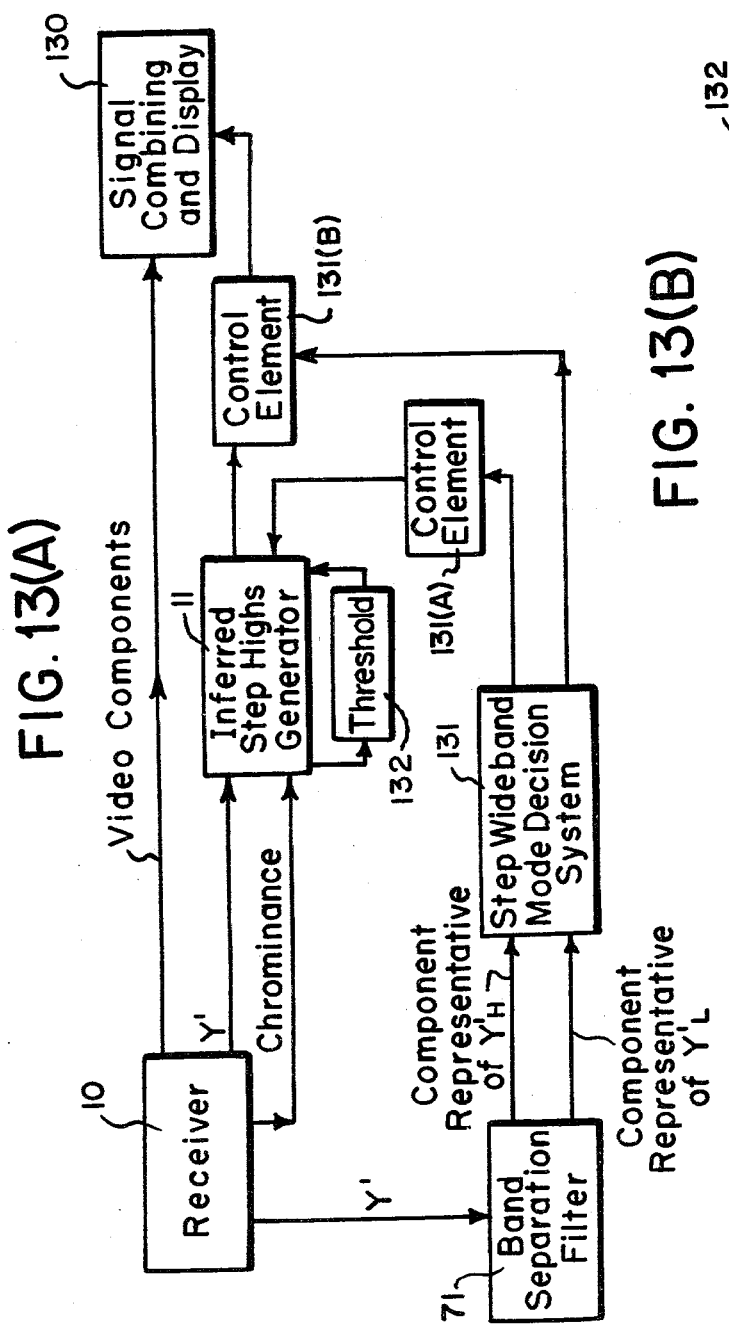

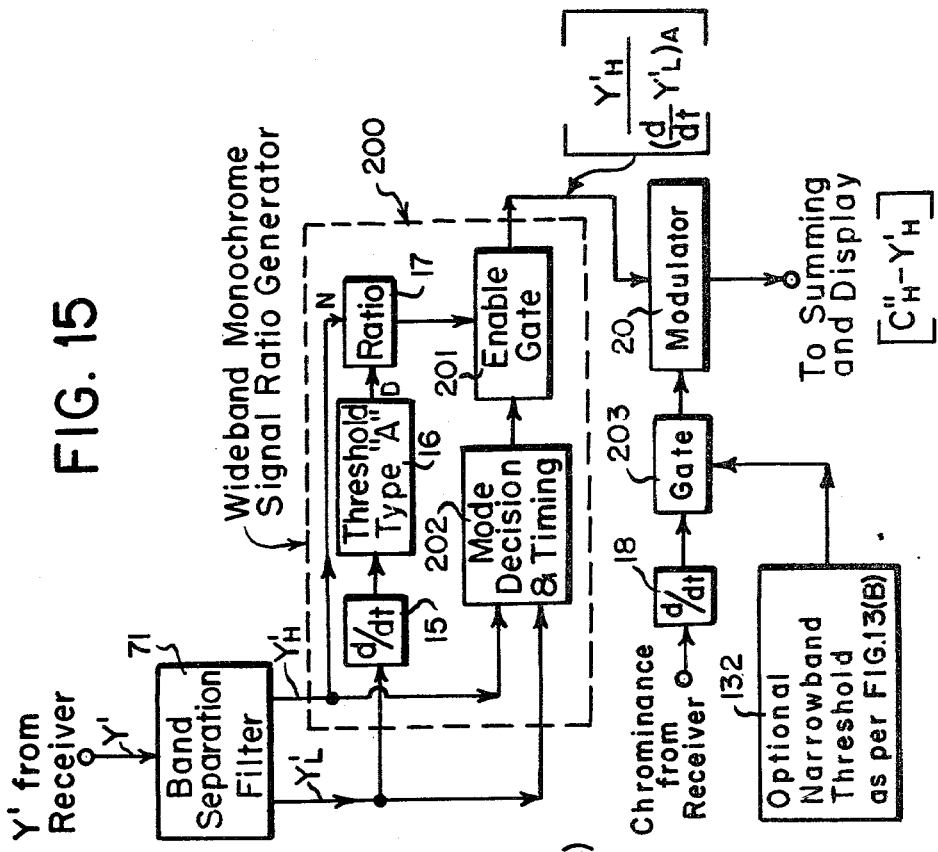
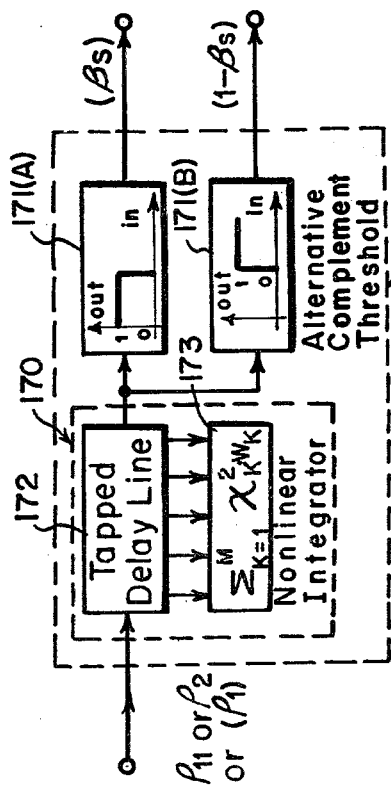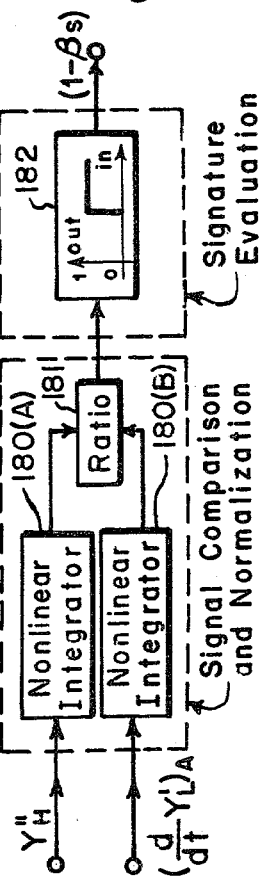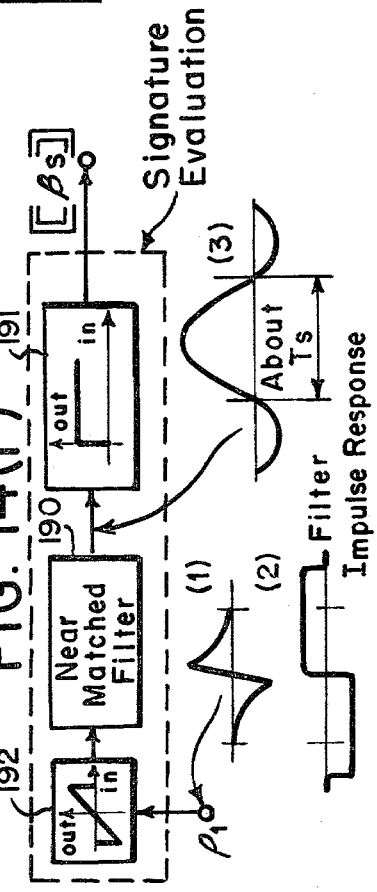

COLOR TELEVISION RECEIVING SYSTEM UTILIZING INFERRED HIGH FREQUENCY SIGNAL COMPONENTS TO REDUCE COLOR INFIDELITIES IN REGIONS OF COLOR TRANSITIONS

BACKGROUND OF THE INVENTION

Color television transmission systems used throughout the world are based on or derived from signal specifications originally defined in the United States by the National Television Systems Committee (NTSC). Such systems, which will be referred to herein as NTSC-type systems, include the NTSC format system used in the United States and the well-known PAL and SECAM systems used abroad. These systems utilize composite color television signals comprising a wide band monochrome signal and a plurality of chrominance signals.

The wideband monochrome signal, generally represented by the term Y', is typically a combination of three primary color signals, e.g., red, blue, and green, which have been precorrected for the power law gamma characteristic of typical display tubes. The presence of pre-correction in the constituents of a signal is conventionally indicated by designating the signal with a prime ('). The monochrome signal is typically of the form $Y' = \Sigma A_c C' = A_r R' + A_g G' + A_b B'$, wherein C' represents any gamma-corrected primary color signal, $A_c$, $A_r$, $A_g$ and $A_b$ represent respective nominal relative luminance coefficients for primaries, and R', G', and B' represent the gamma-corrected color signals for primaries of red, green, and blue, respectively. The monochrome signal Y', as defined herein, should not be confused with the colorimetric luminance Y which is a corresponding combination of the uncorrected primary signals, nor should it be considered equal to a gamma-corrected luminance signal because in the monochrome signal it is the individual primaries which have been corrected, not the entire combination, i.e., $Y' = \Sigma A_c C'$ is not uniquely related to $Y = \Sigma A_c C$ for typical gamma correction exponents.

The chrominance signals in NTSC-type systems typically comprise signals representing the difference between a gamma-corrected primary color signal and the monochrome signal or a linear combination of such color difference signals. Specifically, color difference signals can be generally represented by the term $(C' - Y')_L$ wherein C' represents any gamma-corrected primary. The subscript L serves as a reminder that the chrominance signals are typically transmitted with a bandwidth which is relatively reduced as compared with the Y' signal and that it may be further bandwidth limited in the receiver.

Typical NTSC-type transmission systems are designed to transmit Y' in its full wide bandwidth and linear combinations of the chrominance signals in reduced bandwidth. In the United States, for example (R'−Y'), (B'−Y'), and hence (G'−Y') are transmitted in linear combination chrominance signals designated the I' chrominance signal and the Q' chrominance signal. The linear combination chrominance signal measured on a particular phase of the chrominance subcarrier is known as a chrominance axis. Hence, for example, the I' and Q' signals define separate chrominance axes. While the I' and Q' signals have somewhat different bandwidths, each substantially narrower than that of the Y' signals, the excess portion of the relatively wider bandwidth I' signal is often lost at the receivers, most of which are designed for equiband operation.

Conventional receivers use either equiband chrominance for all axes, or use in varying degrees the added intermediate bandwidth I' signal transmitted as a single-sideband component.

Some receivers use simplified approximations to the nominal I' passbands, while other receivers use wideband equiband systems. In order to shorten the chrominance transient epoch, these receivers accept erroneous chrominance components nominally from the single-sideband I' components, and they variously proportion these erroneous components between the I' and Q' channels.

This specification will present the equations and circuit means relative to the substantial chrominance improvements of this invention, first for processing of equal band signals and then also for processing of I' and Q' chrominance signals of unequal bandwidths.

Common NTSC-type receivers demodulate and matrix the received chrominance signals into a plurality of reduced bandwidth chrominance signals $(C' - Y')_L$. The receiver then effectively adds the monochrome signal Y' to each chrominance signal in order to derive a plurality of signals which include, respectively, the low frequency components $C'_L$ of the primary color signals generated at the color camera and a combined high frequency component. The low frequency primary color components are sometimes referred to as the large area color signals. The high frequency monochrome component, $Y'_H$ is generally referred to as the mixed highs signal because it is transmitted and displayed only as a specific combination of the high frequency primary color components.

It has long been recognized that conventional NTSC-type receiving systems exhibit a number of visible color infidelities upon display, particularly in regions of sharp transitions from one color to another or, within a single color, in transitions from one luminance to another. When conventional NTSC-type receiver displays are compared against a reference display in which all of the primary color signals have a wide bandwidth comparable to that of Y', visible color infidelities, such as incorrect highs, polarity reversals, and errors in visual luminance can be observed in regions of sharp color transitions. These infidelities are clearly visible on modern displays as resolution and luminance errors, chromaticity smear, local desaturation, and luminance notches.

In step transients within a single primary color, the highs can be too small relative to the lows.

In step transients involving more than one primary, the highs can be of incorrect amplitude to accurately reproduce even a single colorimetric coordinate such as the luminance, Y. Furthermore, because of the change in luminance, $\Delta Y$ is $\Sigma A_c \Delta C$ whereas $\Delta Y'$ is $\Sigma A_c \Delta C'$, the high frequency components of Y' are sometimes of such polarity that the reproduced visual luminance Y on a step has upside-down highs. This infidelity occurs on any step wherein $\Delta Y'$ is of one polarity and $\Delta Y$ is of the other.

In step transients from a first primary in one region to a second primary in a horizontally contiguous region, with the third primary small or absent, a conventional color television display will exhibit in the high frequency portion of the step: (1) amplitude errors in the high frequency portion of each primary; (2) reversed polarity in the high frequency component of one primary; and also may produce (3) possible rectified high frequency components in another primary, producing desaturation and spurious low frequency components therein.

And in transitions between any substantially saturated color and another color which is substantially its colorimetric complement, there appear spurious observable dark regions commonly known as luminance notches.

While there has been a widespread recognition that the conventional reception and display of NTSC-type signals produce color infidelities such as these, none of the receiver correction circuits proposed in the prior art has provided satisfactory results. Typical prior art proposals for reducing transient distortions have allocated the largest portion of the fault to the use of a Y' signal on transmission instead of a true luminance measure, such as a gamma-corrected Y signal. Accordingly, these proposals have included the proposal to change the transmitted signal from Y' to Y to the inverse-gamma power and various other proposals to otherwise precorrect the transmitted monochrome signal. All such proposals have gone unaccepted in the industry because (1) they typically failed to provide adequate color correction; and (2) they typically degraded image quality in other respects.

The specific problem of inadequate highs has been treated, but the proposed solutions have deteriorated the image quality in other respects. For example, some prior art receivers utilize an enhanced gain in the common mixed-high region of the monochrome signal. This approach, however, cannot provide polarity corrections and cannot provide the differential relative amplitudes needed in the individual primary colors. Moreover, this approach degrades the display image by producing increased rectification and desaturation. It has also been proposed to modulate the common mixed highs by the ratio of the square of an estimated gamma-corrected luminance to the square of Y'. This proposal, also, fails to provide polarity corrections and differential relative amplitudes, and it would introduce a major increase in rectification and desaturation as well as generate spurious high frequency signals.

SUMMARY OF THE INVENTION

In accordance with the present invention, a color television receiving system for NTSC-type signals is provided with signal processing circuitry and methods for reducing the visibility of color infidelities, such as incorrect highs, polarity reversals, and errors in visual luminance which are visible in regions of sharp color transitions. Such infidelities are substantially reduced by effectively supplementing either the chrominance or the primary color signals with inferred high frequency chrominance components processed from signal information discovered to be inherently available in NTSC-type signals and their implicit constraints. Specifically, it has been found that in regions of sharp color transitions, high frequency chrominance components can be scaled from the high frequency portion of the received monochrome signal in accordance with the respective ratios of the time rate of change of the received reduced bandwidth chrominance signal to the time rate of change of a comparable low frequency component of the received monochrome video signal. Alternatively, inferred high frequency primary color components can be analogously inferred. A variety of specific circuit embodiments and methods can be used to process suitable inferred high frequency components.

UNDERLYING PRINCIPLES AND BASIC FEATURES OF THE INVENTION

A. The Principle Of Inferentially De-Mixed Highs

Contrary to prior art thinking regarding the problem of correcting the above-described color infidelities, I have concluded that the use of the monochrome video signal Y' is fully acceptable and that the subject color infidelities are caused not by the form of the Y' signal but rather by the major reduction in the bandwidth of the chrominance signals at the transmitter and by the further bandwidth reduction in conventional equiband receivers. I have discovered that, under certain conditions and subject to the application of certain techniques, inferred high frequency components can be processed from NTSC-type signals for supplementing the reduced bandwidth chrominance or primary color signals and thereby substantially reducing the visibility of these infidelities. Such inferred components may be generated in the form of either inferred high frequency chrominance components, designated $(C''_H - Y'_H)$, or the resulting composite inferred high frequency color components $C''_H$ may be directly generated. Addition of inferred chrominance to either the chrominance or the color channels, respectively, effectively "de-mixes" the highs.

This solution to the problem of correcting the subject color infidelities has the major advantage that it is able to utilize present transmitted signals with no requirements for change and may be readily incorporated into the design of conventional receivers. Accordingly, it is highly compatible with existing systems and apparatus.

It is a feature of the invention that for important portions of NTSC-type signals, it can provide inferred de-mixed high frequency components which maintain fidelity to the received video signal Y', i.e. $\Sigma A_c(C''_H - Y'_H) = 0$. This feature is significant because, of the transmitted signal components, only Y' provides a true representation of the full wideband primary color signals. This fact may be seen by reference to a non-linear color space defined by Y', $R' - Y'$ and $B' - Y'$ measured respectively along three orthogonal axes. In such a space, the primary colors R', G', and B' each represent specific directions and each has a positive projection on the Y' axis. And because only Y' is transmitted with full bandwidth, it is the only transmitted component which provides a true measure of the primary color signals over the full wide bandwidth. Hence fidelity with the received Y' signal is a necessary condition for fidelity to the primaries originally generated at the camera.

It is a further feature of the invention that for important portions of NTSC-type signals, it can provide inferred de-mixed highs which are of such polarity and magnitude as to render the color infidelities described above substantially less visible. Specifically, it can provide inferred de-mixed highs which substantially reduce the difference between (1) the R', G' and B' signals normally produced at the receiver, and (2) the wideband R', G' and B' signals normally available only at the color camera or transmitter.

It is a principal feature of this invention that the signal components deleted by the mixed highs signal composition and which may be further deleted in equiband signal processing by suppression of the single sideband I' component, need not remain deleted at the display. Provided proper and specific signal constraints, methods and circuit means are recognized and utilized, inferred high frequency chrominance components can be derived and differentially combined to effectively demix the highs so as to effectively reduce visible color infidelities specifically including those discussed above.

In a concept of this invention, the bandwidth limitations of NTSC-derived color systems result from the omission of the high frequency components on two chrominance axes, i.e., $(R'-Y')_H$ and $(B'-Y')_H$ or $I'_H$ and $Q'_H$, for example. In a conventional receiver, only the low frequency chrominance coordinates are translated for gamma correction and display. The receiver coordinates may be generally represented as $C'_R = (C'-Y')_L + Y'_L + Y'_H = C'_L + Y'_H$ whereas the originating transmitter color coordinates may be generally represented by $C'_T = (C'-Y') + Y'_L + Y'_H = C'_L + C'_H$. It will be recognized that the signal information that is lost in the conventional transmission and equal or unequal bandwidth reception of NTSC signals is entirely in the high frequency chrominance. If the missing chrominance components $(C'-Y')_H$ could be largely restored at the receiver, the image deficiencies now observed on conventional color receivers would be substantially eliminated.

In accordance with a principal teaching of this invention, the missing high frequency components $(C'-Y')_H$ are inferred from available signal information in the receiver and circuit means are provided for generating inferred high frequency components designated $(C''_H - Y'_H)$ which are used separately for each primary, producing different highs as required for each color. Since the inferred highs are not the same in each color and since they remove the mixed highs nature of the television signals and displayed pictures, the resulting high frequency signal components are also here referred to as de-mixed highs.

B. The Derivation of Inferred De-Mixed Highs for Transient Correction

There are several signal conditions for which high frequency signal components that exist in the original gamma corrected primary color camera signals can be reliably inferred from the available, bandwidth-limited signal components in the receiver.

As an elementary illustration, on transient steps the high frequency portions of the chrominance steps are not transmitted; but, for any step between two colors—each being defined by values for Y' and two chrominance values—the missing component of high frequency chrominance may be inferred to be proportioned with regard to the mixed highs as the ratio of the time rate of change of the low frequency component of that chrominance signal to the time rate of change of that portion of the Y' signal which concurrently occupies a comparable bandwidth. The inference is justified because on transient steps the high and low frequency components of each coordinate R', G', B' and $Y' = \Sigma A_c C'$ are in proportion. This proportionality exists principally in the time period of epoch of a transient step in the chrominance channel.

As will be further described, the proportionality can be measured within the transient step epoch by determining the relative value, in amplitude and polarity, of any measurable component of the available bandwidth restricted or low frequency signal, and of a comparable measure of a similarly constituted component derived from the Y' signal. Thus the ratio above applies to any ratio representative of the ratio of the said time rates of change.

The transient step component thus derived has amplitude and polarity separate from the local average color.

In accordance with one form of the present invention, signal processing methods and circuits are provided for generating inferred step transient correction signals in the receiver which make possible enhanced reproduction of color step transients generally restored in wideband fidelity, and useable for any desired display tube gamma. A high frequency chrominance correction signal $C''_H - Y'_H$ is effectively synthesized in the receiver for each of the primary colors and each is combined respectively with the normal display tube color control signal.

In a basic form of the invention, the corrective inferred step highs chrominance signal for each color is synthesized in accordance with the equation:

$$(C_H'' - Y_H') = Y_{H'} \left( \frac{d/dt(C - Y)_L}{d/dt(Y_L')} \right) \equiv Y_{H'} N_s \quad \text{(Eq. 1a)}$$

$$= [d/dt(C - Y)_L] \left[ \frac{Y_{H'}}{d/dt(Y_L')} \right] = \left[ \frac{d/dt(C - Y)_L}{\text{(Eq. 1)}} \right] [\rho_1] \quad \text{(Eq. 1b)}$$

The inferred chrominance is defined by the product of a signal representative of the rate-of-change of chrominance lows and a waveform representative of the ratio of $Y'_H$ to d/dt $Y'_L$. This ratio has a characteristic form during step transitions and represents a dynamic correlation between the components in the ratio during a step transition of any bandwidth. Herein $N_s$ and $\rho_1$ are defined by Equation (1). This is algebraically equivalent to $$C_H'' = Y_{H'} \left( \frac{d/dt(C_L')}{d/dt(Y_L')} \right) = Y_{H'}(1 + N_s) \quad \text{(Eq. 2)}$$

$$= \frac{d}{dt}(C_L') \left\{ \frac{Y_{H'}}{\frac{d}{dt} Y_L'} \right\} = \left\{ \frac{d}{dt}(C_L') \right\} \{\rho_1\}$$

and this latter equation also represents a basic form of the invention. Here $Y'_H$ and $Y'_L$ are the separated highs and lows of the standard received monochrome signal Y', and $(C'-Y')_L$ is the standard linearly matrixable color signal of limited bandwidth which has been encoded and received. The signal $C'_L$ represents the low frequency component of any color. It is available from the sum of a chrominance component $(C'-Y')_L$ and a comparably spectrally filtered portion $Y'_L$ of the received composite monochrome signal Y'.

The added signal components are effectively chrominance. They may take the form of a high frequency added chrominance signal directly added to color or chrominance as a $(C''_H - Y'_H)$ signal, or a signal effectively added such as by the generation of $C''_H$ and its addition to signals $(C'-Y')_L + Y'_L$. Since $Y'_L = Y' - Y'_H$ this comprises a net addition of $(C''_H - Y'_H)$. Alternatively the inferred chrominance highs may be added by any nonlinear processing approximation which provides composite color signals substantially equal to those defined above.

It is a feature of this form of the invention that over the time interval of the transient epoch, the frequency components of the inferred highs are scaled in proportion to the component $Y'_H$ and extend in bandwidth over only the spectral region occupied by $Y'_H$. The ratio in brackets of Equation (1) represents a proportioning factor existing over the transient epoch.

In relation to the non-linear color space of $Y'$, $R'-Y'$ and $B'-Y'$ discussed above, this scaling in proportion may be considered in accordance with the fact that in a step in such space from a first color defined by $R'_1$, $G'_1$ and $B'_1$ to a second color defined by $R'_2$, $G'_2$ and $B'_2$, all components of the transient step maintain the same direction. This directional relationship permits a full and exact correction within the full bandwidth of $Y'$ by scaling back from the one-dimensional projection on the $Y'$-axis, whether the step is (1) from one amplitude of a single primary to another or (2) involves one or more primaries increasing while one or more decrease or remain constant.

In a full correction, the conventional chrominance matrixing in accordance with the equation $\Sigma A_c(C'-Y')=0$ is applied to the components $(C''_H-Y'_H)$ as well as the $(C'-Y')_L$ components. The addition of $Y'$ then yields the signals $C''$, or specifically $R''$, $G''$ and $B''$, all in full bandwidth.

In practicing a preferred method, separate threshold constraints can be placed on a numerator portion of the inferred signal, such as $d/dt\,(C'-Y')_L$, and on a denominator portion such as $d/dt\,(Y'_L)$. The former threshold constraint functions to suppress corrections for very small color channel signal transient components, and the latter threshold prevents division by very small denominator signals.

Specific signal processing for both equiband processing and unequal band I, Q processing are taught in this specification.

EXAMPLE 1

Method Of Processing Inferred Step Chrominance Highs For Equiband Receiving Systems Typical equiband receivers may effectively directly detect chrominance components such as $(R'-Y')_L$ and $(B'-Y')_L$ in reduced bandwidth principally defined by the double sideband chrominance signal. Since the color difference signals are designed to be zero on white, the third component is derived by linear algebraic matrixing.

For such receivers, inferred high frequency components can be derived by processing in accordance with Equation (1) or (2), above. If the bandwidth of the double sideband chrominance signal component is designated $f_L$ and the bandwidth of the monochrome video signal component is designated $f_w$, the inferred high frequency correction components will have a bandwidth of substantially up to $f_w-f_L$.

EXAMPLE 2

Method Of Processing Inferred Step Chrominance Highs For Unequal Band I', Q' Receiving Systems NTSC-type systems are configured to permit use of receivers with unequal band processing of the I' and Q' chrominance signals. Such systems receive and process the full monochrome video signal Y' in bandwidth $f_w$, a reduced bandwidth I' chrominance signal in bandwidth $f_{LI}$ and a reduced bandwidth chrominance Q' signal in bandwidth $f_{LQ}$. In application of the present invention, inferred step chrominance highs can be processed for such receiving systems either for supplementing the I', Q' chrominance signals or for correcting the subsequently processed primary color signals.

For supplementing the chrominance signals, inferred step chrominance highs $I''_H$ and $Q''_H$ can be processed in accordance with the following relationships which are similar in form to equation (1a) and can also be written in the form of equation (1b):

$$Q_H'' = Y_{HQ}' \frac{d/dt(Q_L')}{d/dt(Y_{LQ}')} \text{ and } I_H'' = Y_{HI}' \frac{d/dt(I_L')}{d/dt(Y_{LI}')} \quad \text{(Eq. 3)}$$

Here $Y'_{LI}$ represents the $Y'$ component of bandwidth comparable to that of $I'_L$, i.e., $f_{LI}$, and $Y'_{HI}$ represents the complementary high frequency component of bandwidth $f_w-f_{LI}$. Similarly, $Y'_{LQ}$ represents the $Y'$ component of bandwidth $f_{LQ}$ comparable to $Q'_L$ and $Y'_{HQ}$ represents the complementary portion having a bandwidth of $f_w-F_{LQ}$. The thus derived inferred high frequency components $I''_H$ and $Q''_H$ are then effectively combined with the I' and Q' lows. They can be separately matrixed to give inferred high frequency components of the form $(C''_H-Y'_H)$, or jointly matrixed with the lows.

Alternatively, inferred step highs can be processed for correcting the primary color signals. Because any chrominance signal of the form $C''_H-Y'_H$ is a linear combination of the I' and Q' signals, proportionality constants $x_c$ and $y_c$ exist, such that in form:

$$C'-Y'=x_cI'+Y_cQ' \quad \text{Eq. 4}$$

In all of the equations presented above, the inferred chrominance highs $(C''_H-Y'_H)$ are effectively added to the received mixed highs $Y'$ to produce the de-mixed highs $C''_H$. The denominator term is of course constrained to a selectable minimum magnitude; and the numerator term must be concurrently present in order for a non-zero correction to take place.

In each algorithm presented above, the inferred or demixed highs on a step are jointly proportional to a ratio determined by rates of change of low frequency signals of comparable bandwidth and to the received $Y_H'$, wherein $H_H'$ can be considered as the projection on the $Y'$ axis of a step in the three-dimensional color space defined earlier. Therefore the inferred and demixed components are defined in terms of the frequency components existing in the $Y_H'$ signal during the step transients, while the modulating ratio during the step transient is defined in terms of time-varying signal components of comparable composition and processing.

Considering now bypassed inferred chrominance components as defined by Equation (1), above, and recognizing that the derivative is mathematically derived as the limit of two differences, it can now be seen that if the low frequency chrominance and $Y'$ signals are sampled at two points in time separated by an epoch $\delta t$ which is not large as compared to the transient epoch of the chrominance passband, then $$C_H'' - Y_H' = Y_H' \lim_{\delta t \to 0} \frac{\delta(C'-Y')_L}{\delta(Y_L')} = \quad \text{(Eq. 1c)}$$

$$(Y_H') \frac{d(C'-Y')_L}{dY_L'}$$

This form illustrates the color-space-directional nature of the inferred step chrominance highs.

Similar terms can be written from Equations 2, 3 and 4. Thus, a time-separation differencing circuit can function as a differentiating filter to permit deriving a ratio representative of the ratio of the time derivatives of said comparable components. Use may also be made of any comparably filtered responses to time-gated segments of the comparable signals existing in the transient epoch and processed, as will be explained, so that the resulting control ratio can be applied during the step transient epoch.

C. The Use of Thresholds and Nonlinearities

Considering next the use of operating thresholds, those may be set for specified sharpness of transition and break points. Representative equations for such thresholds may be (but are not restricted to) the equations of general forms;

$$X_{out} = X_{in} \sqrt[A]{\frac{|X_{in}|^A + A_o^A}{|X_{in}|^A}} \quad \text{(Eq. 5)}$$

which is referred to here as a type-A threshold device, $$X_{out} = X_{in} \sqrt[B]{\frac{|X_{in}|^B}{|X_{in}|^B + B_o^B}} \quad \text{(Eq. 6)}$$

which is referred to herein as a type-B threshold device. Here A and B are constants chosen to determine the sharpness of the transition and $A_o$ and $B_o$ are break points. Using Equation (1) for illustration, the result may be written generally as:

$$C_H'' - Y_H' = \quad \text{(Eq. 7)}$$

$$Y_H' \frac{d/dt(C' - Y')_L}{d/dt(Y_L')} \left[ \sqrt[B]{\frac{\frac{d}{dt}(C - Y)_L^B}{\frac{d}{dt}(C - Y)_L^B + B_o^B}} \sqrt[A]{\frac{\frac{d}{dt}(Y_L')^A + A_o^A}{\frac{d}{dt}(Y_L')^A}} \right]$$

Above the threshold region, the factor in the brackets approaches unity, and the basic algorithm is attained.

One form of nonlinearity of interest concerns the case where the transient correction may be principally restricted to large transients. In this case, by selection of A and $A_o$, the type A threshold may effectively act as a soft or hard limiter on the term $1/d/dt\ (Y_L')$ in accordance with the above illustrative equations (5) and (7). For this case, the polarity of the transient correction is maintained, and a portion of the improvement is obtained. It represents a partial use of the teachings of this specification.

Other non-linear approximations to full use of this invention can involve the use of inferred components such as:

$$(C_H'' - Y_H') = Y_H' \left\{ \frac{d/dt(C' - Y')_L}{d/dt(Y_L')} \right\}^M \equiv Y_H'(N_s)^M \quad \text{(Eq. 8)}$$

or similarly but not identically $$C_H'' = Y_H' \left\{ \frac{d/dt(C_L')}{d/dt(Y_L')} \right\}^M \equiv Y_H'(1 + N_s)^M \quad \text{(Eq. 9)}$$

When M equals unity in the above equations, the full benefit of the invention is attained, and the correction for step transients is accurate and complete as discussed. When M equals zero there is no correction since anything raised to the zero power is unity. When M is two the polarity of the ratio is removed. When the ratio is greater than unity but the signal is retained, the correction may tend toward accuracy only for a selected amplitude of step. In such approximations, the transient direction can be considered to be rotated in color space. The degree to which such approximations are accurate is determined by the degree to which the net chrominance or color waveforms in accordance with the teachings of this specification are approximated.

D. Defining and Determining The Existence and Duration of a Step Transient

While not necessary for the basic invention, it is feasible to define the existence and duration of a step transient and to constrain the operation of the invention to periods in which a defined step transient exists. Specifically, the step correction circuitry can be time gated, enabled or disabled in accordance with appropriate constraints and the inferred step chrominance highs effectively added along one or more chrominance axes in accordance with signal processing derived in auxiliary decision and control circuit means.

This is in conformance with the basic concept of the invention as expressed in Equation (1) and similarly represented in Equation (3).

These equations show that the inferred step chrominance highs correction components are in large part self enabling and disabling since the concurrent existence of the low frequency portion of the chrominance step, as expressed by $d/dt\ (C'-Y')_L$ and the high frequency portion of the Y' signal as expressed by $Y_H'$ must concurrently exist for the $C_H'' - Y_H'$ to exist.

Similarly $(d/dt\ Y_L')$ must exist and its inverse constrained to be below an upper bound. The relevance of the amplitude and polarity of $d/dt\ Y_L'$ is defined by its relation to $Y_H'$, and in Equation (1b) the factor $Y_H'/(d/dt)Y_L' = \rho_1$ was so written to clearly emphasize this point. During a step transient of any bandwidth, the waveform represented generally by $\rho_1$ has a specific shape, amplitude, polarity and, of course, timing. Thus, measures generally based on the relation between signals derived from $Y_H'$ as compared to signals derived from $d/dt\ Y_L'$ provide means and methods for step enabling, disabling or precise timing.

Relevant circuit means and methods then comprise both narrowband or chrominance-rate-passband derived measures and wideband measures dependent on comparison of a plurality of components of Y'.

(1) Elementary and Narrowband Step Enabling Measures

These include the Type B threshold on chrominance-rate components defined above for the individual axes, and also composite or chrominance-rate-plane contours. A minimum threshold may also be separately applied to the $(d/dt\ Y_L')$ components. Composite three-dimensional contours in a color-rate space having axes $d/dt\ (R' - Y')_L$, $d/dt\ (B' - Y')_L$, and $d/dt\ Y_L'$ may be used to define optional thresholds. All of these are effectively applications of the Type B Threshold.

Possible forms of nonlinearly matrixed signals for such thresholding and enabling may take a variety of forms such as $$\left[\frac{d}{dt}(C-Y)_L\right]^2 \geqq \epsilon_B{}^2 \text{ or}$$

$$\left[\frac{d}{dt}(Y_L')\right]^2 \geqq \epsilon_y{}^2 \text{ or by}$$

$$\left[\frac{d}{dt}Y_L'\right]^2 +$$

$$b_1\left[\frac{d}{dt}(C_1'-Y)_L\right]^2 + b_2\left[\frac{d}{dt}(C_2'-Y)_L\right]^2 \geqq \epsilon^2$$

where the coefficients $b_y$, $b_1$ and $b_2$ define color-rate-space contours; also, more complex and higher order equations representing other threshold enabling contours may be used.

(2) Wideband Step Decision and Control Systems Based on Internal Structure of the Y' Signal This specification also presents the principles, circuit means and methods whereby a determination of the local existence of a step may be made from the Y' signal with available concurrent verification from a chrominance-rate contour or color-space rate-of-change contour as defined above.

Operation may be (1) on, at all times, (2) normally off but keyed on in response to a measure of step existence (timing), (3) on during an enabling measure of step acceptability or (4) normally on but turned off in response to specific signal indication which indicates the likelihood that the available Y' highs have properties contrary to the presence of the step mode (disabling).

Thus, since the inferred chrominance highs are basically derived from the directional projection in nonlinear color space of the high frequency portion of the Y' signal, it is feasible to derive measures from the Y' signal indicative of the possible existence of a step transient, and to supplement this from the available chrominance lows to concurrently confirm that such is the case.

Signal information applicable to circuit means and methods of enabling, timing or disabling, of the inferred step chrominance highs may be derived from use of a plurality of components derived from the Y' signal. Two are sufficient. In addition to the measures described above, waveform shaping measures may be used which use the special signal waveform relationship existing during a step transient. Signal comparison and normalization means may be used to compare signals derived from or related to $Y_H'$ and $Y_L'$ to obtain waveforms which, during a step, have an a priori known waveform, polarity and amplitude for any bandwidth. Circuit means and methods for illustrating these are detailed in this specification. Illustrative waveform shapes include but are not restricted to $$\rho_{11} = \left(\frac{\frac{d}{dt}Y_H'}{\frac{d}{dt}Y_L'}\right)$$

or $$\rho_2 = \frac{Y_H'}{\frac{d^2}{dt^2}Y_L'}$$

or generalized $\rho_1$ defined as $$(\rho_1) = \frac{Y_H''}{d/dt Y_L''},$$

where $Y_H''$ and $Y_L''$ are signals derived from $Y_H'$ and $Y_L'$ but frequency filtered to reduce overlap in frequency. Signals representative of $Y_H'$ may have passbands intermediate $Y_H'$ and $Y_H''$. Step existence or non-existence may be inferred on a reduced bandwidth of $Y_H'$ generally designated here as $Y'_{H1}$. Preferred operations on $Y_H'$ and $Y_L'$ are those which do not spread the signals in time.

Processing and mode decision may operate on different bands for narrow and wideband axes in unequal I' and Q' bandwidth receivers.

The normalized comparison waveform may then be processed in a signature evaluation circuit in one or more of several forms which differ in: (a) precision of measurement, (b) minimum time delay and (c) time spreading as compared to a step transient epoch $T_s$ defined from the bandwidth of $(C'-Y')_L$ and $Y_L'$.

Forms of signature evaluation include:

(A) a least-squares differencing comparison of multiple time-spaced samples within a step transient epoch $T_s$, comparing individual samples against amplitude references to measure $$\sum_{k=1}^{M}(\rho_{11_k} - \rho_{11_{k_o}})^2$$

Here for $\rho_{11}$ as an example, $\rho_{11k}$ is the signal at the Kth sample point while $\rho_{11ko}$ is the corresponding reference.

This measure will null precisely $T_s$ after the appearance of a step of the nominal bandwidth and provides a precise and reliable keying pulse.

Use of shorter delay lines and a smaller number of samples can be used to reduce measurement time delay. A secondary waveform which may optionally add quadrature information can further improve reliability.

(B) Amplitude window types to indicate existence or non-existence of a step by amplitude range only. There is no time delay comparable to the step transient epoch associated with this type, and no spreading in time. Single or plural waveforms may be used.

(C) Combined waveform vertification techniques drawing on circuit means and methods of both (A) and (B) above to give increased reliability to step enabling and timing without delay or spreading.

(D) An integrated rectified monopolar measure such as $$\int_{t}^{t+\Delta t}(\rho_{11})^2 dt$$

or approximation thereto, followed by an amplitude window, may be used as a less precisely timed related measure. When this exceeds a predetermined threshold the step mode can be disabled from this source.

(E) A similar integrated rectified comparative measure based on the ratio $$\frac{\int (Y_H'')^2 dt}{\int (dt/dt Y_L')^2 dt}$$

may be similarly used: the effective integration periods may be unequal as integration is necessary only in the numerator. When this exceeds a predetermined measure the step mode can be disabled from this source.

(F) Linear near-matched filtering with an amplitude window to provide a delayed but polarity sensitive measure to step existence. Partial signal mismatch may be used to aid waveshape and timing. This form has both delay and spreading.

E. Selective Control of Step Mode Operation

A subsequent mode control system may then provide such modes as:

(1) Step highs mode fully operational at all times, inherent signal enabling used by means of the proportionality to d/dt ($C_L' - Y_L'$) on each axis and to $Y_H'$ in any relevant portion of the frequency band.

(2) Time localized step enabling derived from components of the Y' signal which keys on the step mode only during a step.

(3) Step highs normally off except for a possibily time extended enabling indication of the absence of any signal indication contrary to possible existence of a step.

(4) Step highs normally on except when gated off (disabled), by a derived signal representative of a relationship between a term derived from $Y_H'$ and one derived from d/dt $Y_L'$, which relationship is not generally consistent with a step.

Each of the embodiments may have a control element such as that shown later in this specification responsive to a composite signal $E_c$ to effectively enable or disable the inferred step highs operation.

F. Response to Sine Waves

The step mode algorithm produces a useful response to chrominance sinusoidal components within the chrominance passband. It does not alter response to sinusoidal components above the chrominance passband. With no loss of generality this can be explained in terms of an equiband example.

Let the effective chrominance passband have a shape below a nominal frequency point $f_1$ be defined by $F_L(f)$ for $f \leq f_1$. Then $Y_L'$ has the same bandpass shape and $Y_H'$ has one which is the complement, $(1 - F_L(f))$ for $f \leq f_1$. Let $F_L(f) = F_{Lo}$ at $f = f_o$, and let $W_o = 2\pi f_o$.

Consider a single primary color with a low frequency sine wave defined as $C_1' = C_{1c}' + C_1' \sin W_o t$. At the transmitter then $C_{1L}' = C_{1o} + F_{Lo}C_1'\sin W_o t$, $Y_L' = A_1 C_{1o}' + A_1 F_{Lo} \sin W_o t$ and $Y_H' = (1 - F_{Lo})A_1 \sin W_o t$. Conventionally $C_{1L}' + Y_H' = C_{1o}' + C_1' \sin W_o t$ ($F_{Lo} + A_1(1 - F_{Lo})$) and the sine wave amplitude is reduced because of amplitude roll-off or taper of the chrominance channel response. This gradual taper is used to minimize time smear and prevent ringing. Wideband chrominance receivers tend at least to pick up more cross-color energy from Y' into the chrominance channel. Using the inferred step algorithm, $$C_{1L}' + C_{1H}'' = C_{1o}' + F_{Lo}C_1'\sin W_o t + A_1 C_1'(1 - F_{Lo})\sin W_o t \left[ \frac{C_1' F_{Lo} W_o \cos W_o t}{A_1 C_1' F_{Lo} W_o \cos W_o t} \right] = C_{1o}' + C_1' \sin W_o t,$$

amplitude of the sinusoidal components is restored, that is, the passband response is effectively squared off without incurring time delay, or time spreading, and certainly without degradation of response to step transients. The same can be comparably shown if the sine wave is comprised of a plurality of primary color components.

Thus, it is useful to include the design and operational choices of step mode full on or step mode disabled only when certain threshold are exceeded. For the various control measures defined by $\rho_{11}$, ($\rho_1$) and $\rho_2$ as described in various sections of this specification, the general mode decision parameters $\beta_s$ or $1 - \beta_s$ for control compatible with or incompatible with a step transition, the measures can be set to leave the step mode on for sinusoidal components over the bulk of the $Y_L'$ passband, and to disable the step algorithm for higher frequency components which are not related to the lows in a manner compatible with a step. For example, if $F_L(f) \approx \cos^2 \pi/2(f/f_1)$, then $(1 - F_L(f)) \approx \sin^2 (\pi/2(f/f_1))$ for $f < f_1$, then $\rho_{11}$ is proportional to $\tan^2 (\pi/2(f/f_1))$.

For ($\rho_1$) which is bandwidth limited to prevent overlap in frequency, the mode is maintained for the entire chrominance lows passband. Other moderately filtered versions of signals ($\rho_{11}$) or ($\rho_2$) can be designed to make the transition point at or close to $f_1$. This special nonlinear processing provides a switching transition frequency which is also effectively rectangular without incurring undesirable delay and transient effects conventionally obtained with sharp frequency transitions.

The use of non-overlapping passbands or of colinear phasing of the components in the numerator or denominator for Y' derived mode decision controls tends to constrain performance with sinusoidal components existing with complementary amplitude of $Y_H'$ in the overlap region with $Y_L'$. Specifically, it tends to prevent a quadrature relationship between the numerator and denominator functions whether processed linearly or nonlinearly in the mode decision system.

Thus, it is possible to use threshold responsive mode decision systems such that when the dominant components in $Y_H'$ comprise low frequency sinusoidal components, step mode may be generally enabled, depending on threshold setting.

G. Relation to Cross Color Due To Band Sharing

By providing television receiving systems with enhanced resolution as compared to current receiving systems, the present invention reduces the necessity to rely on portions of the chrominance band subject to cross talk, and thus can permit reduction of cross color due to band sharing.

Cross color represents a significant problem in current television receiving systems. Cross color results from the use of band sharing wherein the Y' signal occupies a band concurrently with a chrominance signal. Cross talk from the Y' signal into the chrominance channel produces spurious chrominance which is rendered more visible by non-linear processing on display. A high resolution image, which may be colorless, can have detail picked up as cross color, averaging purple. It has residual luminance due to rectification by the display gamma characteristic, and if the image moves, it can produce low frequency luminance flicker which is highly noticeable to the human eye.

In addition to providing improved performance at the receiver, the present invention could permit future transmission practice to further reduce interference by constraining the I' bandwidth to the double-sideband Q' bandwidth at the transmitter and by constraining the Y' bandwidth so that it does not overlap the chrominance.

H. Relation to Color Primaries

Ideal correction for change of colorimetric primaries for use in color television signal displays in which the primaries are not the same as those used at the transmitter for NTSC-type signals, generally would involve the following steps:
 (1) Derive $C'_1$, $C'_2$, $C'_3$;
 (2) Derive $C_1$, $C_2$, $C_3$;
 (3) Matrix to $C_a$, $C_b$, $C_c$;
 (4) Reapply gamma to get $C_a'$, $C_b'$, $C_c'$ and apply to picture display.

Various approximations are commonly used to simplify the correction algorithms.

The present invention is not incompatible with such approximations, and, by providing more accurate signals $C''_1$, $C''_2$ and $C''_3$ in the full monochrome bandwidth $f_w$, this invention can improve the limit of potentially available performance.

BRIEF DESCRIPTION OF THE DRAWINGS

The advantages, nature, and various additional features of the present invention will appear more fully upon consideration of the illustrative embodiments now to be described in detail in connection with the accompanying drawings in which:

FIGS. 13, 14 and 15 pertain to receiving systems with automatically controlled inferred high frequency step correction circuitry.

For convenience of reference, similar elements are given the same reference numerals throughout the drawings.

Figure 1:
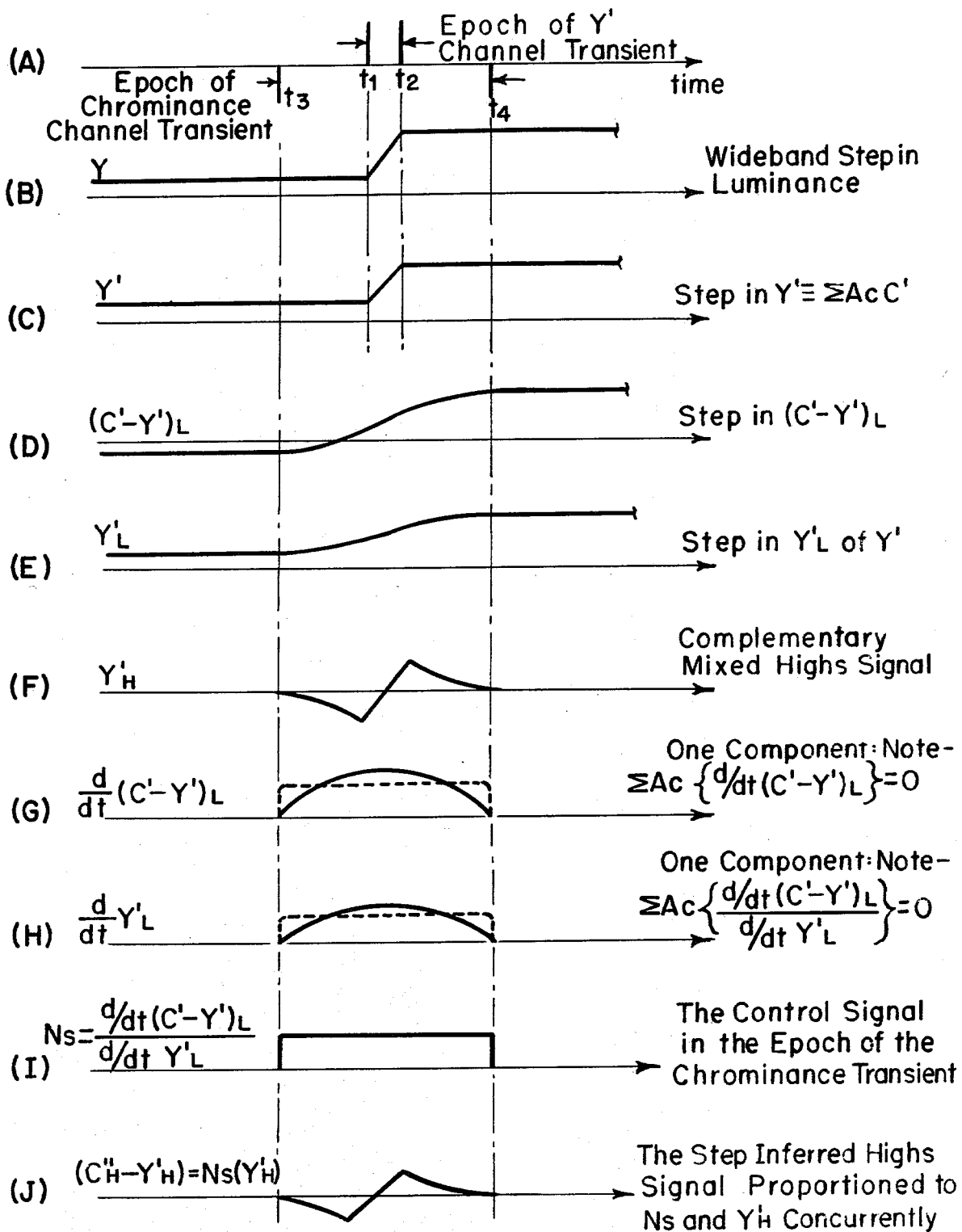
FIGS. 1(A)–(J) are exemplary received and processed color television step transient waveforms which illustrate the operational concepts and methods of the invention.

DETAILED DESCRIPTION (a) Waveforms During Step Transients (FIG. 1)

Referring to the drawings, FIG. 1 shows on a common time base exemplary received and processed color television step transient waveforms which illustrate the operation of the methods and circuits of the invention.

FIG. 1(A) defines the common time base for the subsequently illustrated waveforms. The time interval $t_1$ to $t_2$ illustrates the time epoch of an exemplary step transient in the monochrome video signal, and the time interval $t_3$ to $t_4$ illustrates the time interval of the same step transient in the relatively reduced bandwidth chrominance signal. It is within these time epochs that the signal levels vary from a first level to a second level.

FIGS. 1(B) and 1(C) illustrate a step in the colorimetric luminance signal Y at the camera and in the transmitted monochrome signal Y', respectively. Because the monochrome signal is transmitted with a relatively wide bandwidth, on the order of three megahertz in the United States, this step can be relatively sharp with a relatively short time epoch from $t_1$ to $t_2$.

FIG. 1(D) illustrates the same step in a typical transmitted reduced bandwidth chrominance signal $(C'-Y')_L$. Because the chrominance signal is transmitted with a reduced bandwidth, on the order of 0.5 to 0.6 megahertz for Q' channel, the step is less sharp than that shown for the monochrome signal and is spread out over a longer time epoch from $t_3$ to $t_4$.

In accordance with one embodiment of the invention, chrominance signals of the type illustrated in FIG. 1(D) are supplemented with inferred high frequency components so that they will more accurately portray the color signals actually generated at the camera. In one exemplary method, the chrominance signals are supplemented by inferred high frequency components equal to the product of (1) the high frequency portion $Y_H'$ of the monochrome signal Y' which exceeds the bandwidth of the chrominance signal, and (2) the ratio of the first order time derivative of the reduced bandwidth chrominance signal $(C'-Y')_L$ to the first order time derivative of the low frequency portion $Y_L'$ of the monochrome signal which has a bandwidth and frequency range comparable to that of the reduced bandwidth chrominance signal, i.e., the inferred high frequency chrominance component, $(C_H''-Y_H')$, is given by the relation:

$$(C_H'' - Y_H') = Y_H' \left[ \frac{d/dt(C' - Y')_L}{d/dt(Y_L')} \right]$$

FIGS. 1(F) through 1(J) illustrate typical waveforms utilized in processing inferred high frequency components for supplementing the reduced bandwidth chrominance signals in accordance with the above-described embodiment of the invention.

An initial step can involve effectively splitting the monochrome video signal Y' into two components, a low frequency component $Y_L'$, as illustrated in FIG. 1(E), having a bandwidth and frequency range comparable to that of the reduced bandwidth chrominance signal, and a high frequency component $Y_H'$, as illustrated in FIG. 1(F), having a bandwidth and frequency range complementary to that of $Y_L'$, i.e., $Y_H'+Y_L'=Y'$. As can be noted by a comparison of FIGS. 1(E) and 1(D), the transition epoch for $Y'_L$ matches that for $(C'-Y')_L$ because bandwidths are matched. As can further be noted, the waveform of $Y_H'$ shown in FIG. 1(F) is the complementary mixed highs signals which, if recombined with $Y_L'$, would reconstitute the short transition step of Y' shown in FIG. 1(C). Since $Y_L'$ and $Y_H'$ are complementary components of Y', the pertinent time intervals occupied by these components are the same here.

In equiband reception, transient epochs at any chrominance axis are equal. In an I', Q', unequal chrominance bandwidth receiver, the transient epoches of the I' and Q' channels are unequal, but the waveforms of FIG. 1 are still applicable as scaled in proportion.

FIGS. 1(G) and 1(H) illustrate the time derivatives of $(C'-Y')_L$ and $Y_L'$ respectively. In these figures, the solid curves are representative of possible transient shapes with phase-equalized frequency filtering of roughly cosine-squared frequency response. The broken line curves represent alternative waveforms corresponding to a more nearly linear transient in FIGS. 1(D) and 1(E). It is important to note that the time derivative waveforms shown in FIGS. 1(G) and 1(H) are responsive to the polarity of the transitions as well as to the amplitudes.

FIG. 1(I) illustrates the ratio of the time derivative signals, designated $N_s$ and referred to herein as a control signal. As illustrated, so long as $(C'-Y')_L$ and $Y_L'$ have comparable frequency characteristics, this ratio has a substantially constant value over the transient epoch. The control signal $N_s$ exists in, and is principally constrained to, the transient epoch of the step in the chrominance passband, during a transient step.

FIG. 1(J) illustrates the derived inferred high frequency chrominance component $(C_H''-Y_H')=N_s(Y_H')$. The inferred highs component is an alternating bi-polar pulse which exists within the transition epoch and is in proportion to the high frequency component $Y_H'$ existing within the same epoch.

(b) Processing of the Inferred Highs Control Signal

The time derivative signals d/dt $(C'-Y')_L$ and d/dt $(Y_L')$ can be processed by conventional forms of differentiating circuits such as, for example, delay line differentiating circuits which circuits have transfer responses which are substantially proportional to frequency over the chrominance bandwidth but do not have time undershoots. The control signal $N_s$ can then be readily obtained from the outputs of these differentiating circuits by a ratio-producing circuit device such as, for example, a bipolar gain control device. This processing defines, within the transient epoch, a control signal $N_s$ for ideal linear performance of the form:

$$N_s \equiv \frac{d/dt(C'-Y')_L}{d/dt(Y_L')} = \frac{C_H''-Y_H'}{Y_H'} = \frac{d(C'-Y')_L}{dY_L'}$$

It is important to note that this control signal is defined in both magnitude and polarity.

Approximate, but less preferred, signals representative of the time rates of change of $(C'-Y')_L$ and $Y_L'$ can be derived by utilizing filter circuits to extract corresponding linear combinations of higher order time derivatives of these respective signals, i.e, derivatives of order higher than the first order derivative. The control signal $N_s$ is then obtained by a ratio-producing circuit device. One such approximation may take the following form which represents a more complex linear filter constrained not to spread the step waveforms time beyond the transient epoch $T_s$;

$$N_s = \frac{\sum_{k=1}^{M} A_k d^k/dt^k (C'-Y')_L}{\sum_{k=1}^{M} A_k d^k/dt^k (Y_L')}$$

It is desirable here that M be of low order.

Possible nonlinear filtering is described later in this specification.

(c) Characteristics Of The Control Signals and Inferred High Frequency Components As can be seen by reference to FIG. 1, the ratio $N_s$ exists and is defined within the transient epoch. It is derived from the ratio of two comparably derived and filtered signals, each well defined within the transient epoch.

The inferred high frequency component $(C_H''-Y_H')$ is also constrained to the transient epoch. It contains only those frequency components that exist in $Y_H'$, and it contains those components in the same relative proportions as they are contained in $Y_H'$.

In the specific example of FIG. 1, the general effective chrominance passband is essentially a cosine-squared transform. Its impulse response has the well-known cosine-square shape, and the step response of $(C'-Y_L')$ and $Y_L'$ are essentially one-half cycle of a sine wave over the transient epoch as shown in FIGS. 1(D) and 1(E), respectively. The $Y_H'$ waveform shown in FIG. 1(F) is then the difference between the Y' waveform shown in FIG. 1(C) and the $Y_L'$ waveform illustrated in FIG. 1(E).

Thus all of the component signals processed to generate the step inferred highs control signal $N_s$, as well as the step inferred highs signal itself, $N_s(Y_H')$, are constrained in time to the epoch of the incoming low frequency transient (i.e., $t_3-t_4$).

Since the waveform for $(C_H''-Y_H')$ as shown in FIG. 1(I) tends to zero at both ends, when optional separate time gating means are used, the timing is not critical.

An additional feature of the present invention resides in the fact that the provided signal processing methods and circuits automatically restore the missing inferred high frequency step components in the correct direction or polarity for each chrominance signal and consequently for each color. The need for such polarity correction can best be explained by way of example. Assume that the transmitter signal comprises a step in color from a first color $C_1'$, i.e., [$R_1'$, $G_1'$, $B_1'$ thus defining $Y_1'$ and $Y_1$] to a second color $C_2'$, i.e., [$R_2'$, $G_2'$, $B_2'$ thus defining $Y_2'$ and $Y_2$]. In such a color step transition, the actual luminance step $(Y_2-Y_1)$ is not constrained to be of the same polarity as the step in the monochrome signal $(Y_2'-Y_1')$. It is a feature of the present invention to provide a method and means to render the high and low frequency portion of visible colorimetric measures of such steps in proper polarity.

(d) Waveforms Illustrating Correction Of Reversal Polarity

During a step transient in conventional mixed highs receivers, the high frequency portion $Y_H'$ of the monochrome signal can have only one polarity. While this $Y_H'$ component can be of correct polarity to correct the transient waveform of one color signal, the component can fail to correct another color signal of opposite polarity. Moreover, the amplitude can be incorrect for both.

Figure 2:
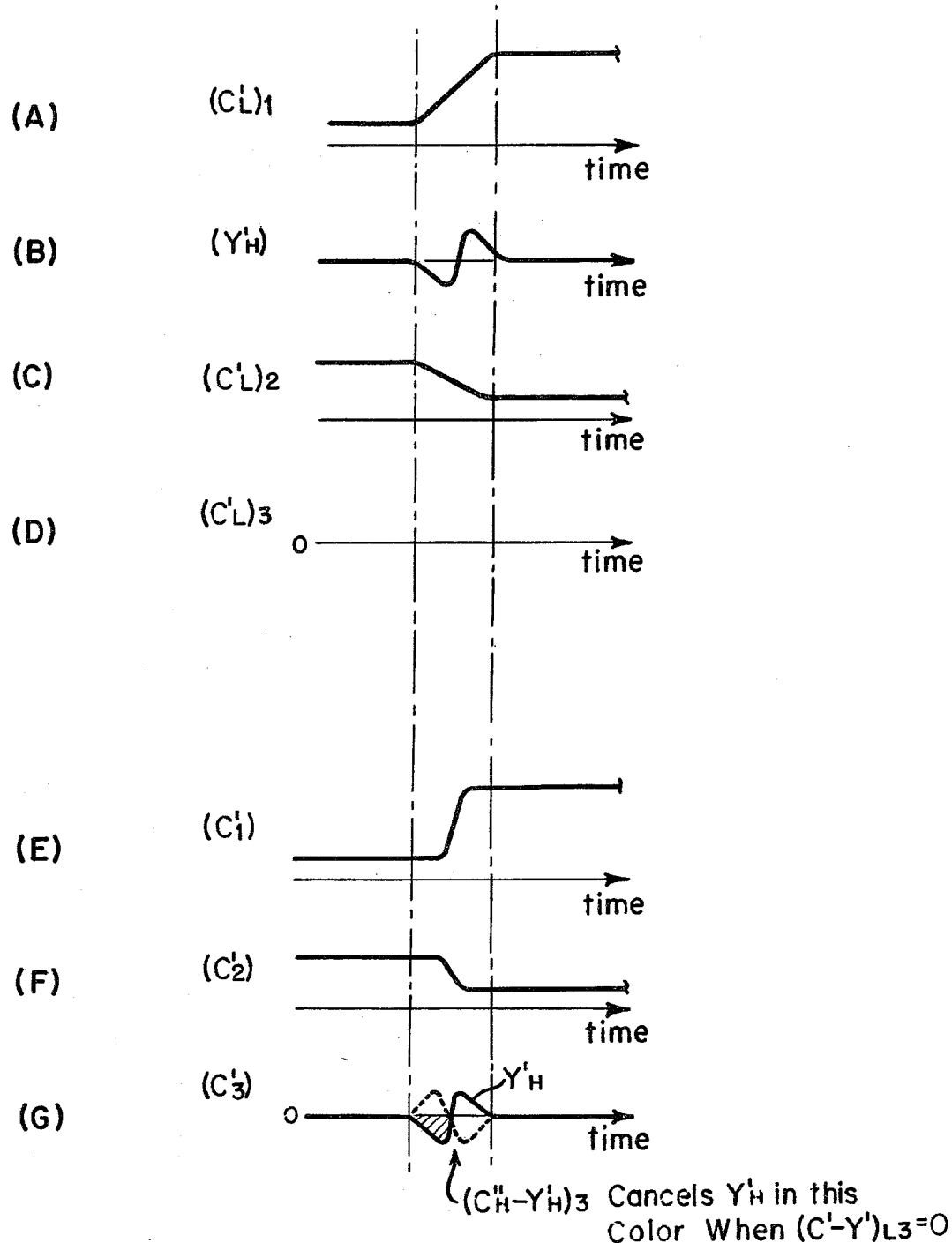
FIGS. 2(A)–(G) are exemplary color television step transient waveforms which illustrate exemplary improvements in transient response and desaturation provided by the invention.

FIG. 2 illustrates waveforms exemplary of the problem of reversed polarity and waveforms appropriate for its correction in accordance with the present invention. More specifically, FIGS. 2A through 2D illustrate the transient waveforms present in the region of a step transient wherein one primary color, designated $(C_L')_1$ in FIG. 2(A), has a positive transition slope; a second primary, designated $(C_L')_2$ in FIG. 2(C), has a negative transition slope; and, for simplicity of illustration, the third primary, designated $(C_L')_3$ in FIG. 2(D), is shown substantially absent and has no substantial time rate of change. The Y' highs, depicted in FIG. 2(C), will, under these circumstances, have the transient polarity characteristic appropriate for one of the two primary color transients, in this case $(C_L')_1$; but will have the polarity characteristic opposite that required to correct the other primary transient, i.e., $(C_L')_2$. Accordingly, the conventional display of these signals will exhibit color infidelities due to polarity reversals, as well as amplitude errors.

In addition, the monochrome highs are added to all color signals in conventional displays. Hence, the monochrome highs would be conventionally added to the absent $(C_L')_3$ signal, with resulting rectification and desaturation of the colors actually transmitted, thus introducing spurious lows in the Y' and Y signals.

FIGS. 2(E) through 2(G) illustrate the improvement in color response provided by the present invention. Because the time rates of change of $(C_L')_1$ and $(C_L')_2$ are different, the polarity characteristics of the respective inferred high frequency components are different and are proper respective polarities and amplitudes to correct both colors. And because the $(C_L')_3$ signal has no substantial time rate of change, no appreciable high frequency component is added with a resultant reduction in rectification and desaturation as compared to conventional receiving systems.

The transient waveforms shown in FIGS. 1 and 2 will be appropriately referred to hereinafter in connection with the explanation of the signal processing circuits shown in the remaining Figures.

Figure 3:
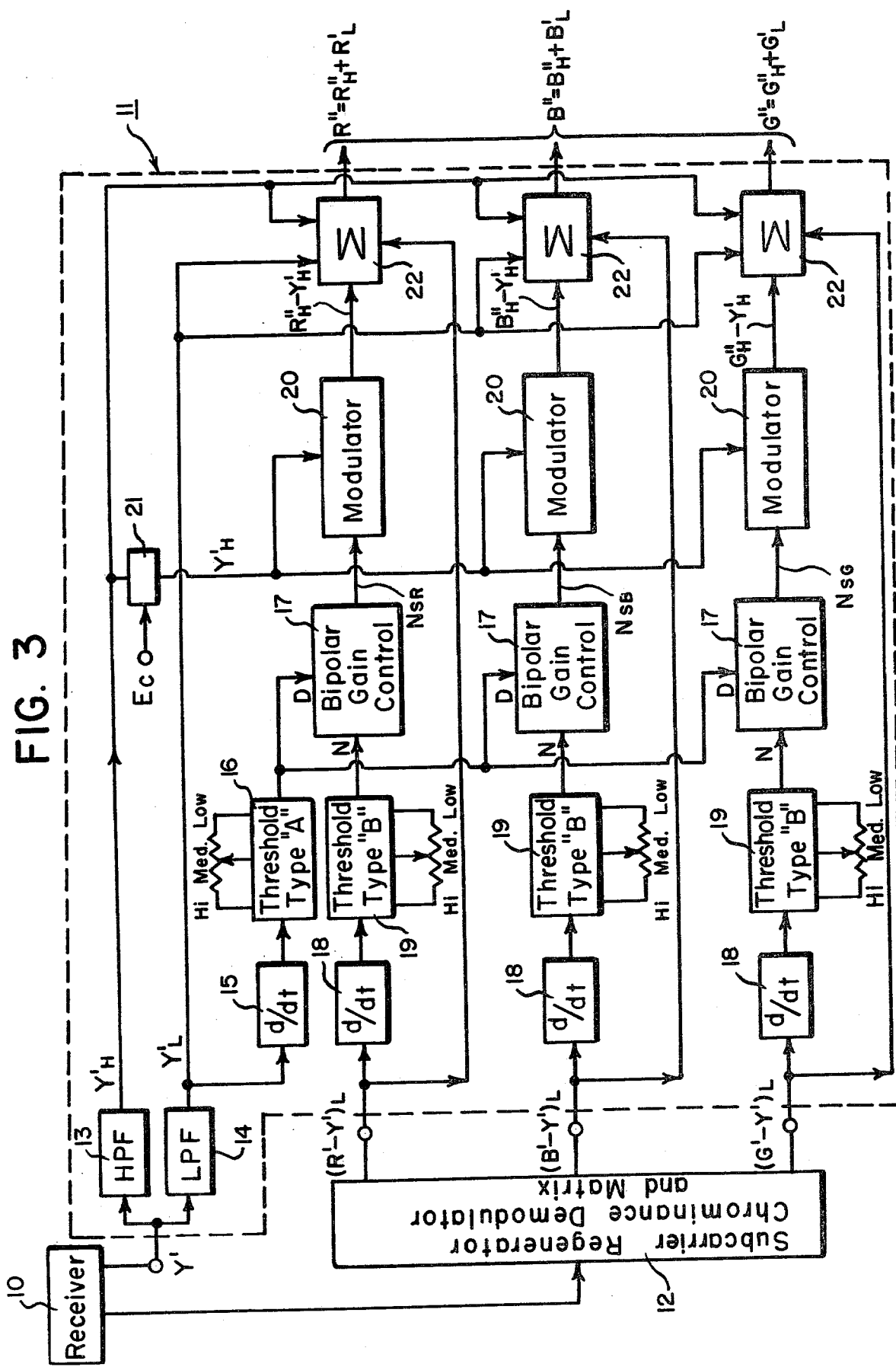
FIG. 3 is a block diagram of an equiband receiver having an inferred step highs signal processing circuit.

(e) Equiband Receiver With Inferred Step Highs Correction Circuitry (FIG. 3)

FIG. 3 is a simplified block diagram of one embodiment of an equiband receiving system in accordance with the invention comprising an equiband receiver 10 and an inferred step highs processing circuit denoted generally by 11.

Receiver 10, which can be a conventional equiband receiver including standard chrominance demodulator circuits and matrix circuits 12, provides the monochrome video signal Y' and a plurality of reduced bandwidth chrominance signals. Typically, it will provide three such signals $(R'-Y')_L$, $(B'-Y')_L$, and $(G'-Y')_L$ comprising color difference signals based on the respective primaries of red, blue, and green. However, the receiver need provide only two such signals defining a chrominance axis for complete correction, provided appropriate matrixing circuitry is included in processing circuit 11. If only one chrominance signal is processed, a lesser degree of correction can be obtained.

Inferred step highs processing circuit 11 comprises band splitting circuitry responsive to the monochrome video signal Y' for dividing the monochrome signal into a low frequency portion $Y_L'$, comparable in bandwidth and frequency range to the reduced bandwidth chrominance signals, and a substantially complementary high frequency component $Y_H'$. In the embodiment of FIG. 3, this band splitting is effected by high pass filter 13 and low pass filter 14. The bandwidth of the low pass filter is selected to match that of the reduced bandwidth chrominance channels, and the bandwidth of the high pass filter is chosen to be substantially complementary to filter 14. For example, if the monochrome signal Y' has a bandwidth of about 3 megahertz, the reduced bandwidth chrominance signals may have a bandwidth of about 0.5 megahertz. Thus, the bandwidth of high pass filter 13 typically extends from about 0.5 megahertz to an upper cutoff of about 3 megahertz, and the bandwidth of low pass filter 14 extends up to about 0.5 megahertz.

Processing circuit 11 also comprises circuitry responsive to one or more reduced bandwidth chrominance signals and to respective comparable low frequency monochrome components for separately processing for each reduced bandwidth chrominance signal, a control signal representative of the ratio of the time rate of change of the reduced bandwidth chrominance signal to the time rate of change of the respective comparable low frequency monochrome component. In FIG. 3, this processing is effected by supplying $Y_L'$ from filter 14 to a time differentiation circuit 15. The output of differentiating circuit 15 is, in turn, supplied through adjustable A-type threshold device 16 to the denominator inputs D of ratio circuits 17, such as bipolar gain control devices. The reduced bandwidth monochrome signals are supplied to respective time differentiating circuits 18, and the respective differentiated output signals are supplied, through respective adjustable type-B threshold devices 19, to the numerator inputs of respective ratio circuits 17. The outputs of the respective ratio circuits are separate control signals, $N_s$, separately representative of the ratio of the time rate of change of the reduced bandwidth chrominance signal to the time rate of change of the comparable bandwidth monochrome component for each chrominance channel.

Figure 4A:
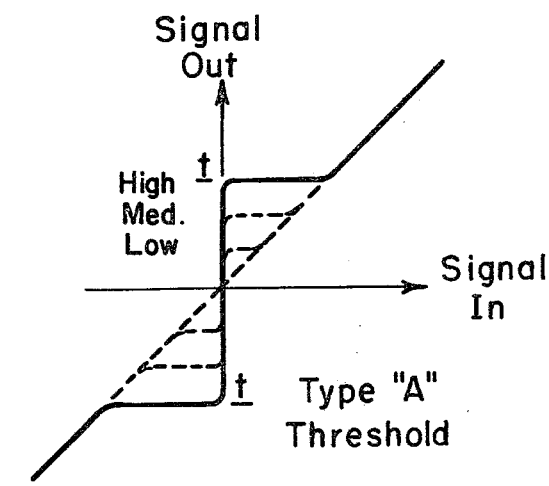
FIGS. 4(A)–(B) are graphical representations illustrating the transfer characteristics of a type-A threshold device and a type-B threshold device, respectively.

As indicated, in a preferred signal processing circuit, an adjustable type "A" threshold circuit 16 is advantageously utilized as a non-linear constraint on the denominator signal $d/dt(Y_L')$ supplied to the denominator inputs D of ratio circuits 17. The function of this threshold in operation of the circuit is to prevent the processing of unduly high control signals when the magnitude of the rate of change of a low frequency monochrome component falls below a predetermined minimum value. The threshold level is optionally selectable over a range of low, medium, and high minimum values. A suitable transfer characteristic for a type-A threshold device is shown in FIG. 4A.

Figure 4B:
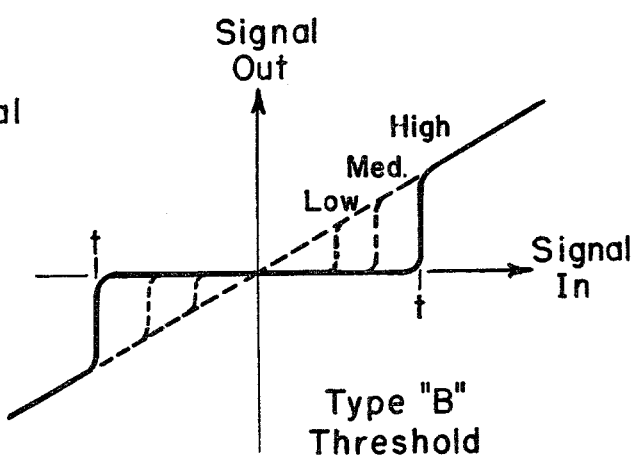

Type-B threshold devices 19 are preferably used as non-linear constraints on the numerator signals $d/dt(C'-Y')_L$ supplied to the numerator inputs D of ratio circuits 17. The function of these thresholds is to prevent unneeded corrections when the magnitude of the rate of change of a reduced bandwidth chrominance signal falls below a predetermined minimum value. The threshold level is optionally selectable over a range of minimum values, and a suitable transfer characteristic is shown in FIG. 4(B). If desired, the B-type threshold can be omitted or effectively adjusted to such a low threshold value as to render the overall transfer characteristic linear.

Processing circuit 11 further comprises circuitry for scaling inferred high frequency step correction components from the high frequency portion of the monochrome signal in accordance with the above-described ratio signal. In this embodiment, the scaling is effected by modulators 20 which can preferably be a four quadrant multiplier. The complementary high frequency portion $Y_H'$ of the monochrome signal is applied, through selectable gain control element 21, to the input terminals of modulators 20, and the control signals froom respective ratio circuits 17 are applied to the gain control terminals of respective modulators in order to process separate inferred high frequency correction components for each chrominance input.

Selectable gain control element 21, operatively controlled by a control signal $E_c$ is advantageously provided as a means for adjusting the amplitude of the inferred high frequency correction components. Where desired, element 21 can be an enabling switch operatively controlled by a time gating signal $E_c$ coordinated in time with the low frequency transient epochs in order to constrain the time derivation of the inferred high frequency components to the desired epoch intervals. Specifically, element 21 can perform any one or more of the following functions:

(a) it can provide a constant transfer gain of unity;
(b) it can provide a constant selectable voltage controlled gain control;
(c) it can respond to a time gated enabling signal in $E_c$ to selectively turn on the inferred step highs processing circuitry only during the epochs of detected step transients;
(d) it can respond to an enabling signal during longer epochs in which there is no signal condition contrary to operation of the step mode; and
(e) it can respond to a disabling signal in $E_c$ to selectively deactivate the inferred step highs processing circuitry during any time epoch when signals incompatible with the existence of steps are detected.

Those skilled in the art will recognize that selectable gain control devices can be located at various positions in the processing circuit for permitting effective amplitude control over inferred components in one or more desired channels. For example, the gain control effected by element 21 could be applied by elements in series anywhere in the sequence from the chrominance lows input terminals to the inferred highs output terminals. Alternatively, such control could be effected as an inverse control in the sequence from $Y_L'$ to the numerator signal of the ratio circuits.

Conventional means (not shown) are provided for time equalization of $Y_H'$, $Y_L'$ and the reduced bandwidth chrominance signals so that the respective transient epochs are all time coordinated as shown in FIG. 1.

In one form, complementary filters $Y_H'$ and $Y_L'$ may be formed from signals summed from sets of taps on a tapped delay line which then also provides the chrominance channel delay equalization to the $Y''$ signal.

The final operative portion of processing circuit 11 comprises circuitry for effectively combining the inferred high frequency correction components with the signal to be displayed. In the embodiment of FIG. 3, the inferred high frequency chrominance components are combined with the respective reduced bandwidth chrominance signals, the monochrome highs and the monochrome lows in respective summing circuits 22 to produce respective corrected primary color output signals of the form $C''=C_H''+C_L$. These corrected color signals are provided to the receiver display (not shown).

In a preferred form of the invention, only two of the inferred step chrominance high signals ($R_H''-Y_H'$), ($B_H''-Y_H'$) and ($G_H''-Y_H'$) need be generated, with the third such being derived from the first two by a conventional linear matrix in accordance with the equation $\Sigma A_c(C_H''-Y_H')=0$.

Figure 5:
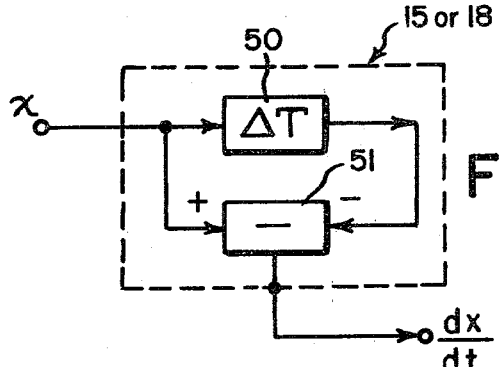
FIG. 5 is a block diagram of a preferred differentiating circuit for use in an inferred step highs processing circuit.

(f) Exemplary Circuit Components (FIGS. 5 and 6)

All of the above-named circuit elements including type-A and type-B threshold devices, differentiating circuits, ratio circuits and modulators are standard available signal processing components; and, in all cases, it is contemplated that the entire processing circuit can be manufactured as a small, low-cost integrated circuit chip, either separately or in combination with other receiver processing circuits.

While a number of differentiating circuits can be used, FIG. 5 illustrates a differentiating circuit 15 preferred for use in the receiving system of FIG. 3 comprising a delay line 50 having a delay which is small compared to the high frequency time epoch of a typical chrominance step, and a subtraction circuit 51. This circuit effectively computes the difference between an input signal at the time $(t+\Delta t)$ and the input signal at the time t. If similar circuits are used for processing the differential signals for both the chrominance and the monochrome lows, the ratio of the output signals is representative of the ratio of the first order time derivatives. The advantage of this differentiating circuit over simple capacitance-resistance differentiating circuits is that this circuit passes the DC value of each voltage difference.

Figure 6A:
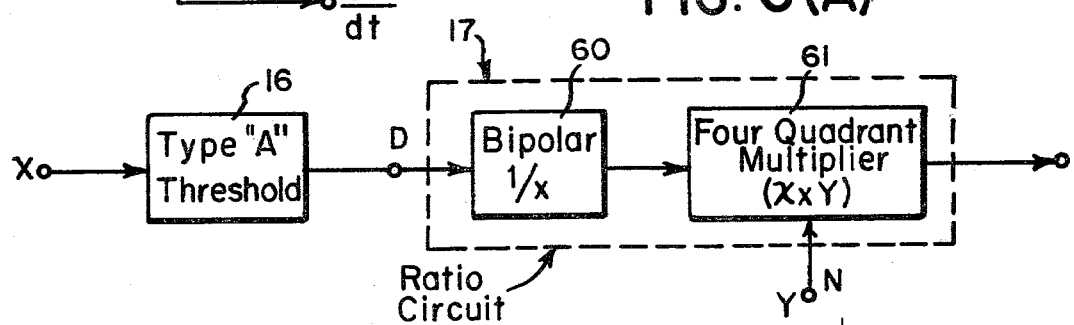
FIG. 6(A)–(C) pertain to preferred ratio circuits for use in inferred step highs processing circuits.
Figure 6C:
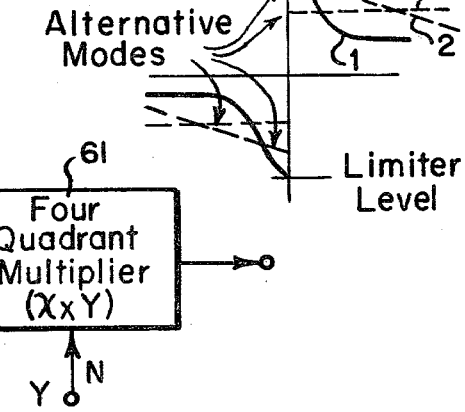
Figure 6B:
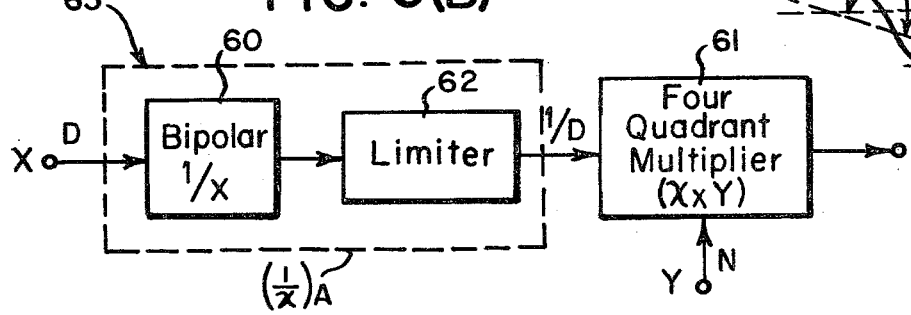

FIGS. 6(A) and 6(B) illustrate alternative circuits to 16 and 17 for use in the receiving system of FIG. 3. In using the FIG. 6(A) circuit, the denominator signal D is first applied to a type-A threshold 16 before it is applied to the input terminal of a ratio circuit 17 comprising bipolar amplifier 60 having a reciprocal or inverse transfer characteristic of the form $1/X$ where X is the thresholded input; the numerator signal N is applied to one input of a four quadrant multiplier 61, and the other input of the multiplier is connected to the output of bipolar amplifier 60. Alternatively, as in the multiplier equivalent processor of FIG. 6(B), the denominator signal D is inverted in element 60 and limited in maximum excursion by high level limiter 62. The combination designated 63 is termed a $(1/x)_A$ element. Its output is supplied to multiplier 61 which is also supplied with numerator signal N. Normally the circuits of FIG. 6(A) and 6(B) can provide comparable performance and are interchangeable.

FIG. 6(C) illustrates the transfer characteristics for varying degrees of accuracy of operation using the FIG. 6(B) circuit for illustration. The mode of curve 1 would produce performance equivalent to the FIG. 6(A) circuit with ideal FIG. 4(A) performance. Operation in the mode of curve 2 effects some correction in the proper polarity, but is relatively less accurate in magnitude. The mode of curve 3 would translate only polarity.

Figure 7:
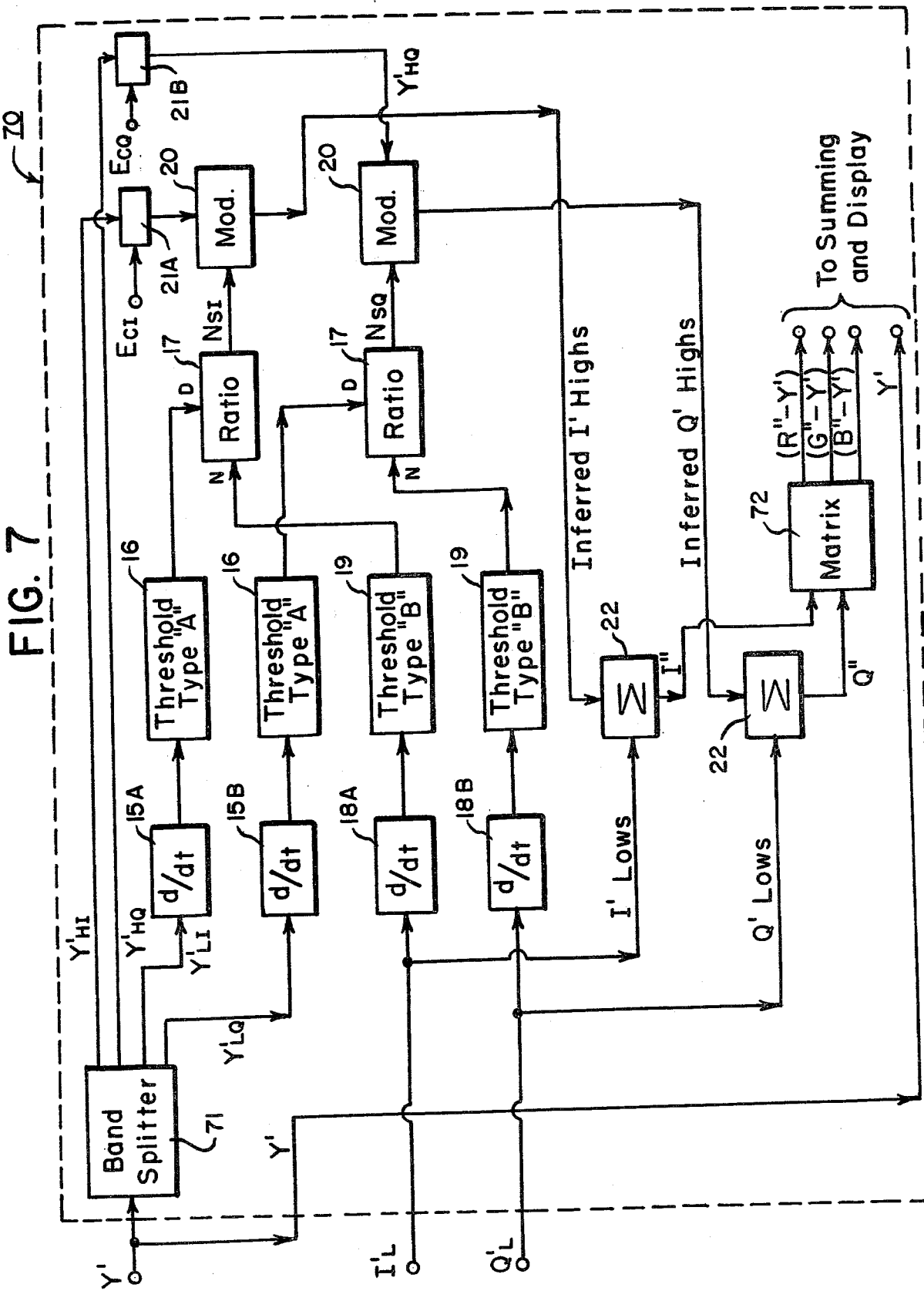
FIG. 7 is a block diagram of an unequal bandwidth I' and Q' color receiver having an inferred step highs processing circuit.

(g) Unequal Band Receiver With Inferred Step Highs Correction Circuitry (FIG. 7)

FIG. 7 illustrates inferred step highs correction circuitry 70 for use in an unequal band color television receiving system utilizing two unequal band reduced bandwidth chrominance signals, specifically an $I_L'$ chrominance signal having a bandwidth of $f_{IL}$ and a $Q_L'$ chrominance signal having a smaller bandwidth of $f_{QL}$. All of the constituent circuit elements, including differentiating circuits, threshold devices, ratio circuits, and modulators are the same in operation as those devices described in FIG. 3, above.

In the circuit of FIG. 7, the wideband monochrome signal Y' is supplied to band splitter 71 wherein it is effectively divided into two pairs of frequency band components. Specifically, it is divided into two overlapping low frequency components $Y'_{IL}$ and $Y'_{QL}$ having bandwidths comparable to those of the reduced bandwidth I' and Q' chrominance signals, and it is divided into respective overlapping complementary high frequency components $Y'_{IH}$ and $Y'_{QH}$. The high frequency monochrome components $Y'_{HI}$ and $Y'_{HQ}$ are supplied, through respective selectable control devices 21A and 21B, to the inputs of respective inferred highs modulators 20.

The low frequency monochrome components and the reduced bandwidth I' and Q' chrominance signals are supplied through respective differentiating circuits 15A, 15B, and 18A and 18B, to appropriate respective thresholds 16 and 19, and thence to the denominator and numerator input terminals, respectively, of respective ratio circuits 17 in order to process control signals for the I and Q chrominance axes.

The outputs of ratio circuits 17 are applied to the gain control terminals of modulators 20 wherein inferred high frequency step correction components for the I' and Q' chrominance signals are scaled from the respective complementary high frequency portions in accordance with respective ratios representative of the ratio between the time rate of change of the respective reduced bandwidth chrominance component and the time rate of change of the respective comparable low frequency monochrome component.

The inferred step highs correction components from the outputs of modulators 20 are combined with the signals to be displayed by summing them with the respective reduced bandwidth I' and Q' signals in summing circuits 22, and matrixing the supplemented signals, designated I'' and Q'' in matrix 72 to produce supplemented color difference chrominance signals (R''−Y'), (G''−Y'), and (B''−Y') which are then conventionally processed for display.

As in the FIG. 3 embodiment, means (not shown) are provided for equalizing the respective signal component delay times so that all transition epochs are time coordinated, and the selectable gain control elements 21(A) and 21(B) can be operatively controlled by respective control signals $E_{cQ}$ and $E_{cI}$ which can functionally serve as timing, enabling or disabling switches.

Alternative embodiments with correction in only one of the chrominance axes are possible, but such arrangements would secure a commensurately smaller portion of the improvements of the invention.

Figure 8:
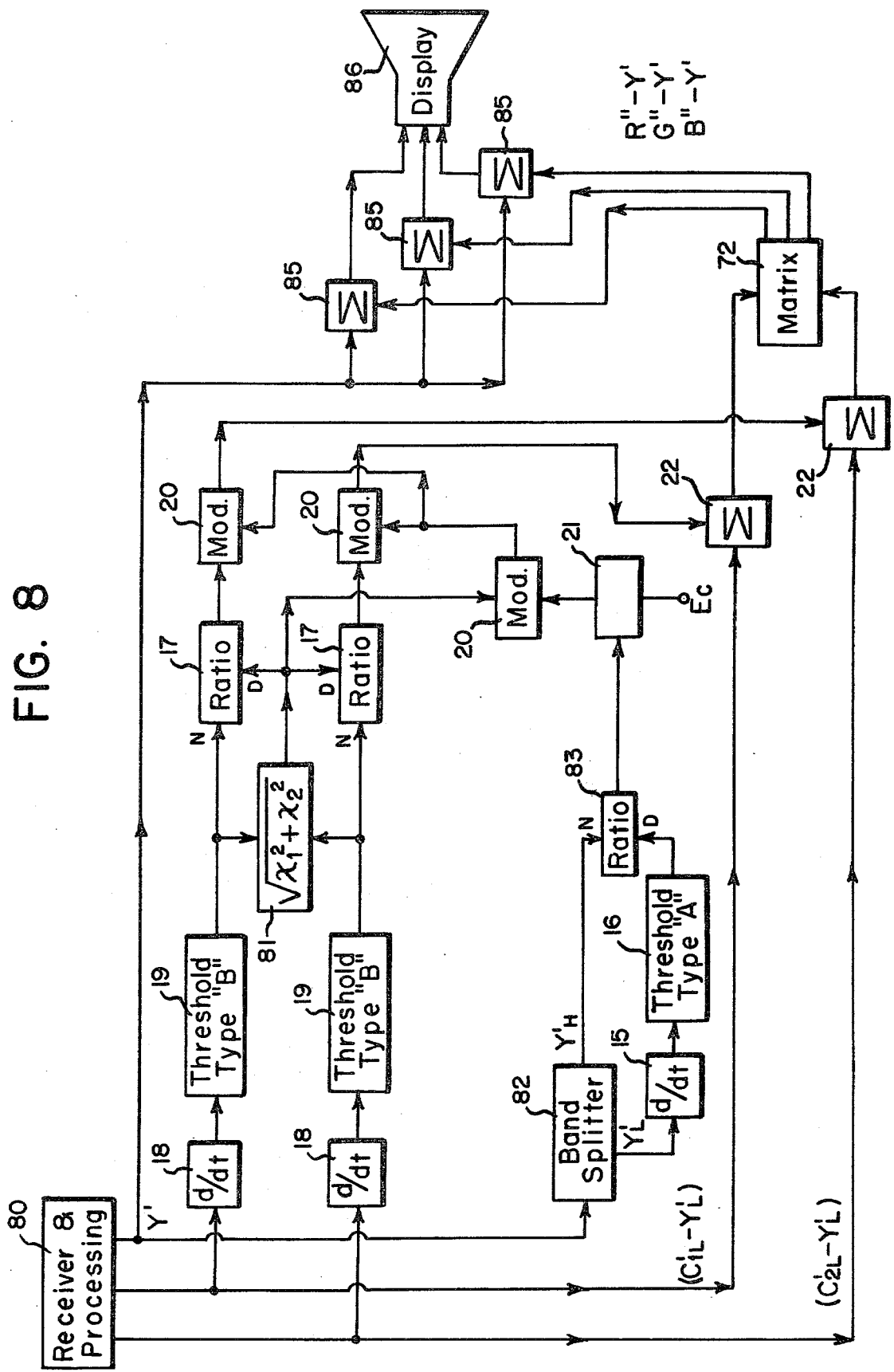
FIG. 8 is a block diagram of a color receiver having an inferred step highs processing circuit on an adaptive axis.

(h) Receiver With Inferred Highs Step Correction Circuitry On An Adaptive, Time Varying Single Chrominance Axis (FIG. 8)

FIG. 8 illustrates an alternative embodiment of the invention which can be termed an adaptive axis processor. In this embodiment, a plurality of chrominance signals defining quadrature chrominance axes from a receiver 80 are applied to respective differentiating circuits 18 to produce output chrominance rate of change signals. These output signals, in turn, are applied through optional type-B thresholding circuits 19 to the input terminals of root-sum-squares circuit means 81 for processing a chrominance rate magnitude signal equal to the square root of the sum of the squares of the input chrominance rate of change signals. Each chrominance rate of change signal is also applied to the numerator input terminals of respective ratio circuits 17, and the output signal of circuit 81 is applied to the denominator input of each respective ratio circuit. The outputs of the respective ratio circuits 17 are respective chrominance rate of change signals normalized with respect to the rate of change signals on the adaptive chrominance rate axis.

The monochrome signal Y' is applied to band splitter 82 wherein it is split into a low frequency portion $Y'_L$ comparable to the chrominance signals and a complementary high frequency portion $Y'_H$. The Y' highs are applied to the numerator input terminal of a ratio circuit 83, and the Y' lows are differentiated in differentiating circuit 15 and, through type-A threshold 16, the resulting Y' lows rate of change signal is applied to the denominator input terminal of ratio circuit 83. The resultant thresholded ratio of the Y' highs to the rate of change of the Y' lows is applied through selectable gain control device 21 to modulator 20 along with the output of circuit 81 to provide an output product signal. This product signal is, in turn, used to modulate the chrominance signals from respective ratio circuits 162 in respective modulators 20, thereby canceling the root-sum-squares factor to produce respective inferred high frequency step correction components in accordance with the invention.

The resulting inferred components are combined with the chrominance lows in summing circuits 22. The supplemented signals are matrixed in matrix circuit 72 to define the third chrominance signal, and the three chrominance signals are combined with the Y' signal in additional summing circuits 85 in order to obtain corrected primary color signals for display 86.

An optional chrominance rate contour threshold circuit (not shown) can be disposed between the output of element 83 and control element 21 in order to effectively disable the correction circuit in the absence of a chrominance rate of change signal which fails to exceed the bounds of a pre-selected chrominance rate of change contour.

Figure 9:
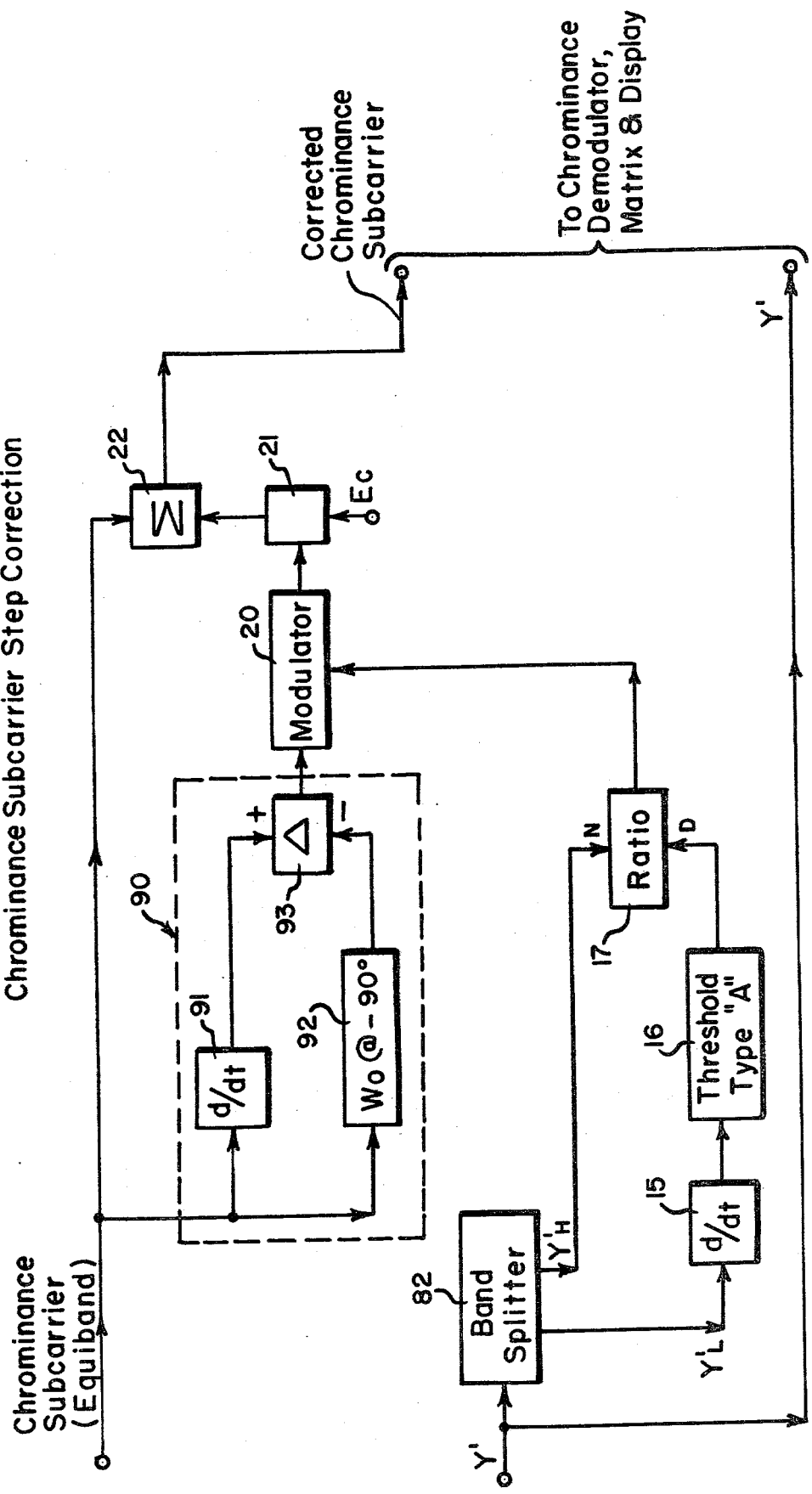
FIG. 9 is a block diagram of a color receiver having an inferred step highs processing circuit for providing correction of the chrominance signals on the subcarrier.

(i) Receiver With Inferred Highs Step Correction On The Subcarrier (FIG. 9)

FIG. 9 illustrates inferred high frequency step correction circuitry for providing chrominance step correction while the chrominance signals are on a subcarrier. A chrominance subcarrier comprising the I' and Q' chrominance signals in quadrature is provided by a receiver (not shown) and applied to subcarrier differentiating circuit 90 for differentiating with respect to time the chrominance signals on the subcarrier. In a preferred form of the invention, circuit 90 comprises a differentiating circuit 91 for differentiating the subcarrier signal, a phase delay circuit 92 for multiplying the subcarrier by $W_o$ and for providing it with a 90° phase delay, and a subtracting circuit 93 for subtracting the output of the phase delay circuit from the output of the differentiating circuit. Such a circuit has the effect of differentiating the I' and Q' signals on the subcarrier without altering the subcarrier phase. The thus-differentiated subcarrier signal is applied to one input terminal of modulator 20.

The operation of subcarrier differentiation circuit 90 may be explained by reference to the following algebraic demonstration wherein the chrominance on subcarrier signal S is of the form:

$S = a \cos W_o t + b \sin W_o t$
$= \sqrt{a^2 + b^2} \cos (W_o t + \arctan b/a)$, wherein a and b represent chrominance signals. Since $$\frac{dS}{dt} = \left[\frac{da}{dt}\cos W_o t + \frac{db}{dt}\sin W_o t\right] + W_o[-a\sin W_o t + b\cos W_o t],$$

and the latter term reduces to $$W_o[a\cos(W_o t - 90°) + b\sin(W_o t - 90°)]$$

then $da/dt \cos W_o t + db/dt \sin W_o t = d/dt[a \cos W_o t + b \sin W_o t] - W_o[a \cos (W_o t - 90°) + b \sin (W_o t - 90°)] = d/dt\, S - W_o S(W_o - 90°)$.

The monochrome signal Y' is applied to band splitter 82 wherein it is split into a low frequency portion $Y_L'$ comparable in bandwidth to that of the chrominance signals and a complementary high frequency portion $Y_H'$. The Y' lows are differentiated in time differentiation circuit 15, and the resulting Y' lows rate of change signal is applied, through type-A threshold 16 to the denominator input terminal of ratio circuit 17. The Y' highs are applied to the numerator input of the ratio circuit, and the resulting ratio signal is applied to the other input terminal of modulator 20.

The output of modulator 20 is an inferred high frequency step correction signal which is directly proportional to the product of (1) a signal comprising time differentiated reduced bandwidth chrominance signals, (2) the high frequency portion of the monochrome signal exceeding the bandwidth of the chrominance signals and is inversely proportional to the time differentiated Y' lows. This correction signal is applied through selectable gain control device 21, to summing circuit 22 wherein it is combined with the unaltered subcarrier and subsequently transmitted on for conventional processing for display.

Figure 10:
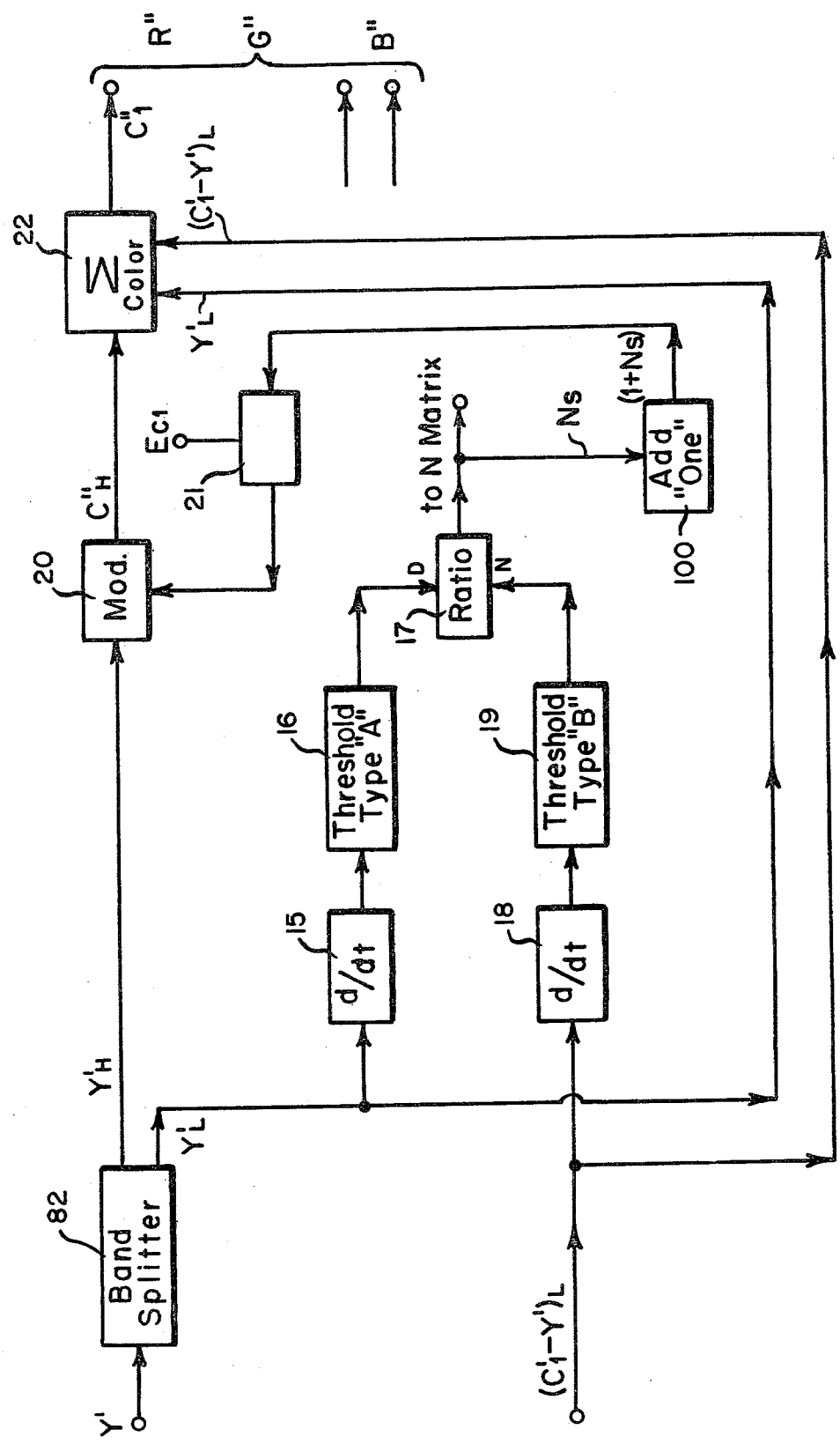
FIG. 10 is a simplified block diagram of a color receiver having inferred step highs correction circuitry for processing color correction signals from the chrominance signals.

(j) Receiver With Inferred Step Highs Color Correction Signal Processed From Chrominance Signals (FIG. 10)

FIG. 10 illustrates a further embodiment in which a chrominance signal $(C'-Y')_L$ is supplied from the receiver (not shown) to the numerator input N of the ratio circuit 17 through differentiator 18 and optional "B" type threshold 19. The low frequency monochrome signal $Y_L'$ from band splitter 82 is supplied to the denominator input D of ratio circuit 17 through differentiator 15 and type "A" threshold 16, as shown. Circuit 17 generates an output gain control signal $N_s$ proportional in amplitude to the ratio of the derivative signals supplied to the N and D input terminals.

Signal $N_s$ is supplied to an "add-one" circuit 100 which generates and supplies the desired gain control signal $(1+N_s)$ to modulator 20 through control element 21. Modulator 20 generates the desired step inferred highs signal $C_H''$ which is summed at summing circuit 22 with $Y_L'$ and chrominance signal $(C'-Y')_L$ to produce the desired supplemented color signal $C_1''=C_H''+C_{1L}'$. Similar circuitry can be provided for correcting each of the other required primary colors, resulting in fidelity to $Y_H'$.

In this form of processor, an inferred color highs signal $C_H''$ is added to color lows comprising $[(C'-Y')_L+Y_L']=[(C'-Y_L')+Y']-Y_H'$. The net added signal is the inferred chrominance highs $C_H''-Y_H'$.

Figure 11:
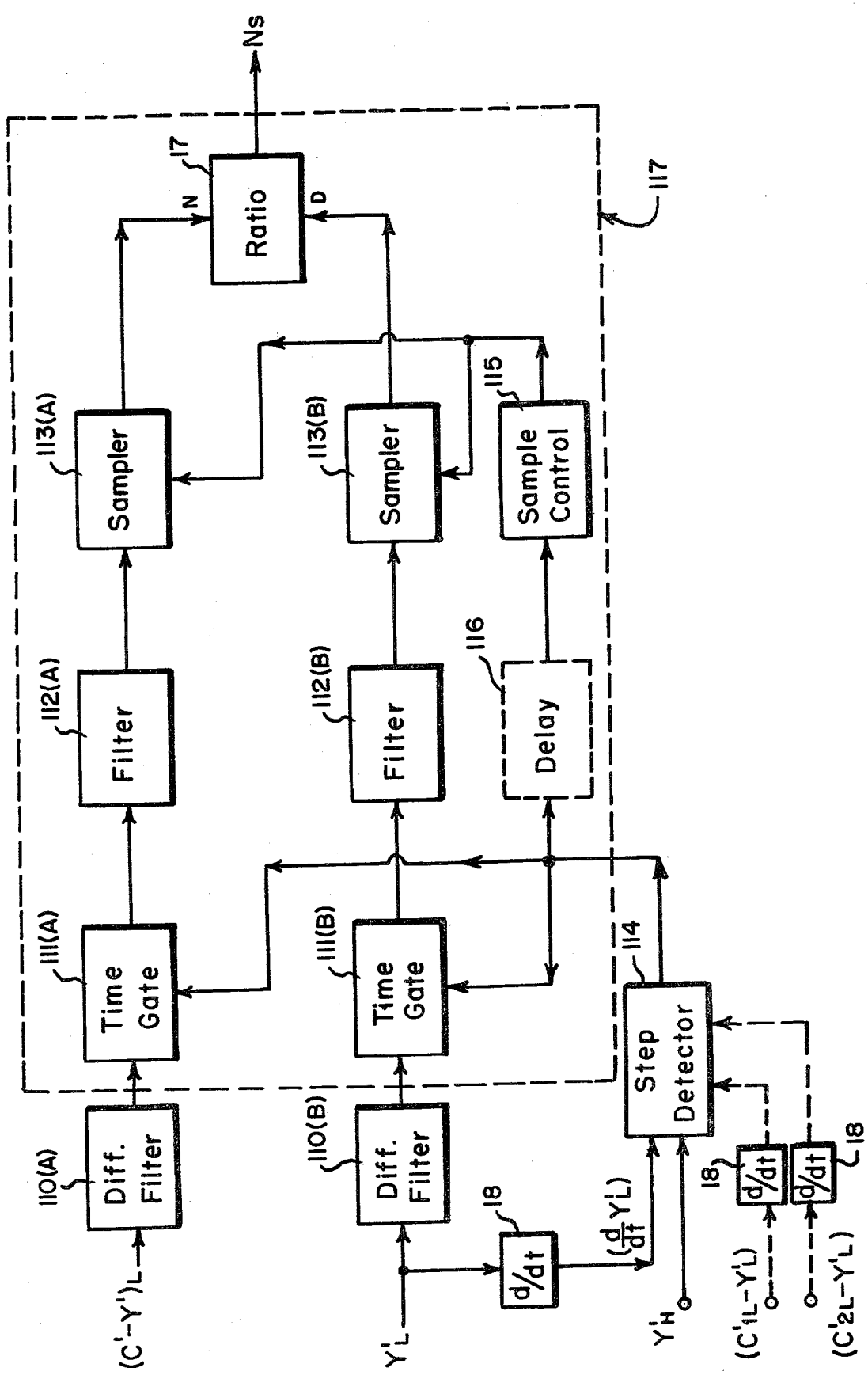
FIGS. 11 and 12 are simplified block diagrams of optional signal processing circuitry for generating inferred step highs control signals.
Figure 12:
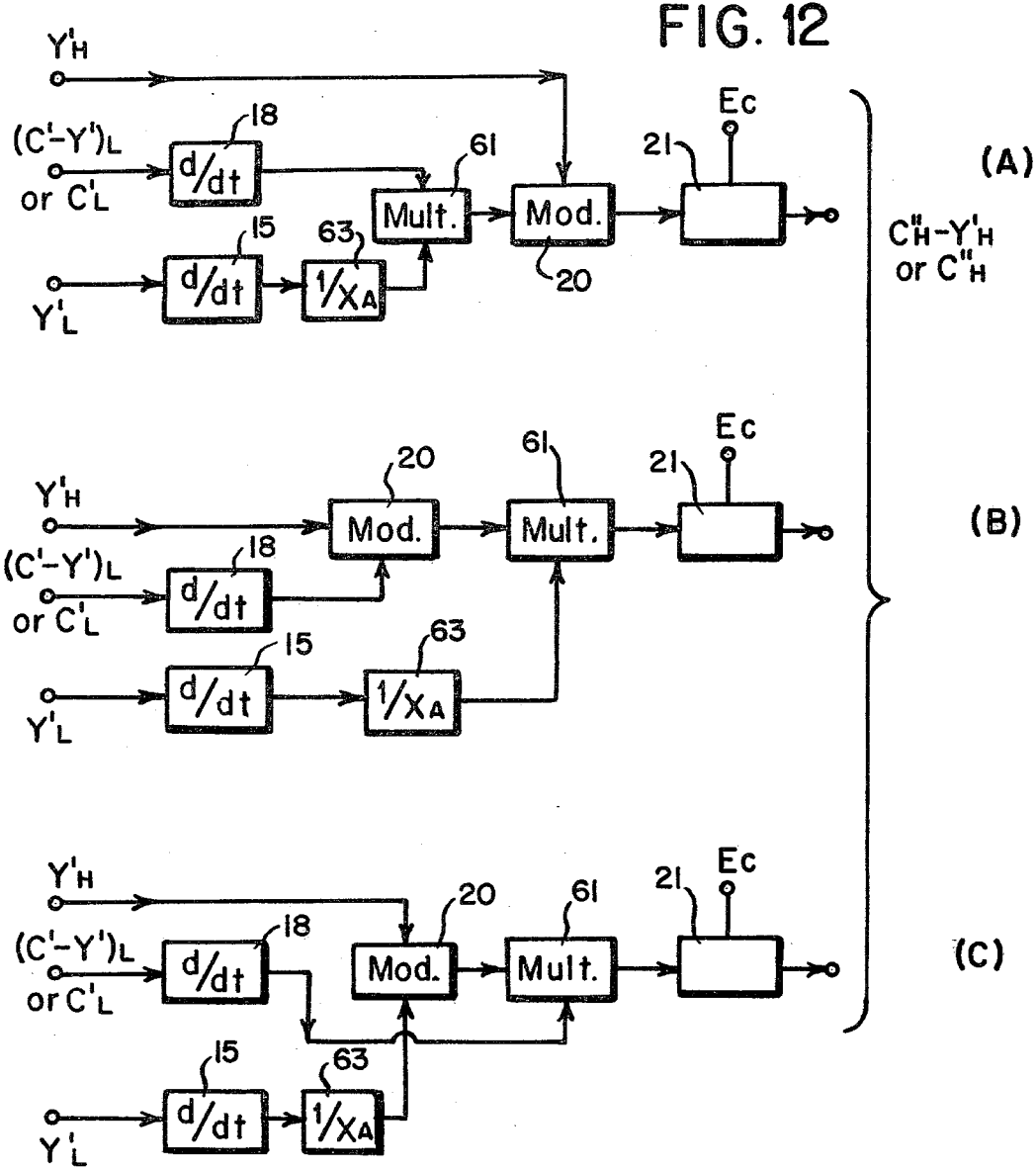

(k) Circuitry For Processing Alternative Forms of Inferred Step Highs Correction Components (FIGS. 11 and 12)

As stated in the underlying principles of the invention, the step highs correction control signal, $N_s$, can be any signal representative of the ratio between the time rate of change of a reduced bandwidth chrominance signal and the rate of change of the monochrome lows. This signal may be derived in a plurality of ways.

FIG. 11 illustrates circuitry in which a broader class of filtering processes may be used in deriving a control signal for scaling $Y_H'$ to $C_H''-Y_H'$ during a step. The specific features illustrated include time gating of differentiated input signals, and use of less restricted matched pairs of frequency filters in a sampled system. In this circuit, the chrominance signal $(C'-Y')_L$ is supplied to the input of differentiating filter 110(A) and thence to the input of time gate 111(A), the output of which is supplied through filter 112(A) and sampler 113(A) to the numerator input N of ratio measuring element 17.

Similarly, $Y_L'$ is supplied to the input of a differential filter 110(B) and thence to the input of a time gate 111(B), the output of which is supplied through a filter 112(B) and sampler 113(B) to the denominator input of ratio circuit 17.

Preferably, filters 110(A) and 110(B) do not spread the signals significantly in time.

The circuit includes as gating means a step detector to which are supplied $Y_H'$ and $d/dt\, Y_L'$ through element 18. Optional confirming concurrent signals responsive to one or more chrominance rate signals may be also supplied through comparable elements 18. The step detector provides a step enabling and timing signal [[$\beta_s$]] during a detected step.

Preferably, the precise and reliable wide band step existence decision circuitry presented subsequently in this specification may be used. Concurrently or minimally, circuit means responsive to the exceeding of a threshold by a color-rate-space contour may be used.

The output pulse from step detector 114 gates time gates 111A and 111B during at least a portion of the epoch $T_s$, the outputs of which feed filters 112A and 112B. These filters are merely required to have comparable responses to comparable signals; over the range of relevant step amplitudes, the sampled output should vary monotonically and preferably linearly with input step amplitude.

If the filters have responses which spread in time, they must either have stored energy discharged (by keying, not shown) after readout, or replicative circuits may be used where processing of contiguous steps is desired.

The output pulse from step detector 114 also keys sample control circuit 115 through time delay equalizer 116. The output sampling signal of 115 activates samplers 113(A) and 113(B) to provide measured amplitude samples over the epoch of each step transient in the chrominance and monochrome input signals. These are compared in ratio device 17 to generate $N_s$ over a period $T_s$.

In the event that filters 112(A) and 112(B) tend to spread in time the signals passing therethrough, the time gated input constrains the system to respond to comparable components and only during the desired step epochs, while the output sampling circuit constrains the subsequently processed control signal to a transient epoch of duration $T_s$. This control signal is delayed, Concurrence with $Y_{H}'$ is provided by separate delay equalization (not shown), in generation of $C_{H}'' - Y_{H}'$.

Filters 112(A) and 112(B) can be high pass differentiating filters. Each can produce a time response comprising one or more derivatives of the input signals in arbitrarily selected ratios common to the chrominance and monochrome channels. Such signals can be defined in the frequency domain by a power series having coefficients derived from the coefficients of the time domain derivative series. They may also include non-linear elements so long as the sample ratio which appears in the control signal $N_s$ remains generally proportional to the relative amplitude and polarity of the signal components at the input in accordance with the teachings of this invention. Thus element 117 comprises circuit means for generating $N_s$ which includes time gating before waveform generation.

FIGS. 12(A) through 12(C) illustrate circuitry for processing inferred high frequency correction components in alternative combinatory sequences. In the circuitry of FIG. 12(A), the monochrome lows rate of change signal is inverted by inverter circuit 63 and multiplied by the chrominance or color lows rate of change signal in multiplier 61 before the resulting product signal is used to modulate the Y' highs.

In the circuitry of FIG. 12(B), the monochrome highs are initially modulated by the chrominance or color lows rate of change signal and the thus-modulated highs are multiplied by the inverted monochrome lows rate of change signal.

And in the circuitry of FIG. 12(C), the monochrome highs are first modulated by the inverted monochrome lows rate of change signal and then multiplied by the chrominance or color lows rate of change signal.

All of the above variations can be made to produce substantially the same inferred high frequency correction components.

(1) Receiving System With Automatically Controlled Inferred High Frequency Step Correction Circuitry (FIGS. 13, 14 and 15)

FIG. 13(A) is a simplified block diagram of a receiving system employing automatically controlled inferred high frequency step correction circuitry. Specifically, receiver 10 supplies the monochrome video signal, through a band splitter 71, to a circuit 131, called a step wideband mode decision circuit; it supplies the monochrome signal and a plurality of chrominance signals to inferred step highs correction circuit 11, which can be any one of the several embodiments described hereinabove, and it supplies such video components as are required to the signal combining and display circuit 130. Advantageously, the correction circuit 11 includes one or more internal thresholds 132 requiring chrominance rates of change in excess of a selectable threshold value for enablement.

FIG. 13(B) illustrates a multi-dimensional color-space-rate threshold circuit 132 preferred for the circuit of FIG. 13(A). This threshold comprises a non-linear matrix circuit 133 for receiving one or more chrominance rate of change signals from differentiators 18 and, optionally, the differentiated monochrome lows from differentiator 15. The matrix circuit processes these rate of change signals into a non-linear combination representative of a multi-dimensional contour in chrominance rate space. The matrix circuit can, for example, process a weighted sum of squares representative of a low order contour or a more complex non-linear combination representative of a more complex contour. The output of matrix 133 is then applied to a simple type-B threshold device 16 and an optional limiter 134. If the combined rate of change signals exceed a pre-selected value, threshold circuit 16 produces an output signal which can be conveniently limited to a unity enabling signal by limiter 134. If the combined rate signals fall below the threshold, the correction circuitry can be disabled. Threshold circuit 132 can be conveniently coupled into correction circuit 11 through the control elements 21 (not shown in FIG. 13(A)).

Mode decision circuit 131 comprises step mode decision means responsive to a plurality of portions of the received monochrome video signal for producing an output generally indicating the presence of components either (1) characteristic of a step, (2) compatible with a step, or (3) incompatible with a step and circuitry for processing such output signals into desired mode control signals suitable for effectuating a mode decision through control elements such as 131(A) and 131(B).

In FIG. 13A the signals from 71 to 131 comprise a first component representative of $Y_{H}'$ and a second component representative of $Y_L'$. For example, the first component may be $Y_{H1}'$ and the second component may be $Y_L'$ supplied to a differentiating circuit internal to 131, or it may be d/dt $Y_L'$ directly. These signals may be but are not restricted to such pairs as $$\frac{d}{dt} Y_H' \text{ and } \frac{d}{dt} Y_L', \quad (1)$$

$$Y_H' \text{ and } \frac{d^2}{dt^2} Y_L', \text{ or} \quad (2)$$

$$Y_H' \text{ or } Y_H'' \text{ and } \frac{d}{dt} Y_L', \quad (3)$$

and these will be subsequently illustrated. More than a single effective pair may be used; for example concurrent use of d/dt $Y_L'$ with both d/dt $Y_H'$ and $Y_H'$ provides an illustration of quadrature information channels.

Specifically, the mode decision circuitry and the mode control circuitry may effectively enable the correction circuitry during the epoch of a detected step, or, alternatively disable the correction circuitry upon detection of signal components incompatible with a step, or allow the step mode to remain enabled in the absence of such incompatible components.

Figure 14A:
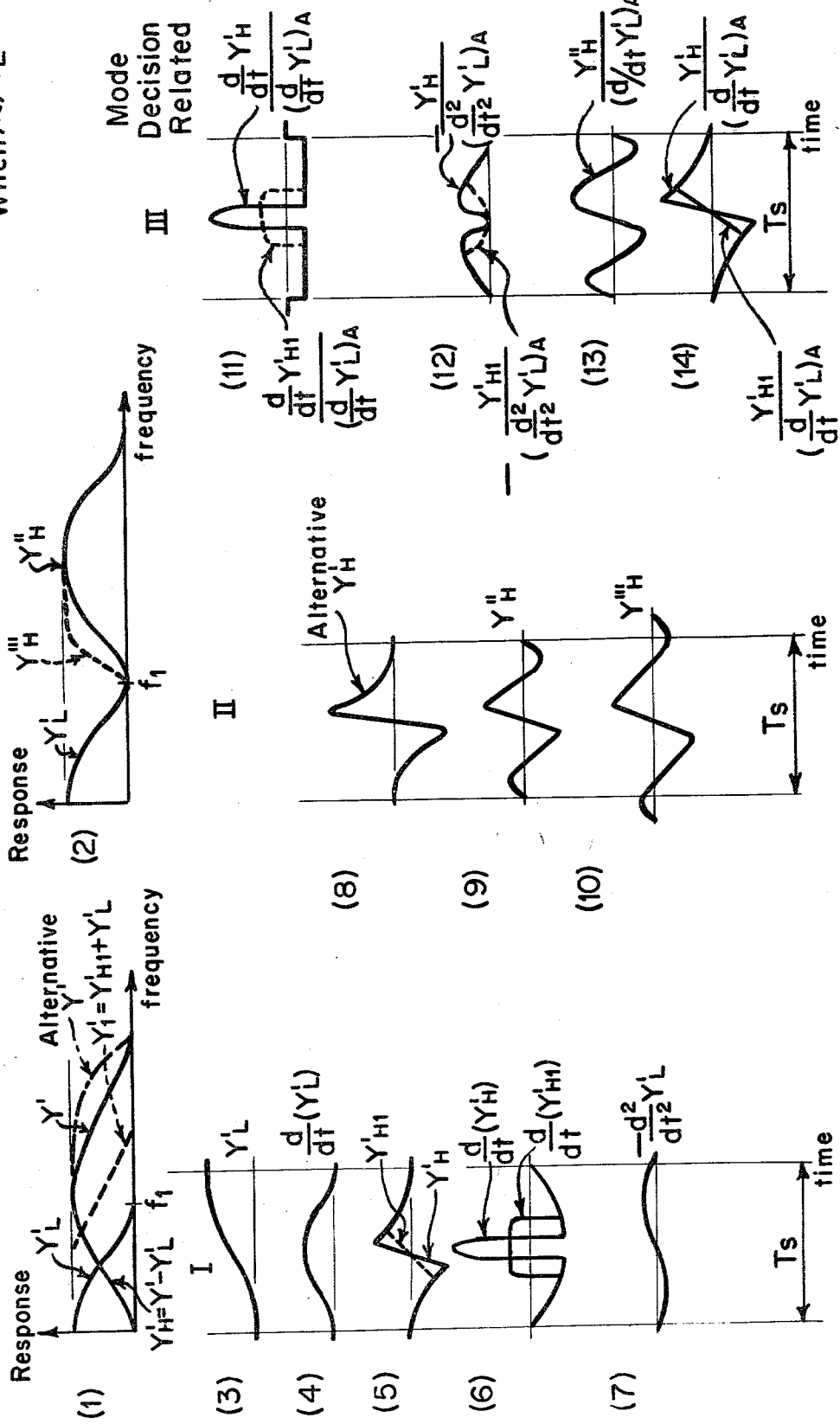

In order to understand the structure and operation of the preferred mode decision circuitry, it is first necessary to consider the time waveforms pertinent to a typical chrominance step. Such waveforms are illustrated in FIG. 14(A). FIG. 14(A) shows two frequency passband figures designated (1) and (2), and three columnar groups of time waveforms. Column I illustrates basic waveforms numbered (3)–(7); Column II illustrates waveforms numbered (8)–(10) resulting from alternative frequency filtering; and Column III illustrates waveforms numbered (11)–(14) useful in mode decision processing.

Referring now to the frequency passbands shown in passband figure (1), the $Y_L'$ passband, as illustrated, has a roughly cosine-squared shape and approaches zero at a frequency $f_1$. The Y' passband as illustrated, is a wider band, generally similar passband, of substantially higher bandwidth, consistent with low time dispersion, and $Y_H'$ is illustrated as the difference between the bands of Y' and $Y_L'$. Also illustrated are an intermediate bandwidth signal $Y_1' = Y_{H1}' + Y_L'$ and an alternative Y' having a more nearly square frequency response.

In passband figure (2), there are again shown the frequency passband of $Y_L'$ and an additional passband for a signal $Y_H''$, which is constrained (a) not to overlap the band of $Y_L'$, and (b) not to have a larger slope with frequency than $Y_L'$. A third passband shown dotted has the former constraint but not the latter.

Referring now to the waveforms of Column 1, waveform (3) represents the component $Y_L'$ during a positive step transient, and waveform (4) represents d/dt ($Y_L'$) during the same step. Waveform (5) represents the transient $Y_H'$ and also shows the narrower band transient $Y_{H1}'$. Waveform (6) represents d/dt ($Y_H'$) and d/dt ($Y_{H1}'$), and waveform (7) represents $d^2/dt^2 Y_L'$. The waveforms in this column and in the remaining columns are all shown during the transient epoch, $T_s$ of a step transient.

It is important to note that because $Y_H'$ and $Y_{H1}'$ tend toward zero both at the beginning and the end of the transient epoch, a time gate which enables the basic inferred step highs correction signal to pass through for a period of approximately $T_s$ need not have critical timing requirements.

Now referring to the waveforms in Column 2, waveform (8) the alternative $Y_H'$, can have a larger amplitude than $Y_H'$ in the transition region near the step. Waveform (9), corresponding to $Y_H''$, has the shape shown and is generally constrained to the epoch $T_s$ by the slope constraint. Waveform (10) for $Y_H'''$ can spread out and occupy a longer time.

Waveforms of the form of (8) appear in the monochrome channels of some receivers which use monochrome channel edge enhancement. In addition to the fact that these do not conflict with the use of the basic algorithm, they are fully compatible with step recognition circuit means herein. Also, when $Y_{H1}'$ is used for step recognition the extra components in (8) tend to be suppressed.

It is a distinguishing and separating feature among step mode decision circuits that some respond over a step epoch such as $T_s$, while others respond over a longer period of time. Those which occupy the minimum time are preferable. Differences in absolute time delay also exist in processing as will be shown.

Mode decision circuits to be described involve signal comparison and normalization, followed by signal or signature evaluation. Such circuits can use one or more ratio signal waveforms, referred to as mode decision waveforms or step characteristic waveforms, such as are shown in Column III. Waveforms (11) are designated $\rho_{11}$ and are sketched for two different bandwidths of $Y_H'$ used for decision purposes. Waveforms (12) are designated $\rho_2$ and are similarly illustrated for two bandwidths. Waveforms (13) are obtained with use of the $Y_H''$ signal component illustrated as waveform (9). Alternating bi-polar pulses (14), shown for two bandwidths of $Y_H'$, are designated $\rho_1$. The subscript A on the denominator terms indicates a preferred but not absolutely necessary processing arrangement which constrains the denominators to non-zero values, while permitting the ratios to go to zero.

It can be seen that in waveforms (11), (12), (13), (14) the polarity or direction of the step has cancelled out.

A step of any bandwidth is fully defined in these ratio waveforms in terms of the following characteristics:
(1) shape,
(b) polarity of the waveform,
(c) amplitude, and
(4) timing. The existence of a step can be determined from the wideband Y' signal and can be confirmed by the concurrent existence of color-space-rate or chrominance rate components.

The circuit means and methods shown herein can use these recognizable features to provide available circuit means to ensure that a specific signal mode exists when and only when it is desired.

Figure 14B:
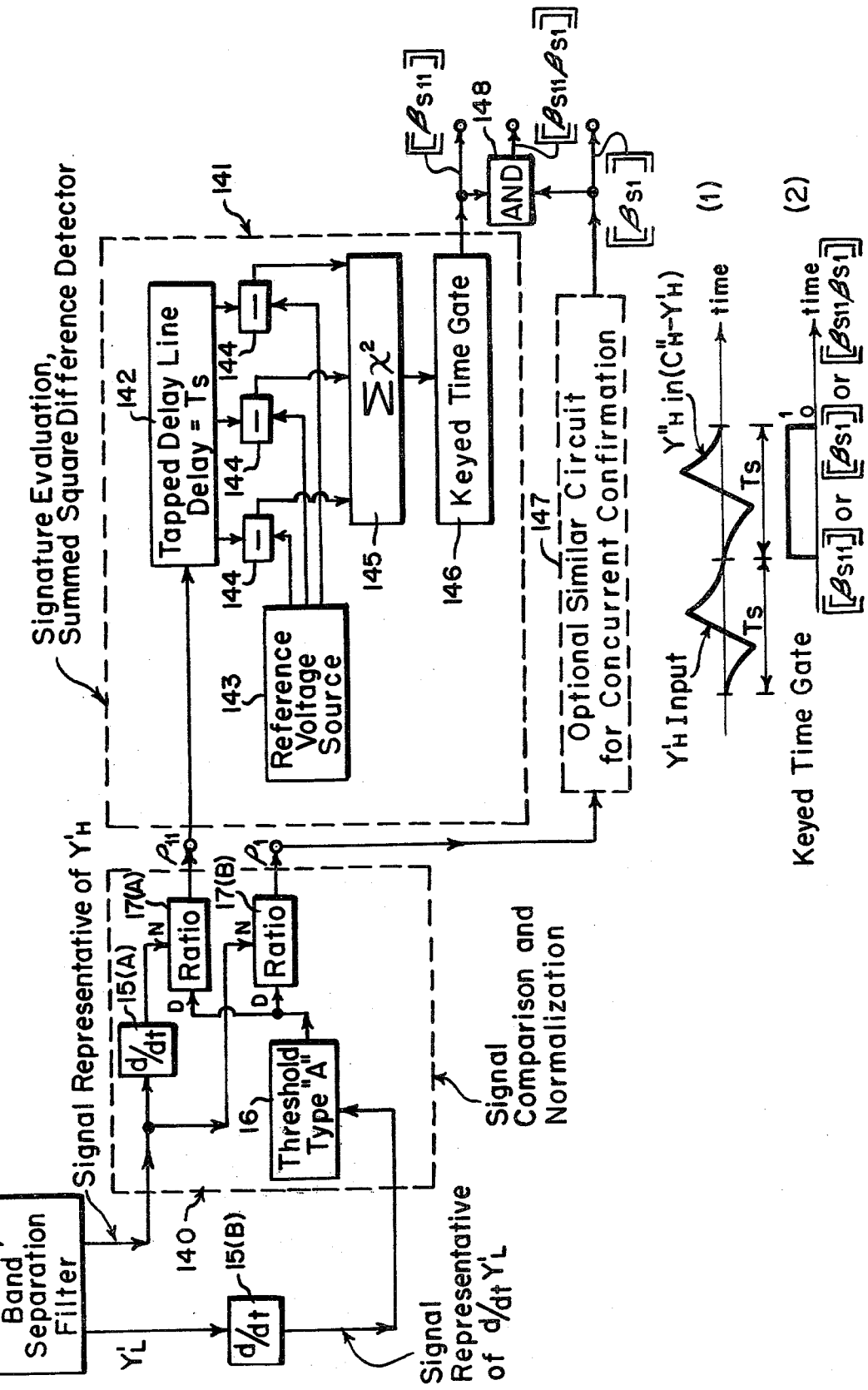

FIG. 14(B) illustrates a preferred form of mode decision circuit which comprises, in substance, signal comparison and normalization circuit 140 responsive to components of the received monochrome video signal Y' for processing one or more normalized comparison signals wherein steps appear as substantially universal waveforms having one or more characteristic features such as amplitude, shape or polarity. Evaluation circuitry 141 responsive to these comparison signals is utilized to determine the presence or absence of one or more of these characteristic features and thus determine the desirability of enabling, disabling, or keying an inferred high frequency step correction circuit (not shown) in accordance with the invention.

In the specific decision circuit of FIG. 14(B), the received monochrome signal Y' from the receiver (not shown) is separated in band splitter 71 into a low frequency component derived from $Y_L'$ having a bandwidth comparable to that of the reduced bandwidth chrominance signals and a complementary high frequency portion representative of $Y_H'$.

The low frequency component comprises a dynamic signal derived from $Y_L'$, that is a signal not responsive to the DC component thereof and preferably not spread in time. Signals meeting these requirements include:

$$\frac{d}{dt} Y_L', \frac{d^2}{dt^2} Y_L', \text{ or } \sum_{K=1}^{M} A_K \frac{d^K}{dt^K} (Y)_L.$$

The constraint on the $Y_H'$ signal which has no DC component is otherwise similarly constrained. Signals meeting such requirements include:

$$Y_H', \frac{d}{dt} Y_H', \frac{d^2}{dt^2} Y_H', \text{ or } \sum_{K=1}^{M} A_K \frac{d^K}{dt^K} (Y_H').$$

Where $Y_H'$ is replaced by a $Y_H''$ or other signal constrained not to frequency overlap with the band of $Y_L'$, any pair may in principle be used, although low order derivatives are preferred. When $Y_H'$ is not so constrained it is desirable that the phase characteristics be colinear as in the cases illustrated. The step decision bandwidth for $Y_L'$ is not constrained to be precisely comparable to that of the chrominance $(C' - Y')_L$.

The Y' highs and lows are then applied to comparison and normalization circuit 140 for processing one or more normalized comparison signals. In the embodiment shown, basically $$\rho_{11} = \frac{d/dt(Y_H')}{d/dt(Y_L')}$$

is processed as the primary decision signal and $$\rho_1 = \frac{Y_H'}{d/dt(Y_L')}$$

is used as a quadrature supplementary decision signal. In alternative circuits where $\rho_1$ is used as a single or primary decision signal, the non-overlapping passbands shown in FIG. 14(A), passband FIG. (2) should preferably be used.

In circuit 140, the Y' lows are applied to differentiating circuit 15(B), and the resulting rate of change signal is applied, through a type-A threshold 16, to the denominator inputs of ratio circuits 17(A) and 17(B). The Y' highs in one branch are applied, in the primary circuit through differentiator 15A to the numerator terminal of ratio circuit 17(A), and the resulting rate of change signal is applied to the numerator input of ratio circuit 17(A). Also, optionally the Y' highs are applied to ratio circuit 17(B). The respective outputs of ratio circuits 17(A) and 17(B) are the normalized comparison signals $\rho_{11}$ and $\rho_1$, respectively. The signal $\rho_{11}$ is applied to evaluation circuit 141.

The evaluation circuit shown is a signature evaluation circuit responsive to a normalized comparison signal for ascertaining the time of occurrence of a waveform characteristic of a step. The specific evaluation circuit shown is a summed square difference detector comprising a tapped delay line 142, a source of reference voltages 143, a plurality of subtraction circuits 144, and a summing circuit 145. Preferably, the delay line 142 has a nominal total delay of time $T_s$ corresponding to the time epoch of transitions related to a relevant chrominance bandwidth.

In operation, the comparison waveform $\rho_{11}$ is applied to tapped delay line 142, which, in turn, provides a plurality of discrete outputs, separated by time differentials which are small compared to $T_s$, such as less than $(f_L/f_W)T_s$. These plural outputs are subtracted from respective reference level amplitudes characteristic of a step provided by reference voltage source 143 in a plurality of difference circuits 144, and the summation of the squares of these respective differences is computed in summing circuit 145.

When a step is centered in the delay line, the summed square output of calculating circuit 145 will approach zero, a condition which can be used to activate keyed time gate 146 to provide a step timing pulse designated $[[\beta_{s11}]]$ with a precise time delay of $T_s$. (The double bracketing here indicates a timed enabling signal as compared to a long term modal acceptance state.)

It should be noted that precise centering of an enabling gate is not critical to the operation of the inferred high frequency step correction circuitry. Critical centering is not necessary because the inferred step chrominance highs tend, as previously illustrated, toward zero at both the beginning and the end of the period $T_s$. The triggering of a waveform generator, such as the $N_s$ generator of FIG. 11, however, requires greater precision of timing.

Optionally, a similar signature evaluation circuit 147 can be provided for seeking concurrent confirmation by evaluation of another waveform such as $\rho_1$. Such a circuit provides a second step timing pulse designated $[[\beta_{s1}]]$, and concurrence of the two pulses can be required by an optional AND gate 148. The result is a concurrent step timing pulse designated $[[\beta_{s11}\beta_{s1}]]$.

The waveforms on time scales (1) and (2) of FIG. 14(B) show the relative timing of the $Y_H'$ input, the delayed $Y_H'$ in $(C_H''-Y_H')$ and the position of the keyed time gate.

The delay can be reduced at the cost of a potential reduction in decision reliability by using a shorter delay line of duration $T_s/M$, where M is greater than one. In the limit, there can be only one effective time sample, and the delay can be made vanishingly small. This approach leads to the signature evaluation circuits of FIG. 14(C) which have substantially no time delay. These circuits are also free of time spreading in that the entire decision process is constrained within the time epoch $T_s$.

The decision circuit of FIG. 14(B) has the further property that in severe thermal noise at marginal levels the sum of squared differences may become large enough to automatically turn off the band widening inferred chrominance.

Figure 14C:
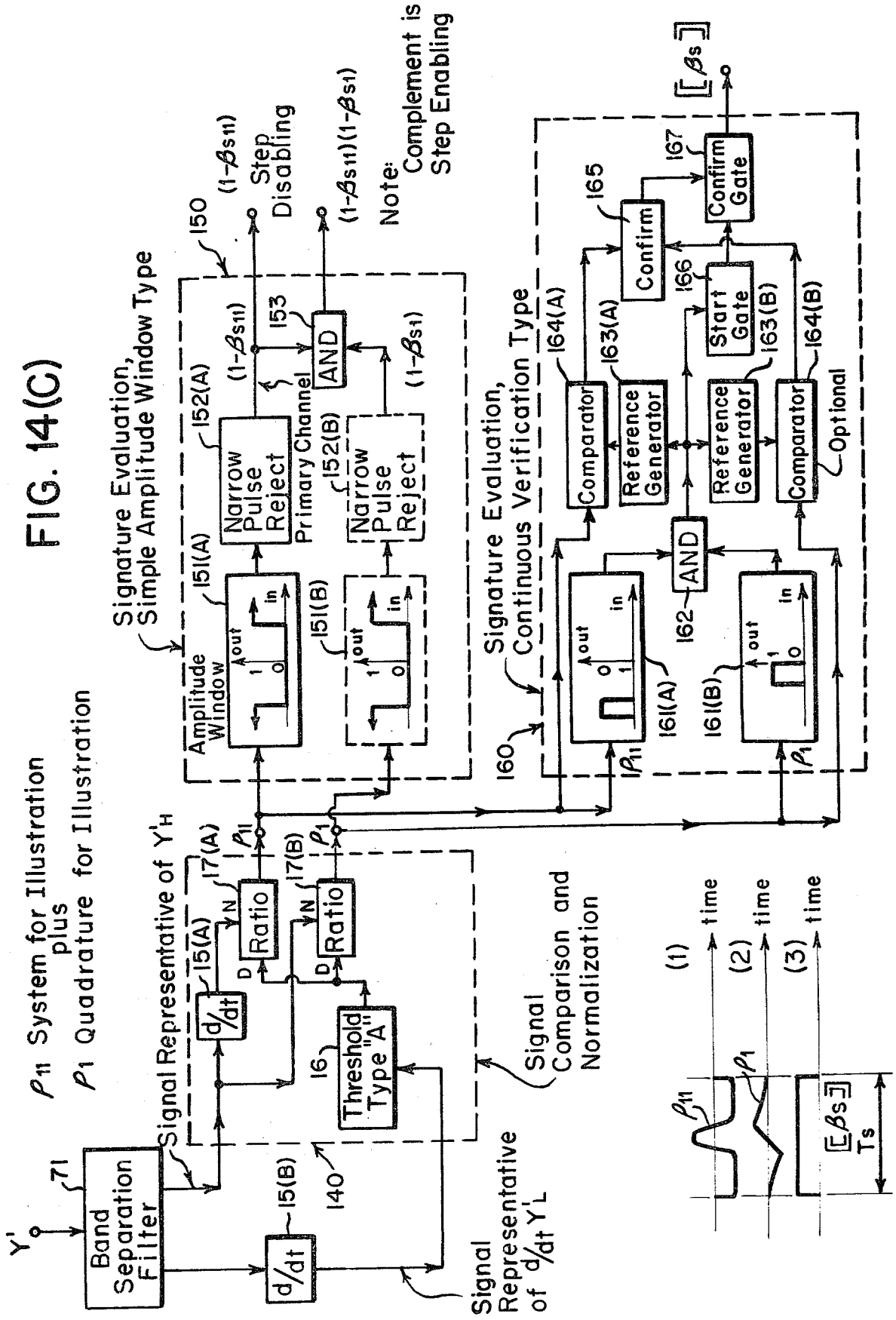

FIG. 14(C) illustrates alternative mode decision circuits comprising a signal comparison and normalization circuit 140 substantially identical to that described in connection with FIG. 14(B) and a pair of substantially delayless evaluation circuits 150 and 160. Normalized comparison signals $\rho_{11}$ and $\rho_1$ from circuit 140 are each applied to evaluation circuits 150 and 160.

Evaluation circuit 150, which can be characterized as an amplitude window type, receives at least one comparison signal such as $\rho_{11}$ and evaluates it for an amplitude compatible with or incompatible with a step by application to amplitude window 151(A). This window advantageously produces a unit output for amplitudes in a range in excess of the step compatible amplitude range and zero output for amplitudes within the range of step characteristic limited amplitudes. A pulse width discriminator circuit 152(A) is advantageously provided to reject very narrow spikes in the amplitude window outputs, and the resulting output signal for the $\rho_{11}$ channel is a disabling signal, indicative of a condition contrary to presence of a step, which can be designated $(1-\beta_{s11})$.

Advantageously, a second comparison signal such as $\rho_1$ is concurrently processed by amplitude windows 151(B) and discriminator 152(B) in order to produce a second step disabling signal designated $(1-\beta_{s1})$. The two disabling signals can then be applied to an optional AND gate 153 to produce a joint concurrent step disabling signal $(1-\beta_{s11})(1-\beta_{s1})$.

Alternatively, it is feasible to process the complement of one of the outputs of circuit 150, e.g., $[1-(1-\beta_{s11})]$ for step enabling or use a completely complementary circuit.

The evaluation circuit 160, which can be characterized as a continuous verification type, uses a pair of comparison signals such as $\rho_{11}$ and $\rho_1$ shown here to start an enabling signal $[[\beta_s]]$ when the respective amplitudes of $\rho_{11}$ and $\rho_1$ are within the amplitude window ranges shown. As can be seen by reference to time charts (1), (2), and (3), $\rho_{11}$ and $\rho_1$ are within these amplitude ranges concurrently, for step transients only at the start thereof, at which time while $Y_H'$ and the corresponding $C''_H-Y'_H$ have been shown to be near zero, so that error is not critical. Specifically, $\rho_{11}$ and $\rho_1$ are applied to respective amplitude windows 161(A) and 161(B) chosen to provide unity outputs only when the respective signals have the step characteristic related concurrent amplitudes shown. The amplitude window outputs are applied to AND gate 162 which produces an output for concurrent input signals.

Comparison of one or both input signals with generated references waveforms restricted from the AND gate 162 can be used to confirm the existence of a step. Specifically, the AND gate output can be used to activate reference waveform generators 163(A) and 163(B)

for generating waveforms similar to the $\rho_{11}$ and $\rho_1$ step characteristic waveforms shown in time charts (1) and (2). The respective signals received are compared against these reference waveforms in comparators 164(A) and 164(B), respectively, and the respective comparator outputs are applied to confirmation circuit 165 for confirming the concurrent detection of step characteristic waveforms. In its simplest form, circuit 165 can comprise a simple AND gate.

The output of AND gate 162 also keys a start gate 166 of pulsewidth up to $T_s$ which is applied to a confirmation gate 167 responsive to the output of confirmation circuit 165. The output of confirmation gate 167 is a step timing and enabling pulse [[$\beta_s$]] which can continue so long as waveform shape is confirmed.

Alternatively, the continuous verification circuitry can be combined with a limited multi-sample circuit such as a foreshortened form of the circuit used in FIG. 14(B), to derive mode decision circuits having various time delays from zero to $T_s$ and based upon various numbers of signal sample points. Specifically, the pair of amplitude windows 161(A) and 161(B) and the AND gate 162 can be replaced by a short, multitap, delay line sum of squared differences threshold of the type shown in FIG. 14(B).

FIG. 14(D) illustrates an alternative signature evaluation circuit comprising a non-linear integrator 170 for obtaining an integrated monopolar measure of a comparison signal and a threshold 171(A) or 171(B) for determining whether or not the integrated value exceeds a selected threshold level indicative of signal conditions compatible with or incompatible with operation of the step correction algorithm. Specifically, the integrator comprises a tapped delay line 172 for receiving a comparison signal such as $\rho_{11}, \rho_1$, or $\rho_2$ and producing a plurality of K outputs at small time differentials. The plural outputs are applied to a squaring and summing circuit 173 for producing an output signal of the form:

$$\text{Output} = \sum_{K=1}^{M} X_K^2 W_K,$$

wherein $X_K$ is the signal at the $K^{th}$ tap and $W_K$ is an amplitude weighting coefficient. When the time intervals between successive delay line outputs are small compared to one-half of the maximum signal frequency, this sum closely approximates an integral.

Nonlinear translators other than square law may also be used.

The output of squaring and summing circuit 173 is applied to threshold 171(A) which is an amplitude window as shown. Amplitudes of less than a selectable threshold are compatible with a step and produce an enabling signal ($\beta_s$). The output of circuit 173 can also be applied to a complementary amplitude window 171(B). An output signal from this window is indicative of a condition contrary to presence of a step and can be used as a disabling signal $(1-\beta_s)$.

FIG. 14(E) illustrates an alternative evaluation circuit using a pair of non-linear integrators 180(A) and 180(B) for effecting non-linear integration of components of Y' before signal comparison and normalization in ratio circuit 181. In this example, the Y" highs and the rate of change of the Y' lows, respectively, are integrated and compared. The output of ratio circuit 181 is then applied to amplitude window 182 for determining whether or not it exceeds an empirically preselected value indicative of a condition contrary to the presence of a step. In this example, the amplitude window produces a disabling signal $(1-\beta_s)$ when the ratio of integrals exceeds a preselected level.

It should be noted that the delay epochs of the non-linear integrators 180(A) and 180(B) need not be equal. For example, the integrator of the $Y_H'$ can have a longer delay epoch than that of d/dt ($Y_L'$).

FIG. 14(F) illustrates yet another alternative form of an evaluation circuit comprising limited range translator 192, a near-matched filter 190 and a threshold amplitude window 191. The operation of this circuit can be illustrated by reference to an exemplary $\rho_1$ input signal and the waveforms illustrated in time charts (1), (2) and (3) which show $\rho_1$ during a step, the impulse response of filter 190, and the filter output for a $\rho_1$ step waveform respectively. As shown, the filter 190 provides a strong positive output pulse for the central region of a $\rho_1$ step characteristic waveform of duration $T_s$ with leading and lagging negative sidelobes. Window 191 detects the positive region and provides a step timing and enabling signal [[$\beta_s$]].

The evaluation circuits illustrated in FIGS. 14(D), 14(E) and 14(F) all incur delay and have inherent time spreading. In contrast, the evaluation circuits in FIGS. 14(B) and 14(C) do not have inherent time spreading. With appropriate delay adjustments for concurrency, various forms can be combined to provide composite mode decisions with conventional switching circuitry.

(m) Receiving System With Wideband Monochrome Signal Ratio Generator (FIG. 15)

FIG. 15 illustrates an alternative embodiment of an inferred highs step correction circuit in accordance with the invention wherein inferred highs are processed by modulating a chrominance rate of change signal by a wideband monochrome ratio signal. Specifically, the monochrome video signal Y', provided from the receiver (not shown) is applied to band splitter 71 wherein it is split into a low frequency component $Y_L'$ comparable in bandwidth and frequency range to the reduced bandwidth chrominance signal and a complementary high frequency portion $Y'_H$.

The Y' lows and highs are then applied to a wideband monochrome signal ratio generator 200 which produces a step-timed wideband ratio signal of the form:

$$\frac{Y_H'}{d/dt(Y_L')_A}$$

Specifically, the Y' lows are applied to a differentiator 15 and the resulting rate of change signal is applied through a type A threshold 16 to the denominator input terminal of ratio circuit 17. The $Y_H'$ signal is applied to the numerator input terminal of the ratio circuit, and the resulting wideband monochrome ratio signal is supplied to enabling gate 201.

The Y' highs and the Y' lows are also applied to a mode decision and timing circuit 202 of the type described in connection with FIG. 14 for producing an enabling signal [[$\beta_s$]] for enabling passage of the wideband monochrome signal ratio $\rho_1$ through gate 201 upon inferred detection of a step. The enable gate 201 includes such time delay of the signal from 17 as may be necessary to match any delay in 202.

The resulting step enabled wideband monochrome ratio signal is applied to the input of modulator 20.

The respective reduced bandwidth chrominance signals from the receiver are applied to respective differentiator 18 (only one chrominance channel is shown) and the resulting chrominance rate of change signal is applied, through optional gate 203 to the other input terminal of modulator 20. The chrominance signal applied to the modulator can be a single chrominance channel, a composite axis channel or a differentiated chrominance signal on the subcarrier.

Optional gate 203 can be controlled by an optional narrow band chrominance rate threshold circuit of the type described in connection with FIG. 13(B).

The signals to modulator 20 must be conventionally equalized to concurrent delay time scales (not shown).

The output of modulator 20 is an inferred high frequency chrominance step correction component provided during and only during the inferred detection of a chrominance step.

While the invention has been described in connection with only a small number of specific embodiments, it is to be understood that these are merely illustrative of many other specific embodiments which can also utilize the principles of the invention. For example, while the preferred embodiments herein have been described using standard signal technology of the NTSC system used in the United States, it should be understood that the inventive concepts are equally applicable to NTSC derived systems such as the well-known PAL and SECAM systems. And while the operating concepts of the invention have been primarily explained in the environment of a conventional home television receiver, it should be appreciated that the same signal processing methods and circuits can also be advantageously used to enhance the quality of image reproduction at any stage of signal transmission or reception where the bandwidths of the chrominance signals have been restricted compared to the bandwidth of the monochrome video signal, but subsequent to which this bandwidth restriction can be removed. Accordingly, the expression "color television receiving system" as used herein is meant to generally define and embrace color television systems or subsystems which process NTSC-type color television signals at some stage prior to image display. Examples of such systems in which the present invention may be advantageously employed include video recording and recording playback apparatus, large screen theater displays, cable television systems and off-the-air receivers such as home television receivers. Signal processing circuits such as video detectors, chrominance subcarrier synchronous detectors and video signal matrixing circuits currently used in such receiving systems are well known in the art and may be utilized to supply the wideband monochrome and restricted bandwidth chrominance input signals for processing in accordance with the concepts of the invention. Thus, numerous and varied devices can be made by those skilled in the art without departing from the spirit and scope of the present invention.

I claim:

1. A color television system for receiving a composite color television signal comprising a wide bandwidth monochrome video signal and a plurality of reduced bandwidth chrominance signals, wherein the absence of high frequency chrominance components can produce color display errors such as inaccurate highs, polarity reversals or errors in visual luminance which are visible in regions of sharp color transitions, said receiving system comprising:

receiving circuit means responsive to said composite color television signal for processing therefrom a wide bandwidth monochrome signal and a plurality of reduced bandwidth chrominance signals;

correction circuit means responsive to said wide bandwidth monochrome signal and to said one or more respective reduced bandwidth chrominance signals for effectively processing one or more respective inferred step high frequency chrominance components which are proportional in instantaneous value to the product of: (1) a signal representative of a high frequency portion of said monochrome signal; and (2) a signal representative of the time rate-of-change of said respective reduced bandwidth chrominance signals; and (3) the inverse of a signal representative of the time rate-of-change of a low frequency portion of said monochrome signal, the bandwidth of said low frequency monochrome portion being substantially comparable to the bandwidth of a respective chrominance signal and the bandwidth of the high frequency portion of said monochrome signal being substantially complementary to the bandwidth of the low frequency portion of the monochrome signal; and combining circuit means for separately combining said respective inferred step high frequency chrominance components with the signals to be displayed.

2. A receiving system according to claim 1 wherein said correction circuit means comprises:

circuit means responsive to said one or more reduced bandwidth chrominance signals and to respective comparable low frequency monochrome components for processing for each said reduced bandwidth chrominance signal a respective ratio signal representative of the ratio of the time rate-of-change of said chrominance signal to the time rate-of-change of said respective low frequency monochrome component; and circuit means responsive to said respective ratio signals and to said high frequency monochrome components for processing for each said chrominance signal, an inferred high frequency chrominance component substantially proportional to the product of said respective ratio signal and a corresponding complementary high frequency monochrome component.

3. A receiving system according to claim 1 wherein said correction circuit means comprises:

circuit means responsive to said wide bandwidth monochrome signal for processing therefrom one or more respective monochrome ratio signals representative of the ratio of a said high frequency monochrome component to the time rate-of-change of the corresponding low frequency monochrome component; and circuit means responsive to said respective monochrome ratio signals and to said one or more reduced bandwidth chrominance signals for processing for each said chrominance signal an inferred high frequency component substantially proportional to the product of the time rate-of-change of said reduced bandwidth chrominance signal and said respective monochrome ratio signal.

4. A receiving system according to claim 1 wherein:

said receiving circuit comprises circuit means responsive to said received signals for processing therefrom one or more reduced bandwidth primary color signals;

said correction circuit comprises means for processing for each said primary color signal, an inferred high frequency color component which is substantially proportional to the product of (1) a signal representative of said high frequency portion of said monochrome signal; and (2) a signal representative of the time rate-of-change of said reduced bandwidth primary color signal; and (3) the inverse of a signal representative of the time rate-of-change of a low frequency portion of said monochrome signal; and said combining circuit comprises circuit means for effectively combining said inferred high frequency color components with said reduced bandwidth primary color signals to be displayed.

5. A receiving system according to claim 1 wherein:

said receiving circuit comprises circuit means responsive to said received signals for processing therefrom one or more reduced bandwidth primary color signals;

said correction circuit comprises (1) circuit means responsive to said one or more reduced bandwidth primary color signals and to respective low frequency monochrome components for processing for each said reduced bandwidth primary color signal a ratio signal representative of the ratio of the time rate-of-change of said primary color signal to the time rate-of-change of said respective low frequency monochrome component, and (2) circuit means responsive to said respective ratio signals and to respective high frequency monochrome components for processing for each said primary color signal an inferred high frequency color component substantially proportional to the product of said ratio signal and said respective high frequency monochrome component; and said combining circuit comprises circuit means for effectively combining said inferred high frequency color components with said reduced bandwidth primary color signals to be displayed.

6. A receiving system according to claim 1 wherein:

said receiving circuit comprises circuit means responsive to said received signals for processing therefrom one or more reduced bandwidth primary color signals;

said correction circuit comprises (1) circuit means responsive to said wide bandwidth monochrome signal for processing therefrom one or more monochrome ratio signals representative of the ratio of the value of a high frequency portion of said monochrome signal to the time rate-of-change of a low frequency portion of said monochrome signal and (2) circuit means responsive to said monochrome ratio signals and to said reduced bandwidth primary color signals for processing for each said primary color signal an inferred high frequency color component substantially proportional to the product of a said monochrome ratio signal and the time rate-of-change of said reduced bandwidth primary color signal; and said combining circuit comprises circuit means for effectively combining said inferred high frequency color components with said reduced bandwidth primary color signals to be displayed.

7. A receiving system according to claim 1 wherein:

said receiving circuit comprises circuit means responsive to said received signals for processing therefrom one or more reduced bandwidth primary color signals corresponding to respective reduced bandwidth chrominance signals;

said correction circuit comprises (1) circuit means responsive to said respective reduced bandwidth chrominance signals and to one or more low frequency components of said monochrome signal for processing for each said reduced bandwidth chrominance signal a ratio signal representative of the ratio of the time rate-of-change of said chrominance signal to the time rate-of-change of said low frequency monochrome component, (2) circuit means for effectively adding to each said ratio signal a reference signal of substantially unity value to produce a composite control signal; and (3) circuit means jointly responsive to said composite control signals and to said monochrome signal for processing for each said primary color signal an inferred high frequency component substantially proportional to the product of said respective composite control signal and a high frequency portion of said monochrome signal; and said combining circuit comprises circuit means for effectively combining said inferred high frequency components with said reduced bandwidth primary color signals to be displayed.

8. A receiving system according to claim 1, wherein each of the inferred high frequency chrominance components comprises an alternating bipolar pulse occupying an epoch substantially within each said step transition interval and having correct polarity and amplitude to substantially restore the missing step high frequency chrominance components over a significant range of signal amplitudes.

9. A receiving system according to claim 1, wherein each of said inferred high frequency chrominance components is equal in instantaneous value to the product of: (1) a signal representative of the high frequency portion of said monochrome signal; and (2) a signal representative of the time rate-of-change of said respective reduced bandwidth chrominance signal; and (3) the inverse of a signal representative of the time rate-of-change of the low frequency portion of said monochrome signal.

10. A receiving system according to claim 1, wherein each of said inferred high frequency chrominance components is monotonically proportional in instantaneous value to the product of: (1) a signal representative of the high frequency portion of said monochrome signal; and (2) a signal representative of the time rate-of-change of said respective reduced bandwidth chrominance signal; and (3) the inverse of a signal representative of the time rate-of-change of the low frequency portion of said monochrome signal.

11. A receiving system according to claim 1, wherein each of said inferred high frequency chrominance components is monotonically proportional at least in polarity to the product of: (1) a signal representative of the high frequency portion of said monochrome signal; and (2) a signal representative of the time rate-of-change of said respective reduced bandwidth chrominance signal; and (3) the inverse of a signal representative of the time rate-of-change of a low frequency portion of said monochrome signal.

12. A receiving system according to claim 1, further including a mode decision circuit for producing a mode control signal in response to components in the received signal that are characteristic of the existence of a step transition; and mode control circuit means responsive to said mode control signal for time-gating said correction circuit.

13. A receiving system according to claim 1, further including a mode decision circuit for producing a mode control signal in response to components in the received signals that are compatible with the existence of a step transition; and mode control circuit means responsive to said mode control signal for effectively enabling said correction circuit.

14. A receiving system according to claim 1, further including a mode decision circuit for producing a mode control signal in response to components in the received signals that are incompatible with the dominant existence of a step transition; and mode control circuit means responsive to said mode control signal for effectively disabling said correction circuit.

15. A receiving system according to claim 1, wherein said correction circuit further includes means for permitting effective selection of the amplitude of one or more of said inferred high frequency components.

16. A receiving system according to claim 1, wherein said correction circuit includes means for maintaining substantial fidelity of the monochrome components of pictures displayed from the corrected signals with respect to the received monochrome signal.

17. A receiving system according to claim 1, wherein said correction circuit includes means for maintaining substantial fidelity of the monochrome components of pictures displayed from the corrected signals with respect to the received monochrome mixed highs.

18. A receiving system according to claim 1, wherein said correction means includes means for maintaining substantial fidelity of the monochrome components of pictures displayed from the corrected signals with respect to the low frequency portion of the received monochrome signal.

19. A receiving system according to claim 14, wherein said mode decision circuit additionally produces an output control signal in response to excess signal noise and said mode control circuit disables said correction circuit for relative noise levels above a selected value.

20. A receiving system according to claim 1, wherein said correction circuit includes a bandsplitter for separating the wideband monochrome signal into said substantially complementary low frequency and high frequency portions.

21. A receiving system according to claim 1, wherein said composite color television signal is an NTSC type signal having first and second chrominance signals of unequal bandwidths and said correction circuit includes bandsplitter means for processing the wideband monochrome signal to produce first and second band pairs, said first pair having a low frequency portion substantially comparable in bandwidth to said first chrominance signal and a high frequency portion substantially complementary thereto and said second pair having a low frequency portion substantially comparable in bandwidth to said second chrominance signal and a high frequency portion substantially complementary thereto.

22. A receiving system according to claim 1, which includes bandlimiting means for reducing the bandwidth of at least one of said chrominance signals to effectively reduce unwanted monochrome to color cross-talk, wherein the inferred step highs components provide substantially full monochrome bandwidth transient response in the displayed color step transitions.

23. A receiving system according to claim 1, wherein said receiver additionally includes at least one chrominance passband filter having a gradual frequency rolloff response to minimize time smearing and ringing, wherein said inferred step highs components provide substantially full monochrome bandwidth transient response in the displayed color step transitions by virtue of the effective non-linear filter processing provided by said inferred step highs correction circuit.

24. A receiving system according to claim 1, wherein said correction circuit further includes threshold means for preventing the generation of excessively large correction signals when the magnitude of the rate-of-change of said low frequency portion of said monochrome signal falls below a selected value.

25. A receiving system according to claim 1, wherein said correction circuit further comprises threshold means for preventing corrections when the magnitude of the rate-of-change of said reduced bandwidth chrominance signal falls below a selected value.

26. A color television system in accordance with claim 1, which further includes threshold means responsive to a color-rate-space threshold contour controlled by one or more of said monochrome lows or chrominance lows rate-of-change signals.

27. A color television system for receiving a composite color television signal comprising a wide bandwidth monochrome video signal and a plurality of reduced bandwidth chrominance signals, wherein the absence of high frequency chrominance components can produce color display errors such as inaccurate highs, polarity reversals or errors in visual luminance which are visible in regions of sharp color transitions, said receiving system comprising:

receiving circuit means responsive to said composite color television signal for processing therefrom a received wide bandwidth monochrome signal and a plurality of received reduced bandwidth chrominance signals;

inferred step highs correction circuit means comprising (1) circuit means responsive to said wide bandwidth monochrome signal for processing therefrom (a) one or more low frequency monochrome components comparable in bandwidth and frequency range to one or more respective reduced bandwidth chrominance signals and (b) one or more respective complementary high frequency monochrome components having bandwidths complementary to the respective bandwidths of the low frequency monochrome components, (2) circuit means responsive to said one or more reduced bandwidth chrominance signals and to respective comparable low frequency monochrome components for processing for each said reduced bandwidth chrominance signal, a ratio signal representative of the ratio of the time rate-of-change of said chrominance signal to the time rate-of-change of said respective comparable low frequency monochrome component, (3) circuit means responsive to said respective ratio signals and to said respective complementary high frequency monochrome components for processing for each said reduced bandwidth chrominance signal an inferred step high frequency component substantially proportional to the produce of said ratio signal and said respective complementary high frequency monochrome component, and (4) combining circuit means for effectively combining said inferred step high frequency components with the signals to be displayed to reduce the visibility of said color and luminance display errors.

28. A receiving system according to claim 27, wherein each of the inferred high frequency chrominance components comprises an alternating bipolar pulse occupying an epoch substantially within each said step transition interval and having correct polarity and amplitude to substantially restore the missing step high frequency chrominance components over a significant range of signal amplitudes.

29. A receiving system according to claim 27, wherein each of said inferred high frequency chrominance components is equal in instantaneous value to the product of said ratio signal and said respective high frequency monochrome component.

30. A receiving system according to claim 27, wherein each of said inferred high frequency chrominance components is monotonically proportional in instantaneous value to the product of said ratio signal and said respective high frequency monochrome component.

31. A receiving system according to claim 27, wherein each of said inferred high frequency chrominance components is monotonically proportional at least in polarity to the product of said ratio signal and said respective high frequency monochrome component.

32. A receiving system according to claim 27, further including a mode decision circuit for producing a mode control signal in response to components in the received signal that are characteristic of the existence of a step transition; and mode control circuit means responsive to said mode control signal for time-gating said correction circuit.

33. A receiving system according to claim 27, further including a mode decision circuit for producing a mode control signal in response to components in the received signals that are compatible with the existence of a step transition; and mode control circuit means responsive to said mode control signal for effectively enabling said correction circuit.

34. A receiving system according to claim 27, further including a mode decision circuit for producing a mode control signal in response to components in the received signals that are incompatible with the dominant existence of a step transition; and mode control circuit means responsive to said mode control signal for effectively disabling said correction circuit.

35. A receiving system according to claim 27, wherein said correction circuit further includes means for permitting effective selection of the amplitude of one or more of said inferred high frequency components.

36. A receiving system according to claim 27, wherein said correction circuit includes means for maintaining substantial fidelity of the monochrome components of pictures displayed from the corrected signals with respect to the received monochrome signal.

37. A receiving system according to claim 27, wherein said correction circuit includes means for maintaining substantial fidelity of the monochrome components of pictures displayed from the corrected signals with respect to the received monochrome mixed highs.

38. A receiving system according to claim 27, wherein said correction means includes means for maintaining substantial fidelity of the monochrome components of pictures displayed from the corrected signals with respect to the low frequency portion of the received monochrome signal.

39. A receiving system according to claim 27, wherein said mode decision circuit additionally produces an output control signal in response to excess signal noise and said mode control circuit disables said correction circuit for relative noise levels above a selected value.

40. A receiving system according to claim 27, wherein said correction circuit includes a bandsplitter for separating the wideband monochrome signal into said substantially complementary low frequency and high frequency portions.

41. A receiving system according to claim 27, wherein said composite color television signal is an NTSC type signal having first and second chrominance signals of unequal bandwidths and said correction circuit includes bandsplitter means for processing the wideband monochrome signal to produce first and second band pairs, said first pair having a low frequency portion substantially comparable in bandwidth to said first chrominance signal and a high frequency portion substantially complementary thereto and said second pair having a low frequency portion substantially comparable in bandwidth to said second chrominance signal and a high frequency portion substantially complementary thereto.

42. A receiving system according to claim 27, which includes bandlimiting means for reducing the bandwidth of at least one of said chrominance signals to effectively reduce unwanted monochrome to color cross-talk, wherein the inferred step highs components provide substantially full monochrome bandwidth transient response in the displayed color step transitions.

43. A receiving system according to claim 27, wherein said receiver additionally includes at least one chrominance passband filter having a gradual frequency roll-off response to minimize time smearing and ringing, wherein said inferred step highs components provide substantially full monochrome bandwidth transient response in the displayed color step transitions by virtue of the effective non-linear filter processing provided by the inferred step highs correction circuit.

44. A receiving system according to claim 27, wherein said correction circuit further includes threshold means for preventing the generation of excessively large correction signals when the magnitude of the rate-of-change of said low frequency portion of said monochrome signal falls below a selected value.

45. A receiving system according to claim 27, wherein said correction circuit further comprises threshold means for preventing corrections when the magnitude of the rate-of-change of said reduced bandwidth chrominance signal falls below a selected value.

46. A color television system in accordance with claim 27, which further includes threshold means responsive to a color-rate-space threshold contour controlled by one or more of said monochrome lows or chrominance lows rate-of-change signals.

47. A receiving system according to claim 27, wherein the ratio processing circuit includes means for processing a ratio signal substantially proportional to the ratio of the time varying components of said chrominance signal to the time varying components of said low frequency monochrome component, with means for processing said ratios during the time epochs of step transitions in the chrominance signal.

48. A receiving system according to claim 47, which further includes step detector means for producing a step transition control signal in response to signal components in the received signal that are characteristic of the existence of a step transition; said time varying components of the respective chrominance and low frequency monochrome signals each being derived through substantially non-dispersive differential filters the respective outputs of which are separately supplied through a time controlled gate, waveform filter and sampling circuit to a ratio measuring circuit, said gates and sampling circuits being operatively controlled by said step transition control signal.

49. A receiving system according to claim 27, wherein said circuit for processing a ratio signal comprises circuit means for processing a ratio signal proportional to the ratio of the first order time derivative of said reduced bandwidth chrominance signal to the first order time derivative of said respective comparable low frequency monochrome component.

50. A receiving system according to claim 27, wherein said circuit for processing a ratio signal comprises circuit means for processing a ratio signal substantially proportional to the ratio of a linear combination of time derivatives of said chrominance signal to a comparable linear combination of time derivatives of said respective low frequency monochrome component.

51. A color television system for receiving a composite color television signal comprising a wide bandwidth monochrome video signal and a plurality of reduced bandwidth chrominance signals, wherein the absence of high frequency chrominance components can produce color display errors such as inaccurate highs, polarity reversals or errors in visual luminance which are visible in regions of sharp color transitions, said receiving system comprising:
  receiving circuit means responsive to said composite color television signal for processing therefrom a received wide bandwidth monochrome signal and a plurality of received reduced bandwidth chrominance signals;
  inferred step highs correction circuit means comprising, (1) circuit means responsive to said wide bandwidth monochrome signal for processing therefrom one or more monochrome ratio signals representative of the ratio of the value of the high frequency portion of the monochrome signal exceeding the bandwidth of a respective reduced bandwidth chrominance signal to the time rate-of-change of the low frequency portion of the monochrome signal having a bandwidth comparable to that of said reduced bandwidth chrominance signal; and (2) circuit means jointly responsive to said respective monochrome ratio signals and to said one or more respective reduced bandwidth chrominance signals for processing for each said respective chrominance signal, an inferred step high frequency component substantially proportional in instantaneous value to the product of said monochrome ratio signal and the time rate-of-change of said reduced bandwidth chrominance signal; and (3) combining circuit means for effectively combining said inferred step high frequency components with the signals to be displayed to reduce the visibility of said color and luminance display errors.

52. A receiving system according to claim 51, wherein each of the inferred high frequency chrominance components comprises an alternating bipolar pulse occupying an epoch substantially within each said step transition interval and having correct polarity and amplitude to substantially restore the missing step high frequency chrominance components over a significant range of signal amplitudes.

53. A receiving system according to claim 51, wherein each of said inferred high frequency chrominance components is substantially equal in instantaneous value to the product of said monochrome ratio signal and said time rate-of-change of said monochrome reduced bandwidth chrominance signal.

54. A receiving system according to claim 51, wherein each of said inferred high frequency chrominance components is monotonically proportional in instantaneous value to the product of said ratio signal and the time rate-of-change of said reduced bandwidth chrominance signal.

55. A receiving system according to claim 51, wherein each of said inferred high frequency chrominance components is monotonically proportional at least in polarity to the product of said ratio signal and the time rate-of-change of said reduced bandwidth chrominance signal.

56. A receiving system according to claim 51, further including a mode decision circuit for producing a mode control signal in response to components in the received signal that are characteristic of the existence of a step transition; and mode control circuit means responsive to said mode control signal for time-gating said correction circuit.

57. A receiving system according to claim 51, further including a mode decision circuit for producing a mode control signal in response to components in the received signals that are compatible with the existence of a step transition; and mode control circuit means responsive to said mode control signal for effectively enabling said correction circuit.

58. A receiving system according to claim 51, further including a mode decision circuit for producing a mode control signal in response to components in the received signals that are incompatible with the dominant existence of a step transition; and mode control circuit means responsive to said mode control signal for effectively disabling said correction circuit.

59. A receiving system according to claim 51, wherein said correction circuit further includes means for permitting effective selection of the amplitude of one or more of said inferred high frequency components.

60. A receiving system according to claim 51, wherein said correction circuit includes means for maintaining substantial fidelity of the monochrome components of pictures displayed from the corrected signals with respect to the received monochrome signal.

61. A receiving system according to claim 51, wherein said correction circuit includes means for maintaining substantial fidelity of the monochrome components of pictures displayed from the corrected signals with respect to the received monochrome mixed highs.

62. A receiving system according to claim 51, wherein said correction means includes means for maintaining substantial fidelity of the monochrome components of pictures displayed from the corrected signals with respect to the low frequency portion of the received monochrome signal.

63. A receiving system according to claim 58, wherein said mode decision circuit additionally produces an output control signal in response to excess signal noise and said mode control circuit disables said correction circuit for relative noise levels above a selected value.

64. A receiving system according to claim 51, wherein said correction circuit includes a bandsplitter for separating the wideband monochrome signal into said low frequency and high frequency portions.

65. A receiving system according to claim 51, wherein said composite color television signal is an NTSC type signal having first and second chrominance signals of unequal bandwidths and said correction circuit includes bandsplitter means for processing the wideband monochrome signal to produce first and second band pairs, said first pair having a low frequency portion substantially comparable in bandwidth to said first chrominance signal and a high frequency portion substantially complementary thereto and said second pair having a low frequency portion substantially comparable in bandwidth to said second chrominance signal and a high frequency portion substantially complementary thereto.

66. A receiving system according to claim 51, which includes bandlimiting means for reducing the bandwidth of at least one of said chrominance signals to effectively reduce unwanted monochrome to color cross-talk, wherein the inferred step highs components provide substantially full monochrome bandwidth transient response in the displayed color step transitions.

67. A receiving system according to claim 51, wherein said receiver additionally includes at least one chrominance passband filter having a gradual frequency roll-off response to minimize time smearing and ringing, wherein said inferred step highs components provide substantially full monochrome bandwidth transient response in the displayed color step transitions by virtue of the effective non-linear filter processing provided by said inferred step highs correction circuit.

68. A receiving system according to claim 51, wherein said correction circuit further includes threshold means for preventing the generation of excessively large correction signals when the magnitude of the rate-of-change of said low frequency portion of said monochrome signal falls below a selected value.

69. A receiving system according to claim 51, wherein said correction circuit further comprises threshold means for preventing corrections when the magnitude of the rate-of-change of said reduced bandwidth chrominance signal falls below a selected value.

70. A color television system in accordance with claim 51, which further includes threshold means responsive to a color-rate-space threshold contour controlled by one or more of said monochrome lows or chrominance lows rate-of-change signals.

71. A color television system for receiving a composite color television signal comprising a wide bandwidth monochrome video signal and a plurality of reduced bandwidth chrominance signals, wherein the absence of high frequency chrominance components can produce color display errors such as inaccurate highs, polarity reversals or errors in visual luminance which are visible in regions of sharp color transitions, said receiving system comprising:

receiving circuit means responsive to said composite color television signal for processing therefrom a wide bandwidth monochrome signal and a plurality of reduced bandwidth chrominance signals;

circuit means responsive to said received composite color television signal for processing therefrom a plurality of reduced bandwidth primary color signals;

inferred step highs correction circuit means comprising circuit means for processing for one or more of said primary color signals, respective inferred step high frequency color components which are substantially proportional in instantaneous value to the product of (1) a signal representative of the high frequency portion of said monochrome signal exceeding the bandwidth of said reduced bandwidth primary color signal, and (2) a signal representative of the time rate-of-change of said reduced bandwidth primary color signal, and (3) the inverse of a signal representative of the time rate-of-change of the low frequency portion of said monochrome signal having a bandwidth comparable to that of said reduced bandwidth color signal; and combining circuit means for effectively combining said inferred step high frequency color components with said reduced bandwidth primary color signals to effectively add missing step high frequency chrominance components to the signals to be displayed.

72. A receiving system according to claim 71, wherein each of the inferred high frequency color components comprises an alternating bipolar pulse occupying an epoch substantially within each said step transition interval and having correct polarity and amplitude to effectively restore the missing step high frequency chrominance components over a significant range of signal amplitudes.

73. A receiving system according to claim 71, wherein each of said inferred high frequency chrominance components is equal in instantaneous value to the product of: (1) a signal representative of the high frequency portion of said monochrome signal; and (2) a signal representative of the time rate-of-change of said respective reduced bandwidth primary color signal; and (3) the inverse of said signal representative of the time rate-of-change of the low frequency portion of said monochrome signal.

74. A receiving system according to claim 71, wherein each of said inferred high frequency color components is monotonically proportional in instantaneous value to the product of: (1) a signal representative of the high frequency portion of said monochrome signal; and (2) a signal representative of the time rate-of-change of said respective reduced bandwidth primary color signal; and (3) the inverse of said signal representative of the time rate-of-change of the low frequency portion of said monochrome signal.

75. A receiving system according to claim 71, wherein each of said inferred high frequency chrominance components is monotonically proportional at least in polarity to the product of: (1) a signal representative of the high frequency portion of said monochrome signal; and (2) a signal representative of the time rate-of-change of said respective reduced bandwidth primary color signal; and (3) the inverse of said signal representative of the time rate-of-change of a low frequency portion of said monochrome signal.

76. A receiving system according to claim 71, further including a mode decision circuit for producing a mode control signal in response to components in the received signal that are characteristic of the existence of a step transition; and mode control circuit means responsive to said mode control signal for time-gating said correction circuit.

77. A receiving system according to claim 71, further including a mode decision circuit for producing a mode control signal in response to components in the received signals that are compatible with the existence of a step transition; and mode control circuit means responsive to said mode control signal for effectively enabling said correction circuit.

78. A receiving system according to claim 71, further including a mode decision circuit for producing a mode control signal in response to components in the received signals that are incompatible with the dominant existence of a step transition; and mode control circuit means responsive to said mode control signal for effectively disabling said correction circuit.

79. A receiving system according to claim 71, wherein said correction circuit further includes means for permitting effective selection of the amplitude of one or more of said inferred high frequency components.

80. A receiving system according to claim 71, wherein said correction circuit includes means for maintaining substantial fidelity of the monochrome components of pictures displayed from the corrected signals with respect to the received monochrome signal.

81. A receiving system according to claim 71, wherein said correction circuit includes means for maintaining substantial fidelity of the monochrome components of pictures displayed from the corrected signals with respect to the received monochrome mixed highs.

82. A receiving system according to claim 71, wherein said correction means includes means for maintaining substantial fidelity of the monochrome components of pictures displayed from the corrected signals with respect to the low frequency portion of the received monochrome signal.

83. A receiving system according to claim 78, wherein said mode decision circuit additionally produces an output control signal in response to excess signal noise and said mode control circuit disables said correction circuit for relative noise levels above a selected value.

84. A receiving system according to claim 71, wherein said correction circuit includes a bandsplitter for separating the wideband monochrome signal into said low frequency and high frequency portions.

85. A receiving system according to claim 71, wherein said composite color television signal is an NTSC type signal having first and second chrominance signals of unequal bandwidths and said correction circuit includes bansplitter means for processing the wideband monochrome signal to produce first and second pairs, said first pair having a low frequency portion substantially comparable in bandwidth to said first chrominance signal and a high frequency portion substantially complementary thereto and said second pair having a low frequency portion substantially comparable in bandwidth to said second chrominance signal and a high frequency portion substantially complementary thereto.

86. A receiving system according to claim 71, which includes bandlimiting means for reducing the bandwidth of at least one or said chrominance signals to effectively reduce unwanted monochrome to color cross-talk, wherein the inferred step highs components provide substantially full monochrome bandwidth transient response in the displayed color step transitions.

87. A receiving system according to claim 71, wherein said receiver additionally includes at least one chrominance passband filter having a gradual frequency roll-off response to minimize time smearing and ringing, wherein said inferred step highs components provide substantially full monochrome bandwidth transient response in the displayed color step transitions by virtue of the effective non-linear filter processing provided by said inferred step highs correction circuit.

88. A receiving system according to claim 71, wherein said correction circuit further includes threshold means for preventing the generation of excessively large correction signals when the magnitude of the rate-of-change of said low frequency portion of said monochrome signal falls below a selected value.

89. A receiving system according to claim 71, wherein said correction circuit further comprises threshold means for preventing corrections when the magnitude of the rate-of change of said reduced bandwidth color signal falls below a selected value.

90. A color television system in accordance with claim 71, which further includes threshold means responsive to a color-rate-space threshold contour controlled by one or more of said monochrome lows or color lows rate-of-change signals.

91. A color television system for receiving a composite color television signal comprising a wide bandwidth monochrome video signal and a plurality of reduced bandwidth chrominance signals, wherein the absence of high frequency chrominance components can produce color display errors such as inaccurate highs, polarity reversals or errors in visual luminance which are visible in regions of sharp color transitions, said receiving system comprising:
  receiving circuit means responsive to said composite color television signal for processing therefrom a wide bandwidth monochrome signal and one or more reduced bandwidth primary color signals;
  inferred step highs correction circuit means comprising (1) circuit means responsive to said wide bandwidth monochrome signal and one or more of said reduced bandwidth primary color signals for processing for each said reduced bandwidth primary color signal, a ratio signal representative of the ratio of the time rate-of-change of said primary color signal to the time rate-of-change of a comparable bandwidth low frequency portion of said monochrome signal, and (2) circuit means responsive to said wide bandwidth monochrome signal and said ratio signals for processing for each of said one or more primary color signals an inferred step high frequency color component substantially proportional in instantaneous value to the product of said ratio signal and a signal representative of the high frequency portion of said monochrome signal exceeding the bandwidth of said primary color signal, and
  combining circuit means for effectively combining said inferred step high frequency color components with said reduced bandwidth primary color signals to effectively add missing step high frequency chrominance components to the signals to be displayed.

92. A receiving system according to claim 91, wherein each of the inferred high frequency color components comprises an alternating bipolar pulse occupying an epoch substantially within each said step transition interval and having correct polarity and amplitude to substantially restore the missing step high frequency color components over a significant range of signal amplitudes.

93. A receiving system according to claim 91, wherein each of said inferred high frequency color components is equal in instantaneous value to the product of said ratio signal and said signal representative of the monochrome high frequency portion.

94. A receiving system according to claim 91, wherein each of said inferred high frequency color components is monotonically proportional in instantaneous value to the product of said ratio signal and said signal representative of the monochrome high frequency portion.

95. A receiving system according to claim 91, wherein each of said inferred high frequency color components is monotonically proportional at least in polarity to the product of said ratio signal and said signal representative of the high frequency portion of said monochrome signal.

96. A receiving system according to claim 91, further including a mode decision circuit for producing a mode control signal in response to components in the received signal that are characteristic of the existence of a step transition; and mode control circuit means responsive to said mode control signal for time-gating said correction circuit.

97. A receiving system according to claim 91, further including a mode decision circuit for producing a mode control signal in response to components in the received signals that are compatible with the existence of a step transition; and mode control circuit means responsive to said mode control signal for effectively enabling said correction circuit.

98. A receiving system according to claim 91, further including a mode decision circuit for producing a mode control signal in response to components in the received signals that are incompatible with the dominant existence of a step transition; and mode control circuit means responsive to said mode control signal for effectively disabling said correction circuit.

99. A receiving system according to claim 91, wherein said correction circuit further includes means for permitting effective selection of the amplitude of one or more of said inferred high frequency components.

100. A receiving system according to claim 91, wherein said correction circuit includes means for maintaining substantial fidelity of the monochrome components of pictures displayed from the corrected signals with respect to the received monochrome signal.

101. A receiving system according to claim 91, wherein said correction circuit includes means for maintaining substantial fidelity of the monochrome components of pictures displayed from the corrected signals with respect to the received monochrome mixed highs.

102. A receiving system according to claim 91, wherein said correction means includes means for maintaining substantial fidelity of the monochrome components of pictures displayed from the corrected signals with respect to the low frequency portion of the received monochrome signal.

103. A receiving system according to claim 98, wherein said mode decision circuit additionally produces an output control signal in response to excess signal noise and said mode control circuit disables said correction circuit for relative noise levels above a selected value.

104. A receiving system according to claim 91, wherein said correction circuit includes a bandsplitter for separating the wideband monochrome signal into said low frequency and high frequency portions.

105. A receiving system according to claim 91, wherein said composite color television signal is an NTSC type signal having first and second chrominance signals of unequal bandwidths and said correction circuit includes bandsplitter means for processing the wideband monochrome signal to produce first and second band pairs, said first pair having a low frequency portion substantially comparable in bandwidth to said first chrominance signal and a high frequency portion substantially complementary thereto and said second pair having a low frequency portion substantially comparable in bandwidth to said second chrominance signal and a high frequency portion substantially complementary thereto.

106. A receiving system according to claim 91, which includes bandlimiting means for reducing the bandwidth of at least one of said chrominance signals to effectively reduce unwanted monochrome to color cross-talk, wherein the inferred step highs components provide substantially full monochrome bandwidth transient response in the displayed color step transitions.

107. A receiving system according to claim 91, wherein said receiver additionally includes at least one chrominance passband filter having a gradual frequency roll-off response to minimize time smearing and ringing, wherein said inferred step highs components provide substantially full monochrome bandwidth transient response in the displayed color step transitions by virtue of the effective non-linear filter processing provided by said inferred step highs correction circuit.

108. A receiving system according to claim 91, wherein said correction circuit further includes threshold means for preventing the generation of excessively large correction signals when the magnitude of the rate-of-change of said low frequency portion of said monochrome signal falls below a selected value.

109. A receiving system according to claim 91, wherein said correction circuit further comprises threshold means for preventing corrections when the magnitude of the rate-of-change of a reduced bandwidth color signal falls below a selected value.

110. A color television system in accordance with claim 91, which further includes threshold means responsive to a color-rate-space threshold contour controlled by one or more of said monochrome lows or color lows rate-of-change signals.

111. A receiving system according to claim 91, wherein said correction circuit additionally includes circuit means for effectively adding to each said ratio signal a reference signal of substantially unity value to produce a composite control signal and circuit means jointly responsive to said composite control signals and to said monochrome signal for processing for each said primary color signal an inferred high frequency component substantially proportional to the product of said respective composite control signal and a high frequency portion of said monochrome signal.

112. A color television system for receiving a composite color television signal comprising a wide bandwidth monochrome video signal and a plurality of reduced bandwidth chrominance signals, wherein the absence of high frequency chrominance components can produce color display errors such as inaccurate highs, polarity reversals or errors in visual luminance which are visible in regions of sharp color transitions, said receiving system comprising:

receiving circuit means responsive to said composite color television signal for processing therefrom a wide bandwidth monochrome signal and one or more reduced bandwidth primary color signals;

inferred step highs correction circuit means comprising (1) circuit means responsive to said wide bandwidth monochrome signal for processing therefrom one or more monochrome ratio signals proportional to the ratio of a signal representative of the high frequency portion of said wide bandwidth monochrome signal exceeding the bandwidth range of a reduced bandwidth primary color signal to a signal representative of the time rate-of-change of the low frequency portion of said wide bandwidth monochrome signal having a bandwidth comparable to that of said primary color signal, (2) circuit means responsive to said monochrome ratio signals and to said reduced bandwidth primary color signals for processing for each said primary color signal, an inferred high frequency color component substantially proportional to the product of said monochrome ratio signal and the time rate-of-change of said reduced bandwidth primary color signal; and combining circuit means for effectively combining said inferred high frequency color components with said reduced bandwidth primary color signals to effectively add missing step high frequency inferred chrominance components to the signals to be displayed.

113. A receiving system according to claim 112, wherein each of the inferred high frequency color components comprises an alternating bipolar pulse occupying an epoch substantially within each said step transition interval and having correct polarity and amplitude to substantially restore the missing step high frequency color components over a significant range of signal amplitudes.

114. A receiving system according to claim 112, wherein each of said inferred high frequency color components is equal in instantaneous value to the product of said ratio signal and a signal representative of the time rate-of-change of said respective reduced bandwidth color signal.

115. A receiving system according to claim 112, wherein each of said inferred high frequency chrominance components is monotonically proportional in instantaneous value to the product of said ratio signal and a signal representative of the time rate-of-change of said respective reduced bandwidth color signal.

116. A receiving system according to claim 112, wherein each of said inferred high frequency chrominance components is monotonically proportional at least in polarity to the product of said ratio signal and a signal representative of the time rate-of-change of said respective reduced bandwidth color signal.

117. A receiving system according to claim 112, further including a mode decision circuit for producing a mode control signal in response to components in the received signal that are characteristic of the existence of a step transition; and mode control circuit means responsive to said mode control signal for time-gating said correction circuit.

118. A receiving system according to claim 112, further including a mode decision circuit for producing a mode control signal in response to components in the received signals that are compatible with the existence of a step transition; and mode control circuit means responsive to said mode control signal for effectively enabling said correction circuit.

119. A receiving system according to claim 112, further including a mode decision circuit for producing a mode control signal in response to components in the received signals that are incompatible with the dominant existence of a step transition; and mode control circuit means responsive to said mode control signal for effectively disabling said correction circuit.

120. A receiving system according to claim 112, wherein said correction circuit further includes means for permitting effective selection of the amplitude of one or more of said inferred high frequency components.

121. A receiving system according to claim 112, wherein said correction circuit includes means for maintaining substantial fidelity of the monochrome components of pictures displayed from the corrected signals with respect to the received monochrome signal.

122. A receiving system according to claim 112, wherein said correction circuit includes means for maintaining substantial fidelity of the monochrome components of pictures displayed from the corrected signals with respect to the received monochrome mixed highs.

123. A receiving system according to claim 112, wherein said correction means includes means for maintaining substantial fidelity of the monochrome components of pictures displayed from the corrected signals with respect to the low frequency portion of the received monochrome signal.

124. A receiving system according to claim 119, wherein said mode decision circuit additionally produces an output control signal in response to excess signal noise and said mode control circuit disables said correction circuit for relative noise levels above a selected value.

125. A receiving system according to claim 112, wherein said correction circuit includes a bandsplitter for separating the wideband monochrome signal into said substantially complementary low frequency and high frequency portions.

126. A receiving system according to claim 112, wherein said composite color television signal is an NTSC type signal having first and second chrominance signals of unequal bandwidths and said correction circuit includes bandsplitter means for processing the wideband monochrome signal to produce first and second band pairs, said first pair having a low frequency portion substantially comparable in bandwidth to said first chrominance signal and a high frequency portion substantially complementary thereto and said second pair having a low frequency portion substantially comparable in bandwidth to said second chrominance signal and a high frequency portion substantially complementary thereto.

127. A receiving system according to claim 112, which includes bandlimiting means for reducing the bandwidth of at least one of said chrominance signals to effectively reduce unwanted monochrome to color cross-talk, wherein the inferred step highs components provide substantially full monochrome bandwidth transient response in the displayed color step transitions.

128. A receiving system according to claim 112, wherein said receiver additionally includes at least one chrominance passband filter having a gradual frequency roll-off response to minimize time smearing and ringing, wherein said inferred step highs components provide substantially full monochrome bandwidth transient response in the displayed color step transitions by virtue of the effective non-linear filter processing provided by said inferred step highs correction circuit.

129. A receiving system according to claim 112, wherein said correction circuit further includes threshold means for preventing the generation of excessively large correction signals when the magnitude of the rate-of-change of said low frequency portion of said monochrome signal falls below a selected value.

130. A receiving system according to claim 112, wherein said correction circuit further comprises threshold means for preventing corrections when the magnitude of the rate-of-change of a reduced bandwidth color signal falls below a selected value.

131. A color television system in accordance with claim 112, which further includes threshold means responsive to a color-rate-space threshold contour controlled by one or more of said monochrome lows or color lows rate-of-change signals.

132. A color television receiving system for receiving a composite color television signal comprising a wide bandwidth monochrome video signal and a plurality of reduced bandwidth chrominance signals, wherein the absence of high frequency chrominance components can produce color errors such as incorrect highs, polarity reversals or errors in visual luminance which are visible in regions of sharp color transitions, said receiving system comprising:

receiving circuit means responsive to a composite color television signal for processing therefrom a wide bandwidth monochrome signal and a modulated chrominance subcarrier signal comprising a plurality of reduced bandwidth chrominance signals;

inferred step highs correction circuit means for effectively supplementing said modulated chrominance subcarrier signal with a modulated subcarrier signal comprising inferred high frequency chrominance components which are substantially proportional in instantaneous value to the product of (1) a signal representative of the high frequency portion of said monochrome signal; and (2) a signal representative of the time rate-of-change of said reduced bandwidth chrominance signal; and (3) the inverse of a signal representative of the time rate-of-change of the low frequency portion of said monochrome signal; the bandwidth of said low frequency monochrome portion being substantially comparable to that of a respective chrominance signal and the bandwidth of the high frequency portion of said monochrome signal being substantially complementary to that of a low frequency portion of said monochrome signal; and means responsive to said supplemented modulated chrominance subcarrier for processing supplemented chrominance signals therefrom.

133. A receiving system according to claim 132, wherein said inferred step highs correction circuit includes differentiating circuit means responsive to said modulated chrominance subcarrier for differentiating said chrominance components on said subcarrier.

134. A receiving system according to claim 132, wherein said differentiating means includes:

circuit means responsive to said modulated chrominance subcarrier for producing a first output signal representative of a time derivative of said modulated chrominance subcarrier;

means responsive to said modulated chrominance subcarrier for producing a second output signal representative of said modulated chrominance subcarrier phase delayed by substantially 90°; and circuit means for differentially combining said first and second output signals to provide an output signal having time-differentiated chrominance modulation components.

135. A receiving system according to claim 132, wherein each of the inferred high frequency chrominance subcarrier components comprises an alternating bipolar pulse occupying an epoch substantially within each said step transition interval and having correct polarity and amplitude to substantially restore the missing step high frequency chrominance components over a significant range of signal amplitudes.

136. A receiving system according to claim 132, wherein each of said inferred high frequency chrominance components is equal in instantaneous value to the product of: (1) a signal representative of the high frequency portion of said monochrome signal; and (2) a signal representative of the time rate-of-change of said respective reduced bandwidth chrominance signal; and (3) the inverse of a signal representative of the time rate-of-change of the low frequency portion of said monochrome signal.

137. A receiving system according to claim 132, wherein each of said inferred high frequency chrominance components is monotonically proportional in instantaneous value to the product of: (1) a signal representative of the high frequency portion of said monochrome signal; and (2) a signal representative of the time rate-of-change of said respective reduced bandwidth chrominance signal; and (3) the inverse of a signal representative of the time rate-of-change of the low frequency portion of said monochrome signal.

138. A receiving system according to claim 132, wherein each of said inferred high frequency chrominance components is monotonically proportional at least in polarity to the product of: (1) a signal representative of the high frequency portion of said monochrome signal; and (2) a signal representative of the time rate-of-change of said respective reduced bandwidth chrominance signal; and (3) the inverse of a signal representative of the time rate-of-change of a low frequency portion of said monochrome signal.

139. A receiving system according to claim 132, further including a mode decision circuit for producing a mode control signal in response to components in the received signal that are characteristic of the existence of a step transition; and mode control circuit means responsive to said mode control signal for time-gating said correction circuit.

140. A receiving system according to claim 132, further including a mode decision circuit for producing a mode control signal in response to components in the received signals that are compatible with the existence of a step transition; and mode control circuit means responsive to said mode control signal for effectively enabling said correction circuit.

141. A receiving system according to claim 132, further including a mode decision circuit for producing a mode control signal in response to components in the received signals that are incompatible with the dominant existence of a step transition; and mode control circuit means responsive to said mode control signal for effectively disabling said correction circuit.

142. A receiving system according to claim 132, wherein said correction circuit further includes means for permitting effective selection of the amplitude of one or more of said inferred high frequency components.

143. A receiving system according to claim 132, wherein said correction circuit includes means for maintaining substantial fidelity of the monochrome components of pictures displayed from the corrected signals with respect to the received monochrome signal.

144. A receiving system according to claim 132, wherein said correction circuit includes means for maintaining substantial fidelity of the monochrome components of pictures displayed from the corrected signals with respect to the received monochrome mixed highs.

145. A receiving system according to claim 132, wherein said correction means includes means for maintaining substantial fidelity of the monochrome components of pictures displayed from the corrected signals with respect to the low frequency portion of the received monochrome signal.

146. A receiving system according to claim 141, wherein said mode decision circuit additionally produces an output control signal in response to excess signal noise and said mode control circuit disables said correction circuit for relative noise levels above a selected value.

147. A receiving system according to claim 132, wherein said correction circuit includes a bandsplitter for separating the wideband monochrome signal into said substantially complementary low frequency and high frequency portions.

148. A receiving system according to claim 132, which includes bandlimiting means for reducing the bandwidth of at least one of said chrominance signals to effectively reduce unwanted monochrome to color cross-talk, wherein the inferred step highs components provide substantially full monochrome bandwidth transient response in the displayed color step transitions.

149. A receiving system according to claim 132, wherein said receiver additionally includes at least one chrominance passband filter having a gradual frequency roll-off response to minimize time smearing and ringing, wherein said inferred step highs components provide substantially full monochrome bandwidth transient response in the displayed color step transitions by virtue of the effective non-linear filter processing provided by said inferred step highs correction circuit.

150. A receiving system according to claim 132, wherein said correction circuit further includes threshold means for preventing the generation of excessively large correction signals when the magnitude of the rate-of-change of said low frequency portion of said monochrome signal falls below a selected value.

151. In a color television receiving system for receiving a composite color television signal comprising a wide bandwidth monochrome video signal and a plurality of reduced bandwidth chrominance signals, wherein the absence of high frequency chrominance components, particularly in regions of step transitions wherein one primary color increases while another primary color decreases, can result in visible color and luminance display errors, including reversed polarity of the high frequency components of one primary color signal, circuit means for producing during the time epochs of said step transitions, inferred step high frequency components of such polarity as to reduce the visibility of said display errors and substantially eliminate such polarity reversals, said means comprising:
- circuit means responsive to said wide bandwidth monochrome signal for processing therefrom (1) one or more low frequency monochrome components comparable in bandwidth and frequency range to the bandwidth of respective reduced bandwidth chrominance signals and (2) one or more respective high frequency monochrome components having bandwidths complementary to those of the respective low frequency monochrome components;
- circuit means responsive to (1) said reduced bandwidth chrominance signals, (2) respective comparable low frequency monochrome components, and (3) respective complementary high frequency monochrome components, for separately processing for each said chrominance signal, an inferred high frequency chrominance component having a polarity the same as the polarity of the ratio between the time rate-of-change of said chrominance signal and the time rate-of-change of said low frequency monochrome component; and
- circuit means for effectively combining said inferred high frequency components with the signals to be displayed, thereby substantially preventing said polarity reversals.

152. In a color television system for receiving a composite color television signal including a wide bandwidth monochrome video signal and a plurality of reduced bandwidth chrominance signals, wherein the display of monochrome mixed highs in lieu of complete high frequency color components produces visible color and luminance display errors in image regions having step transitions, means for generating step inferred high frequency correction signals for each of said chrominance signals to reduce the visibility of said display errors, said means comprising:
- means for separating the wide bandwidth monochrome signal into mixed low frequency transient step transition components and mixed high frequency components;
- circuit means for separately deriving low frequency transient step transition components in each of said plural chrominance signals; and
- means for effectively generating for each of said chrominance signals an inferred step highs correction signal that is proportional in instantaneous value to the product of (1) the monochrome mixed highs signal and (2) the respective chrominance low frequency transient step transition components and (3) the inverse of the monochrome low frequency transient step transition components.

153. In a color television system having a composite color television signal including a wide bandwidth monochrome video signal and a plurality of narrow bandwidth chrominance signals relatively limited to low frequencies so as to cause color infidelities in the region of step transitions, signal processing means for producing aggregate video signals including inferred corrective step transition chrominance signal components of correct amplitude, polarity and duration for correcting signal step transitions between any two colors, said signal processing means comprising:

signal processing means responsive to said narrow bandwidth chrominance signals along one or more chrominance axes to effectively provide signals representative of the rate-of-change thereof;

signal processing means responsive to said wide bandwidth monochrome signal to effectively provide a signal representative of the rate-of-change of a monochrome low frequencies component comparable in translational frequency response to a corresponding chrominance signal and a monochrome high frequencies component complementary to said monochrome low frequencies component; and circuit means including signal combining means to generate composite video signal components effectively including inferred chrominance high frequency components generally proportional to the product of the rate-of-change of said narrow bandwidth chrominance signal and the ratio of the monochrome high frequencies component to the rate-of-change of the monochrome low frequencies component.

154. A receiving system according to claim 153, further including a mode decision circuit for producing a mode control signal in response to components in the received signal that are characteristic of the existence of a step transition; and mode control circuit means responsive to said mode control signal for time-gating said correction circuit.

155. A receiving system according to claim 153, further including a mode decision circuit for producing a mode control signal in response to components in the received signals that are compatible with the existence of a step transition; and mode control circuit means responsive to said mode control signal for effectively enabling said correction circuit.

156. A receiving system according to claim 153, further including a mode decision circuit for producing a mode control signal in response to components in the received signals that are incompatible with the dominant existence of a step transition; and mode control circuit means responsive to said mode control signal for effectively disabling said correction circuit.

157. A color television system as in claim 153, wherein said combining means includes circuit means for signal comparison and normalization of a signal derived from the monochrome highs and a signal derived from the rate-of-change of the monochrome lows for producing one or more waveform signatures representative thereof;

signature evaluation means responsive thereto to apply preselected evaluation criteria related to signature shape, amplitude and polarity for effective recognition of said waveform signatures being either characteristic of, compatible with or incompatible with the existence of a ratio of monochrome highs to the rate-of-change of monochrome lows characteristic of a step transition; and circuit means to either (1) time gate, (2) enable or (3) disable effective inclusion of inferred chrominance highs in the composite chrominance signals therefrom.

158. A color television system as in claim 153, including threshold means responsive to a color-rate-space threshold contour controlled by one or more of said lows rate-of-change signals.

159. A color television system for receiving a composite color television signal comprising a wide bandwidth monochrome video signal and a plurality of reduced bandwidth chrominance signals, wherein the absence of high frequency chrominance components can produce color display errors such as inaccurate highs, polarity reversals or errors in visual luminance which are visible in regions of sharp color transitions, said receiving system comprising:

receiving circuit means responsive to said composite color television signal for processing therefrom a wide bandwidth monochrome signal and a plurality of reduced bandwidth chrominance signals;

mode controllable inferred step highs correction circuit means responsive to said wide bandwidth monochrome signal and said reduced bandwidth chrominance signals processing and effectively separately combining with said received reduced bandwidth chrominance signals, inferred demixed highs for reducing the visibility of said display errors;

mode decision circuit means responsive to components in the received signals for detecting one or more signal compositions which are either (1) characteristic of, (2) compatible with, or (3) incompatible with the existence of a step color transition; and for producing an output mode control signal; and mode control circuit means responsive to the output of said mode decision circuit for either (1) time-gating, (2) enabling, or (3) disabling said mode controllable correction circuit.

160. A color television system as in claim 159, wherein said mode decision circuit includes means for effecting comparison and normalization of a signal derived from the monochrome highs and a signal derived from the rate-of-change of the monochrome lows for producing one or more waveform signatures representative thereof;

evaluation means responsive to said waveform signatures to apply preselected evaluation criteria related to signature shape, amplitude and polarity and produce a mode control signal in recognition of said waveform signatures either as being characteristic of, compatible with or incompatible with the existence of a ratio of monochrome highs to the rate-of-change of monochrome lows characteristic of a step transition.

161. A receiving system according to claim 159, wherein:

said controllable inferred highs correction circuit is normally off except when keyed on or enabled;

said mode decision circuit comprises circuit means responsive to components in the received signals for detecting a signal relationship characteristic of step transitions; and said mode control circuit comprises circuit means responsive to said mode decision circuit for time-gating said controllable inferred highs correction circuit by keying on said correction circuit during substantially only the epoch of said step transitions.

162. A receiving system according to claim 159, wherein:

said controllable inferred highs correction circuit is normally off except when keyed on or enabled;

said mode decision circuit includes circuit means responsive to components in the received signal for detecting a signal relationship compatible with the existence of step transitions; and said mode control circuit comprises circuit means for enabling said controllable inferred highs correction circuit during periods of a signal relationship compatible with the existence of step transitions.

163. A receiving system according to claim 159, wherein:
said controllable inferred highs correction circuit is normally on except when disabled;
said mode decision circuit includes circuit means responsive to components in the received signal for detecting a signal relationship incompatible with the existance of step transitions; and
said mode control circuit comprises means for disabling said controllable inferred highs correction circuit during periods of a signal relationship incompatible with the existence of step transitions.

164. A receiving system according to claim 159, wherein said mode decision circuit includes:
circuit means responsive to components of said monochrome circuit for processing a comparison signal derived from a comparison of a signal representative of the high frequency portion of the monochrome signal with a dynamic signal derived from the low frequency portion of said monochrome signal; and
evaluation circuit means for determining whether or not said comparison signal has a waveform signature characteristic of, compatible with, or incompatible with the existence of a step transient.

165. A receiving system according to claim 164, which further includes means for constraining the respective high and low frequency portions of said monochrome signal which are compared to substantially non-overlapping frequency bands.

166. A receiving system according to claim 164, which further includes means for constraining the respective high and low frequency portions of said monochrome signal which are compared to partially overlapping frequency bands.

167. A receiving system according to claim 164, further comprising:
circuit means responsive to one or more received chrominance signals for processing a chrominance rate signal representative of the magnitude of the time rate-of-change of one or more chrominance components; and
threshold means for determining whether or not said chrominance rate signal exceeds or is less than a selected threshold level indicative of the probable existence of a step transient.

168. A receiving system according to claim 164, wherein said comparison signal is the ratio of the monochrome highs to the first order time derivative of the monochrome lows.

169. A receiving system according to claim 164, wherein said comparison signal is the ratio of the first order time derivative of the monochrome highs to the first order time derivative of the monochrome lows.

170. A receiving system according to claim 164, wherein said comparison signal is the ratio of the monochrome highs to the second order time derivative of the monochrome lows.

171. A receiving system according to claim 164, wherein said evaluation circuit means includes an amplitude window.

172. A receiving system according to claim 164, wherein said evaluation circuit means comprises a circuit means for processing a signal representative of the magnitude of the aggregate difference between samples of the comparison signal and a plurality of reference levels characteristic of a step transition.

173. A receiving system according to claim 164, which additionally includes circuit means responsive to said comparison signal for producing an output signal representative of an integrated rectified measure of said comparison signal; and amplitude window means for evaluating said output signal to produce either an enabling signal indicating compatibility with the existence of a step transition or a disabling signal indicating signal characteristics incompatible with the existence of a step transition.

174. A receiving system according to claim 172, further comprising circuit means for providing a keying pulse upon the substantial nulling of said signal representative of the magnitude of said difference within the effective epoch of a step transition.

175. A receiving system according to claim 164, wherein said evaluation circuit comprises circuit means for processing a signal measure representative of the sum of rectified differences between samples of the comparison signal and a plurality of reference signals characteristic of a step transition, and circuit means responsive to said signal measure for producing a time-gating signal during the epoch of a step transition.

176. A receiving system according to claim 164, wherein the comparison signal is further processed in sequency by a limited range translator and a near matched filter the output of which is supplied to a threshold amplitude window for generating a step-timing and enabling signal in response to an incoming comparison signal having a step characteristic waveform.

177. A receiving system according to claim 164, wherein said comparison signal is generated by comparing an integrated rectified measure of the monochrome highs with an integrated rectified measure of the time rate-of-change of the monochrome lows and an amplitude window responsive to said comparison signal is provided to produce a disabling control signal when the comparison signal exceeds a predetermined threshold level.

178. A receiving system according to claim 164, wherein said evaluation circuit includes waveform verification means having at least one amplitude window responsive to said comparison signal to produce an output signal indicating an amplitude characteristic of a step transition; circuit means for concurrently comparing the wave shape of said comparison signal with the wave shape of a signal generated by a reference generator to produce a comparator output signal indicating a comparison signal wave shape characteristic of a step transition; and confirming gate means concurrently responsive to said window output signal and said waveform comparator output signal to produce a step-timing and enabling pulse verifying a waveform signature compatible with the presence of a step transition.

179. A receiving system according to claim 164, wherein said system includes means responsive to the monochrome signal to produce a normalized comparison signal $\rho_{11}$ proportional in amplitude to the ratio of a signal representative of the rate-of-change of monochrome high frequency components with respect to a signal representative of the rate-of-change of monochrome low frequency components, circuit means for dynamically comparing the waveform of said $\rho_{11}$ signal with a reference source to produce a gate trigger signal identifying the incidence of a step transition, and a keyed time gate responsive to said trigger signal for producing a step-timing pulse having time initiation and time duration substantially time correllated with the epoch of a step transition.

180. A receiving system according to claim 164, wherein said mode decision circuit means comprises a circuit means for processing and evaluating at least two comparison signals comprising components related in quadrature.

181. A receiving system according to claim 164, wherein said mode decision circuit means comprises circuit means for concurrently processing and evaluating at least two comparison signals comprising components related in quadrature.

182. Inferred step highs correction circuit means for processing correction components for a composite color television signal comprising a wide bandwidth monochrome video signal and a plurality of reduced bandwidth chrominance signals including associated reduced bandwidth primary color signals, wherein the absence of high frequency chrominance components can produce color or luminance display errors which are visible in regions of sharp color transitions, said correction circuit comprising:
 plural circuit means separately responsive to the high and low frequency components of the wideband monochrome signal and to the plural chrominance signals for processing for each of one or more reduced bandwidth chrominance signals respective inferred high frequency chrominance components which are substantially proportional in instantaneous value to the product of (1) a signal representative of the value of the high frequency portion of said wideband monochrome signal exceeding the bandwidth of said reduced bandwidth chrominance signal and (2) a signal representative of the time rate-of-change of said reduced bandwidth chrominance signal and (3) the inverse of a signal representative of the time rate-of-change of the low frequency portion of said wideband monochrome signal having a bandwidth comparable to the bandwidth of said reduced bandwidth chrominance signal.

183. A receiving system according to claim 182, wherein said receiving circuit comprises circuit means responsive to said received signals for processing therefrom one or more reduced bandwidth primary color signals; said correction circuit comprises means for processing for each said primary color signal, an inferred high frequency color component which is substantially proportional to the product of (1) a signal representative of said high frequency portion of said monochrome signal, and (2) a signal representative of the time rate-of-change of said reduced bandwidth primary color signal, and (3) the inverse of a signal representative of the time rate-of-change of a low frequency portion of said monochrome signal.

184. A receiving system according to claim 182, wherein each of said inferred high frequency chrominance components is monotonically proportional in instantaneous value to the product of said three signals.

185. A receiving system according to claim 182, further including a mode decision circuit for producing a mode control signal in response to components in the received signal that are characteristic of the existence of a step transition, and mode control circuit means responsive to said mode control signal for time-gating said correction circuit.

186. A receiving system according to claim 182, further including a mode decision circuit for producing a mode control signal in response to components in the received signals that are compatible with the existence of a step transition; and mode control circuit means responsive to said mode control signal for effectively enabling said correction circuit.

187. A receiving system according to claim 182, further including a mode decision circuit for producing a mode control signal in response to components in the received signals that are incompatible with the dominant existence of a step transition; and mode control circuit means responsive to said mode control signal for effectively disabling said correction circuit.

188. A method for reducing color and luminance errors in the display of a color television signal comprising a wide bandwidth monochrome signal and a plurality of reduced bandwidth chrominance signals, comprising the steps of:
 processing for one or more of said reduced bandwidth chrominance signal, respective inferred high frequency chrominance components which are substantially proportional to the product of (1) a signal representative of the value of the high frequency portion of said wide bandwith monochrome signal exceeding the bandwidth of said reduced bandwidth chrominance signal, and (2) a signal representative of the time rate-of-change of said reduced bandwidth chrominance signal, and (3) the inverse of a signal representative of the time rate-of-change of a low frequency portion of said wide bandwidth monochrome signal; and
 effectively separately adding said inferred high frequency chrominance components to said respective reduced bandwidth chrominance signals.

189. A method according to claim 188, comprising the step of processing for one or more of said associated primary color signals, respective inferred high frequency color components which are substantially proportional to the product of (1) a signal representative of the high frequency portion of said monochrome signal exceeding the bandwidth of said reduced bandwidth primary color signal, and (2) a signal representative of the time rate-of-change of said reduced bandwidth primary color signal, and (3) the inverse of a signal representative of the time rate-of-change of the low frequency portion of said monochrome signal.

190. A color television system for receiving a composite color television signal comprising a wide bandwidth monochrome video signal and a plurality of reduced bandwidth chrominance signals, wherein the absence of high frequency chrominance components can produce color display errors such as inaccurate highs, polarity reversals or errors in visual luminance which are visible in regions of sharp color transitions, said receiving system comprising:
 signal processing means responsive to said wideband monochrome signal to produce an output control signal representative of the instantaneous ratio of the monochrome mixed highs relative to the rate-of-change of monochrome mixed lows;
 signal translation means responsive to said reduced bandwidth chrominance signals and said control signal for generating a first inferred chrominance highs correction signal proportional to the product of (1) said control signal, (2) a signal representative of the instantaneous magnitude of chrominance rate and (3) a signal representative of the sine of the instantaneous chrominance rate phase angle; and a second chrominance highs correction signal proportional to the product of (1) said control signal, (2) a signal representative of the instantaneous magnitude of chrominance rate and (3) a signal representative of the cosine of the instantaneous chrominance phase angle.

191. A color television system for receiving a composite color television signal comprising a wide bandwidth monochrome video signal and a plurality of reduced bandwidth chrominance signals, wherein the absence of high frequency chrominance components can produce color display errors such as inaccurate highs, polarity reversals or errors in visual luminance which are visible in regions of sharp color transitions, said receiving system comprising:
 (a) means responsive to said plural reduced bandwidth chrominance signals to produce a chrominance rate magnitude signal representative of a monotonic measure of the instantaneous magnitude of chrominance rate;
 (b) means responsive to said wide bandwidth monochrome signal to produce a differential control signal proportional in instantaneous value to the ratio of a signal representative of selected high frequency monochrome components with respect to a signal representative of the rate-of-change of selected low frequency monochrome components;
 (c) modulator means jointly responsive to said chrominance rate magnitude signal and said differential control signal to produce a product output signal proportional to the product of said chrominance rate magnitude signal and said differential control signals;
 (d) circuit means separately responsive to each said chrominance signal and to said chrominance rate magnitude signal to produce a chrominance phase output signal representative of the instantaneous phase of each said chrominance signal; and
 (e) correction circuit means for each chrominance signal for generating an inferred step highs signal proportional to the product of said product output signal and a respective chrominance phase output signal.

192. A receiving system according to claim 191, further including a mode decision circuit for producing a mode control signal in response to components in the received signal that are characteristic of the existence of a step transition; and mode control circuit means responsive to said mode control signal for time-gating said correction circuit.

193. A receiving system according to claim 191, further including a mode decision circuit for producing a mode control signal in response to components in the received signals that are compatible with the existence of a step transition; and mode control circuit means responsive to said mode control signal for effectively enabling said correction circuit.

194. A receiving system according to claim 191, further including a mode decision circuit for producing a mode control signal in response to components in the received signals that are incompatible with the dominant existence of a step transition; and mode control circuit means responsive to said mode control signal for effectively disabling said correction circuit.

195. A receiving system according to claim 191, wherein said correction circuit further includes means for permitting effective selection of the amplitude of one or more of said inferred high frequency components.

196. A receiving system according to claim 191, wherein said correction circuit includes means for maintaining substantial fidelity of the monochrome components of pictures displayed from the corrected signals with respect to the received monochrome signal.

197. A receiving system according to claim 191, wherein said correction circuit includes means for maintaining substantial fidelity of the monochrome components of pictures displayed from the corrected signals with respect to the received monochrome mixed highs.

198. A receiving system according to claim 191, wherein said correction means includes means for maintaining substantial fidelity of the monochrome components of pictures displayed from the corrected signals with respect to the low frequency portion of the received monochrome signal.

199. A receiving system according to claim 191, which includes bandlimiting means for reducing the bandwidth of at least one of said chrominance signals to effectively reduce unwanted monochrome to color cross-talk, wherein the inferred step highs components provide substantially full monochrome bandwidth transient response in the displayed color step transitions.

200. A receiving system according to claim 191, wherein said receiver additionally includes at least one chrominance passband filter having a gradual frequency roll-off response to minimize time smearing and ringing, wherein said inferred step highs components provide substantially full monochrome bandwidth transient response in the displayed color step transitions by virtue of the effective non-linear filter processing provided by said inferred step highs correction circuit.

201. A receiving system according to claim 191, wherein said correction circuit further includes threshold means for preventing the generation of excessively large correction signals when the magnitude of the rate-of-change of said low frequency portion of said monochrome signal falls below a selected value.

202. A receiving system according to claim 191, wherein said correction circuit further comprises threshold means for preventing corrections when the magnitude of the rate-of-change of said reduced bandwidth chrominance signal falls below a selected value.

203. In a color television system having a composite color television signal including a wide bandwidth monochrome video signal and a plurality of chrominance signals transmitted through channels of restricted bandwidth which remove the high frequency chrominance components, signal processing means for automatically producing corrective high frequency step transition chrominance signal components of correct amplitude, polarity and duration for signal step transitions between any two colors, said means comprising:
 (a) signal processing means responsive to said wideband monochrome signal for generating a monochrome ratio signal proportional to the ratio of step transition high frequency components to the rate-of-change of step transition low frequency components;
 (b) signal processing means responsive to said chrominance signals for generating separate chrominance rate-of-change output signals representative of the rate-of-change of low frequency step transition components in each of the plural chrominance signals;

(c) means jointly responsive to the separate rate-of-change output signals for producing an output chrominance rate magnitude signal;

(d) circuit means responsive to said chrominance rate-of-change output signals and said chrominance rate magnitude signal for generating a chrominance rate signal for each of said chrominance signals which is proportional to the ratio of the respective chrominance rate-of-change output signal and said chrominance rate magnitude signal;

(e) circuit means for generating an inferred step highs control signal proportional in amplitude to the product of said chrominance rate magnitude signal and said monochrome ratio signal; and (f) signal translation means for each of said plural chrominance signals for producing a corrective high frequency step transition chrominance signal proportional in amplitude to the product of said control signal and a respective chrominante rate signal.

204. A receiving system according to claim 203, further including a mode decision circuit for producing a mode control signal in response to components in the received signal that are characteristic of the existence of a step transition; and mode control circuit means responsive to said mode control signal for time-gating said correction circuit.

205. A receiving system according to claim 203, further including a mode decision circuit for producing a mode control signal in response to components in the received signals that are compatible with the existence of a step transition; and mode control circuit means responsive to said mode control signal for effectively enabling said correction circuit.

206. A receiving system according to claim 203, further including a mode decision circuit for producing a mode control signal in response to components in the received signals that are incompatible with the dominant existence of a step transition; and mode control circuit means responsive to said mode control signal for effectively disabling said correction circuit.

207. A receiving system according to claim 203, wherein said correction circuit further includes means for permitting effective selection of the amplitude of one or more of said inferred high frequency components.

208. A receiving system according to claim 203, wherein said correction circuit further includes threshold means for preventing the generation of excessively large correction signals when the amplitude of the rate-of-change of said low frequency portion of said monochrome signal falls below a selected value.

209. A receiving system according to claim 203, wherein said correction circuit further comprises threshold means for preventing corrections when the magnitude of the rate-of-change of said reduced bandwidth chrominance signal falls below a selected value.

210. Inferred step highs correction circuit means for processing correction components for a composite color television signal comprising a wide bandwidth monochrome video signal and a plurality of reduced bandwidth chrominance signals including associated reduced bandwidth primary color signals, wherein the absence of high frequency chrominance components can produce color or luminance display errors which are visible in regions of sharp color transitions, said correction circuit comprising:

detector means responsive to said composite signal for detecting the inferred presence of color step transitions and producing a transition control signal in response thereto;

circuit means for processing for each of one or more reduced bandwidth chrominance signals respective inferred high frequency chrominance components which are substantially proportional in instantaneous value to the product of (1) a signal representative of the value of the high frequency portion of said wide bandwidth monochrome signal exceeding the bandwidth of said reduced bandwidth chrominance signal and (2) a signal representative of the time rate-of-change of said reduced bandwidth chrominance signal and (3) the inverse of a signal representative of the time rate-of-change of the low frequency portion of said monochrome signal having a bandwidth comparable to that of said reduced bandwidth chrominance signal; and circuit means operatively controlled by said transition control signal to effectively time constrain each of said step highs correction signals to time intervals of duration corresponding to those of the inferred color step transitions.

211. Inferred step highs correction circuit means in accordance with claim 210, wherein said detector includes means for comparing a signal representative of the monochrome mixed highs relative to a signal representative of the rate-of-change of monochrome mixed lows.

212. Inferred step highs correction circuit means in accordance with claim 210, wherein said detector includes means for comparing a signal representative of the first order time derivative of the monochrome mixed highs relative to the first order time derivative of the monochrome mixed lows.

213. Inferred step highs correction means in accordance with claim 210, which includes means responsive to the monochrome signal to produce a normalized comparison signal $\rho_{11}$ proportional in amplitude to the ratio of a signal representative of the rate-of-change of monochrome high frequency components with respect to a signal representative of the rate-of-change of monochrome low frequency components, circuit means for dynamically comparing the waveform of said $\rho_{11}$ signal with a reference source to produce a gate trigger signal identifying the incidence of a step transition, and a keyed time gate responsive to said trigger signal for producing a step transition control signal having a time initiation and time duration substantially time correlated with the epoch of a step transition.

214. A color television system according to claim 152, wherein each of the inferred step high frequency correction signals comprises an alternating bipolar pulse occupying an epoch substantially within each step transition interval and having correct polarity and amplitude to substantially restore the missing step high frequency chrominance components over a significant range of signal amplitudes.

215. In a color television system for receiving a color television signal including a wide bandwidth monochrome video signal and a plurality of reduced bandwidth color signals, wherein the display of monochrome mixed highs in lieu of complete high frequency color components produces visible color and luminance display errors in image regions having step transitions, means for generating inferred step high frequency correction signals for each of said color signals to reduce the visibility of said display errors, said means comprising:
- means for separating the wide bandwidth monochrome signal into mixed low frequency transient step transition components and mixed high frequency components;
- circuit means for separately deriving low frequency step transition components in each of said plural color signals; and
- means for effectively generating for each of said color signals an inferred step high frequency correction signal that is proportional in instantaneous value to the product of (1) the monochrome mixed highs signal and (2) the respective color low frequency transient step transition components, and (3) the inverse of the monochrome low frequency transient step transition components.

216. A color television system according to claim 215, wherein each of the inferred step high frequency correction signals comprises an alternating bipolar pulse occupying an epoch substantially within each step transition interval and having correct polarity and amplitude to substantially restore the missing high frequency color components over a significant range of signal amplitudes.

* * * * *